(12) United States Patent
Singh et al.

(10) Patent No.: US 11,775,321 B2
(45) Date of Patent: Oct. 3, 2023

(54) ROBOTIC PROCESS AUTOMATION WITH RESILIENT PLAYBACK CAPABILITIES

(71) Applicant: Automation Anywhere, Inc., San Jose, CA (US)

(72) Inventors: Sudhir Kumar Singh, Dublin, CA (US); Jesse Truscott, Petaluma, CA (US); Virinchipuram Anand, San Ramon, CA (US); Harshil Lodhiya, Vadodara (IN)

(73) Assignee: Automation Anywhere, Inc., San Jose, CA (US)

( * ) Notice: Subject to any disclaimer, the term of this patent is extended or adjusted under 35 U.S.C. 154(b) by 0 days.

(21) Appl. No.: 17/139,838

(22) Filed: Dec. 31, 2020

(65) Prior Publication Data

US 2022/0035641 A1 Feb. 3, 2022

Related U.S. Application Data

(60) Provisional application No. 63/060,541, filed on Aug. 3, 2020.

(51) Int. Cl.
*G06F 9/451* (2018.01)
*G06F 3/0485* (2022.01)
*B25J 13/06* (2006.01)

(52) U.S. Cl.
CPC .............. *G06F 9/451* (2018.02); *B25J 13/06* (2013.01); *G06F 3/0485* (2013.01); *G05B 2219/32128* (2013.01); *G05B 2219/50391* (2013.01)

(58) Field of Classification Search
CPC ........ B25J 13/06; G06F 3/0485; G06F 9/451; G05B 2219/32128; G05B 2219/50391
See application file for complete search history.

(56) References Cited

U.S. PATENT DOCUMENTS

| | | | |
|---|---|---|---|
| 6,532,023 B1 * | 3/2003 | Schumacher | G06F 11/3414 714/E11.193 |
| 8,645,828 B2 * | 2/2014 | Avery | G06Q 10/10 707/999.002 |
| 10,452,674 B2 * | 10/2019 | Diwan | G06F 16/252 |
| 10,606,687 B2 * | 3/2020 | Purushothaman | H04L 41/16 |
| 10,802,889 B1 * | 10/2020 | Ganesan | G06F 9/5005 |

(Continued)

*Primary Examiner* — Tadesse Hailu

(57) ABSTRACT

Robotic process automation (RPA) systems with improved playback capabilities. Certain embodiments can provide resilient playback of software automation processes by providing enhanced capability to locate user interface controls within a screen image of a user interface. In some embodiments, one or more of the user interface controls located within the screen image of the user interface can be used to manipulate the user interface so that other user interface controls become visible within the screen image. Other embodiments can, additionally or alternatively, provide resilient playback of software automation processes by providing the capability to record, compute and store parameters for user interface controls detected from a screen image of a user interface. These parameters can be used to assist in locating correct corresponding user interface controls within a screen image presented at playback of a software automation process. Advantageously, embodiments disclosed herein allow software automation processes to operate with greater reliability and flexibility.

26 Claims, 37 Drawing Sheets

(56) References Cited

U.S. PATENT DOCUMENTS

| | | | |
|---|---|---|---|
| 10,817,314 B1* | 10/2020 | Ganesan | G06F 8/38 |
| 10,853,097 B1* | 12/2020 | Kakhandiki | G06F 9/451 |
| 2004/0088300 A1* | 5/2004 | Avery | G06Q 10/10 |
| 2004/0229200 A1* | 11/2004 | McKeon | H04N 21/4431 |
| | | | 434/350 |
| 2013/0019171 A1* | 1/2013 | Mounty | G06F 11/3688 |
| | | | 715/810 |
| 2014/0033091 A1* | 1/2014 | Schein | G06F 9/451 |
| | | | 715/764 |
| 2015/0074609 A1* | 3/2015 | Lanzkron | G06F 3/04845 |
| | | | 715/838 |
| 2017/0001308 A1* | 1/2017 | Bataller | G06F 3/0484 |
| 2017/0052824 A1* | 2/2017 | Sharma | G06F 9/453 |
| 2019/0324781 A1* | 10/2019 | Ramamurthy | G06F 18/24 |
| 2020/0059441 A1* | 2/2020 | Viet | G06Q 10/00 |
| 2021/0109722 A1* | 4/2021 | Ripa | G06F 3/04847 |

* cited by examiner

ROBOTIC PROCESS AUTOMATION WITH RESILIENT PLAYBACK CAPABILITIES

CROSS-REFERENCE TO RELATED APPLICATION

This application claims priority to U.S. Patent Provisional Application No. 63/060,541, filed Aug. 3, 2020, and entitled "ROBOTIC PROCESS AUTOMATION WITH RESILIENT PLAYBACK CAPABILITIES," which is hereby incorporated herein by reference.

BACKGROUND OF THE INVENTION

Robotic process automation (RPA) systems enable automation of repetitive and manually intensive computer-based tasks. In an RPA system, computer software, namely a software robot (often referred to as a "bot"), may mimic the actions of a human being in order to perform various computer-based tasks. For instance, an RPA system can be used to interact with one or more software applications through user interfaces, as a human being would do. Therefore, RPA systems typically do not need to be integrated with existing software applications at a programming level, thereby eliminating the difficulties inherent to integration. Advantageously, RPA systems permit the automation of application level repetitive tasks via software robots that are coded to repeatedly and accurately perform the repetitive task.

Unfortunately, however, interacting with one or more software applications through user interfaces, as a human would do, can be complicated when the user interfaces appear differently due to variations in screen (or window) size or resolution. Therefore, there is a need for improved approaches to understand and interact with user interfaces of software applications such that RPA systems are able to operate with increased reliability and flexibility.

SUMMARY

Robotic process automation (RPA) systems with improved playback capabilities are disclosed. Certain embodiments can provide resilient playback of software automation processes by providing enhanced capability to locate user interface controls within a screen image of a user interface. In some embodiments, one or more of the user interface controls located within the screen image of the user interface can be used to manipulate the user interface so that other user interface controls become visible within the screen image. Other embodiments can, additionally or alternatively, provide resilient playback of software automation processes by providing the capability to record, compute and store parameters for user interface controls detected from a screen image of a user interface. These parameters can be used to assist in locating correct corresponding user interface controls within a screen image presented at playback of a software automation process. Advantageously, embodiments disclosed herein allow software automation processes to operate with greater reliability and flexibility.

The invention can be implemented in numerous ways, including as a method, system, device, apparatus (including computer readable medium and graphical user interface). Several embodiments of the invention are discussed below.

As a computer-implemented method for facilitating resilient execution of a robotic process automation, one embodiment can, for example, include at least: capturing a first image of a playback user interface that is presented on a display device associated with a playback computing device; detecting at least one user interface control within the captured first image of the playback user interface, the detected user interface control being able to alter visible content of the playback user interface that is presented on the display device associated with the playback computing device; effecting manipulation of the playback user interface using the detected user interface control to alter the playback user interface, whereby visible content of the altered playback user interface being presented is at least partially different than visible content the playback user interface presented before the effecting manipulation; capturing a second image of the altered playback user interface that is presented on the display device associated with the playback computing device; and detecting one or more user interface controls within the captured second image of the altered playback user interface.

As a computer-implemented method for facilitating robotic process automation, one embodiment can, for example, include at least: identifying a software automation process that facilitates automation of a previously captured series of user interactions with at least one user interface presented to a user on a display device associated with a capture computing device; initiating execution of the software automation process; capturing an image of a playback user interface that is presented on a display device associated with a playback computing device; examining the captured image of the playback user interface to determine whether a corresponding user interface control is found within the captured image of the playback user interface; effecting programmatic user interaction with the corresponding user interface control of the playback user interface if the examining determines that the captured image of the playback user interface includes the corresponding user interface control; and manipulating the playback user interface if the examining determines that the captured image of the playback user interface does not include the corresponding user interface control.

As a non-transitory computer readable medium including at least computer program code tangibly stored thereon for facilitating execution of a robotic process automation, one embodiment can, for example, include at least: computer program code for capturing a first image of a user interface that is presented on a display device associated with a computing device; computer program code for detecting at least one user interface control within the captured first image of the user interface, the detected user interface control being able to alter visible content of the user interface that is presented on the display device associated with the computing device; computer program code for effecting manipulation of the user interface using the detected user interface control to alter the user interface, whereby visible content of the altered user interface being presented is at least partially different than visible content the user interface presented before the effecting manipulation; computer program code for capturing a second image of the altered user interface that is presented on the display device associated with the computing device; and computer program code for detecting one or more user interface controls within the captured second image of the altered user interface.

As a non-transitory computer readable medium including at least computer program code tangibly stored thereon for facilitating robotic process automation, one embodiment can, for example, include at least: computer program code for identifying a software automation process that facilitates automation of a previously captured series of user interactions with at least one user interface presented to a user on a display device associated with a capture computing device; computer program code for initiating execution of the software automation process, the software automation process including at least one interaction with a particular user interface control; computer program code for capturing an image of a playback user interface that is presented on a display device associated with a playback computing device; computer program code for examining the captured image of the playback user interface to determine whether the particular user interface control is found within the captured image of the playback user interface; computer program code for effecting programmatic user interaction with the particular user interface control of the playback user interface if the examining determines that the captured image of the playback user interface includes the particular user interface control; and computer program code for manipulating the playback user interface if the examining determines that the captured image of the playback user interface does not include the particular user interface control.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which:

FIG. 7 is a screenshot of a representative User Interface (UI) that might be captured during recording of a software automation process.

FIG. 8 is a screenshot of the same UI as illustrated in FIG. 7 but is presented at a lower resolution screen.

FIG. 10 is a screenshot of the same UI illustrated in FIG. 9, after a downward scroll has been performed to reveal another portion of the UI, and thus render the another portion of the UI visible.

FIG. 11 depicts a screenshot of the same UI captured on the same resolution as FIG. 7 but has a different layout.

FIG. 12 is a screenshot of the same UI illustrated in FIG. 11, after a downward scroll has been performed to reveal another portion of the UI, and thus render the another portion of the UI visible.

FIG. 13 depicts a screenshot of the same UI captured as FIG. 7 but has not only a lower resolution but also a single column layout, as compared to a two-column layout in FIG. 7.

FIGS. 14 and 15 illustrate other, different portions of the same UI as depicted in FIG. 13, which can be displayed by successive scrolling downward.

FIG. 20 is a screenshot of yet another screen having a detected scrollbar control, according to one embodiment.

FIG. 30 is a screenshot of yet another screen having various detected UI controls indicated, according to one embodiment.

DETAILED DESCRIPTION OF CERTAIN EMBODIMENTS

Figure 1:
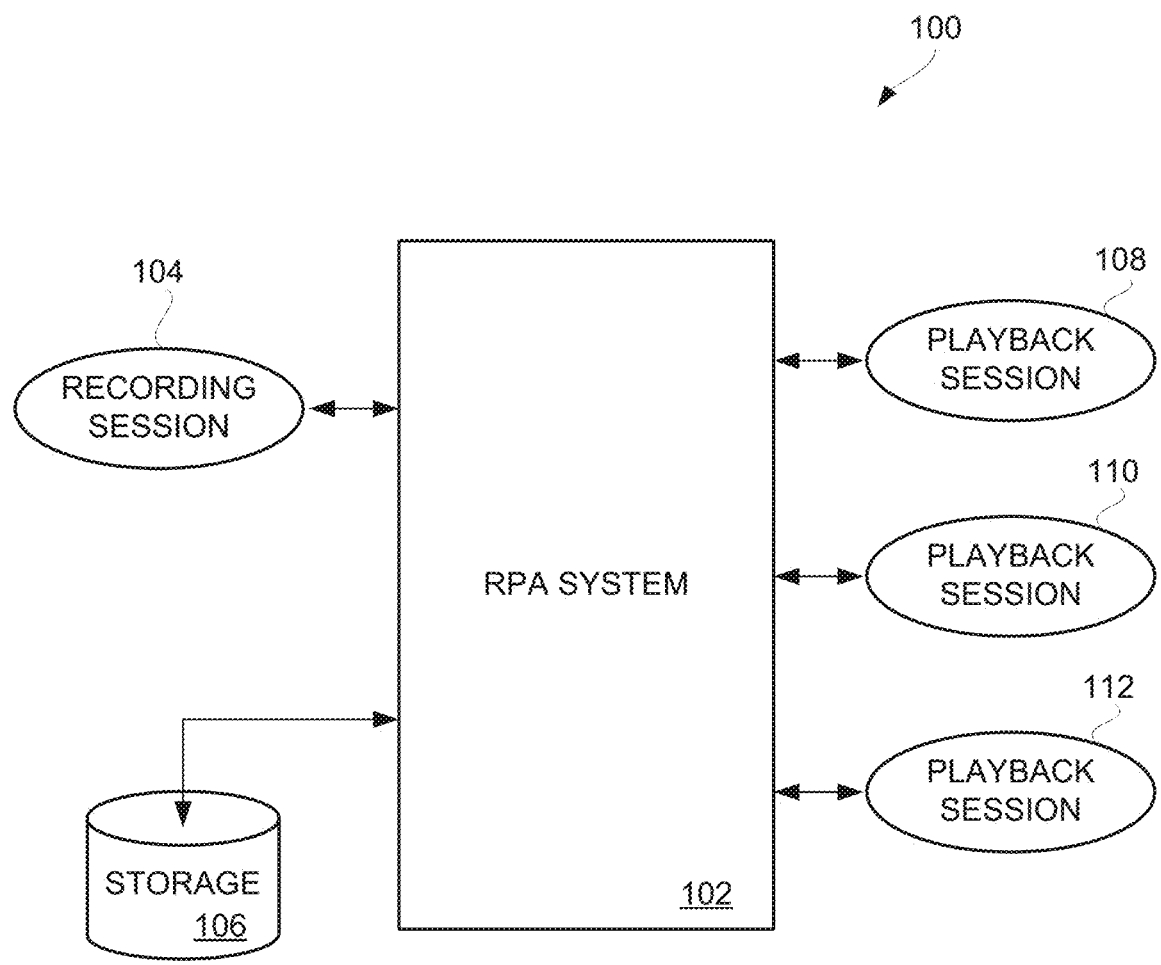
FIG. 1 is a simplified block diagram of a robotic process automation utilization environment according to one embodiment.

Robotic process automation (RPA) systems with improved playback capabilities are disclosed. Certain embodiments can provide resilient playback of software automation processes by providing enhanced capability to locate user interface controls within a screen image of a user interface. In some embodiments, one or more of the user interface controls located within the screen image of the user interface can be used to manipulate the user interface so that other user interface controls become visible within the screen image. Other embodiments can, additionally or alternatively, provide resilient playback of software automation processes by providing the capability to record, compute and store parameters for user interface controls detected from a screen image of a user interface. These parameters can be used to assist in locating correct corresponding user interface controls within a screen image presented at playback of a software automation process. Advantageously, embodiments disclosed herein allow software automation processes to operate with greater reliability and flexibility.

Generally speaking, RPA systems use computer software to emulate and integrate the actions of a human interacting within digital systems. In an enterprise environment, the RPA systems are often designed to execute a business process. In some cases, the RPA systems use artificial intelligence (AI) and/or other machine learning capabilities to handle high-volume, repeatable tasks that previously required humans to perform. The RPA systems also provide for creation, configuration, management, execution, monitoring, and performance of software automation processes.

A software automation process can also be referred to as a software robot, software agent, or a bot. A software automation process can interpret and execute tasks on your behalf. Software automation processes are particularly well suited for handling a lot of the repetitive tasks that humans perform every day. Software automation processes can perform a task or workflow they are tasked with once or 10,000 times and do it accurately every time. As one example, a software automation process can locate and read data in a document, email, file, or window. As another example, a software automation process can connect with one or more Enterprise Resource Planning (ERP), Customer Relations Management (CRM), core banking, and other business systems to distribute data where it needs to be in whatever format is necessary. As another example, a software automation process can perform data tasks, such as reformatting, extracting, balancing, error checking, moving, copying, etc. As another example, a software automation process can grab data desired from a webpage, application, screen, file, or other data source. As still another example, a software automation process can be trigger based on time or an event, and can serve to take files or data sets and move them to another location, whether it is to a customer, vendor, application, department or storage. These various capabilities can also be used in any combination. As an example of an integrated software automation process, the software automation process can start a task or workflow based on a trigger, such as a file being uploaded to an FTP system. The integrated software automation process can then download that file, scrape relevant data from it, upload the relevant data to a database, and then send an email to inform the recipient that the data has been successfully processed.

Embodiments of various aspects of the invention are discussed below with reference to FIGS. 1-35. However, those skilled in the art will readily appreciate that the detailed description given herein with respect to these figures is for explanatory purposes as the invention extends beyond these limited embodiments.

One aspect of embodiments of the invention provides for resilient playback of software automation processes that automate previously recorded user interactions with a computing device. Playback of software automation processes requires locating UI controls within images of displayed user interfaces on screens, or in windows, at time of playback. However, due to variations in screen (or window) size or resolution, the visual appearance of the displayed user interfaces is often not the same as when the software automation process was recorded. Advantageously, these embodiments of the invention are able to manipulate the displayed user interface at playback to alter its visual appearance such that needed user interface controls become visible within the displayed screens (or windows).

FIG. 1 is a simplified block diagram of a robotic process automation (RPA) utilization environment 100 according to one embodiment. The RPA utilization environment 100 serves to support recordation of a series of user interactions of a user with one or more application programs operating on a computing device, and then subsequently provide programmatic playback of the series of user interactions with the same one or more application programs operating on the same or different computing device. Programmatic playback refers to the notion that the playback is undertaken by a computer program, as opposed to a user.

The RPA utilization environment 100 can include a RPA system 102. The RPA system 102 supports creation, storage and execution of software automation processes. These software automation processes can be referred to as "bots". In the simplified block diagram shown in FIG. 1, the RPA system 102 supports a recording session 104 in which a series of user interactions with one or more application programs operating on a computing device can be recorded. In general, recording of a software automation process refers to creation of the software automation process. The series of user interactions can then be utilized by the RPA system 102 to form a software automation process (e.g., bot) for carrying out such actions in an automated manner. The RPA utilization environment 100 can include a storage 106 for storage of the software automation processes (e.g., bots) that have been created.

In addition, the RPA system 102 further supports the execution of the one or more software automation processes that have been created by the RPA system 102 and stored to the storage 106. Execution (or running) of a software automation process at a computing device causes playback of the software automation process. That is, when a software automation process is executed or run by one or more computing devices, the software automation process is being "played back" or undergoing "playback." Advantageously, the RPA system 102 supports the playback of software automation processes in a resilient fashion. For example, the RPA system 102 supports the execution of the software automation process in any of a plurality of different playback sessions 108, 110 and 112. In this example, for illustration purposes, there are depicted three distinct playback sessions 108, 110 and 112. Although each of these playback sessions 108, 110 and 112 execute the same software automation process, the graphical user interface associated with and presented during the playback can take different sizes, positions, orientations, organizations, formats, etc. As such, the RPA system 102 operates to execute (i.e., playback) the software automation process in an intelligent manner such that differences in how the graphical user interfaces of the one or more application programs involved in the software automation process are presented can be managed so that such differences do not result in a failure to carry out the software automation process.

Figure 2:
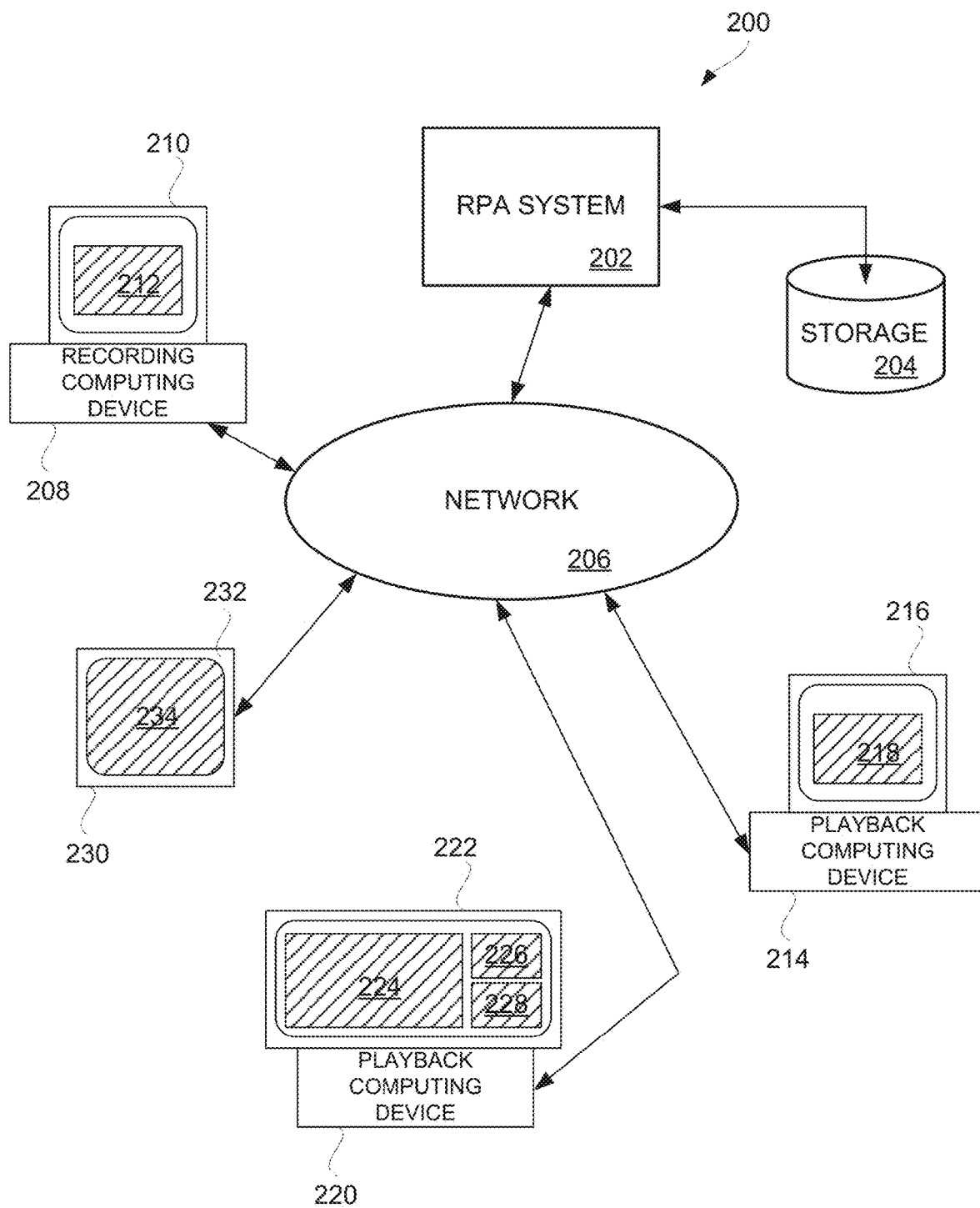
FIG. 2 is a block diagram of a computing environment according to one embodiment.

FIG. 2 is a block diagram of a computing environment 200 according to one embodiment. The computing environment 200 includes a RPA system 202. The RPA system 202 is, for example, similar to the RPA system 102 illustrated in FIG. 1. The RPA system 202 can be coupled to a storage 204 for storage of software automation processes (e.g., bots). The storage 204 can, for example, be similar to the storage 106 illustrated in FIG. 1.

Additionally, the computing environment 200 can support various different types of computing devices that can interact with the RPA system 202. The computing environment 200 can also include a network 206 made up of one or more wired or wireless networks that serve to electronically interconnect various computing devices for data transfer. These computing devices can serve as a recording computing device, a playback computing device, or both. As shown in FIG. 2, the computing environment 200 can include a recording computing device 208 that includes a display device 210 and a window 212 presented on the display device 210. The window 212 can, in one example, depict a user interface that is associated with recording user interactions with one or more application programs to produce a software automation process using the RPA system 102.

The computing environment 200 shown in FIG. 2 also includes various playback computing devices. A first playback computing device 214 includes a display device 216 that can present a window 218. A second playback computing device 220 includes a display device 222 that can present a first window 224, a second window 226 and a third window 228. A third playback computing device 230 includes a display device 232 that can present a window 234. More generally, the windows are screens that are presented and visible on respective display devices.

The different playback computing devices 214, 220 and 230 all have different window sizes. While the window 218 utilized by the playback computing device 214 is similar to the window 212 utilized by the recording computing device 208, the windows, such as window 224 and 234, of the other playback computing devices 220, 230 are necessarily different. As a result, the execution of a software automation process by way of the RPA System 202 may not execute properly on any of the playback computing devices. For example, the window 224 utilized by the playback computing device 220 is definitely larger than the window 212 utilized by the recording computing device 208. As a result, the layout of the user interface presented within the window 224 on playback will not have the same visual appearance as did the user interface as it is presented in the window 212 during recording. Similarly, the window 234 utilized by the playback computing device 230 is of a different size and orientation as compared to the window 212 utilized by the recording computing device 208 during recording. While the window 218 utilized by the playback computing device 214 does generally appear similar to the window 212 utilized by the recording computing device 208 at least as to size and shape, the resolution at which the associated user interfaces are presented within those windows may still vary which can similarly alter the content of the user interfaces that are presented within those windows.

Figure 3:
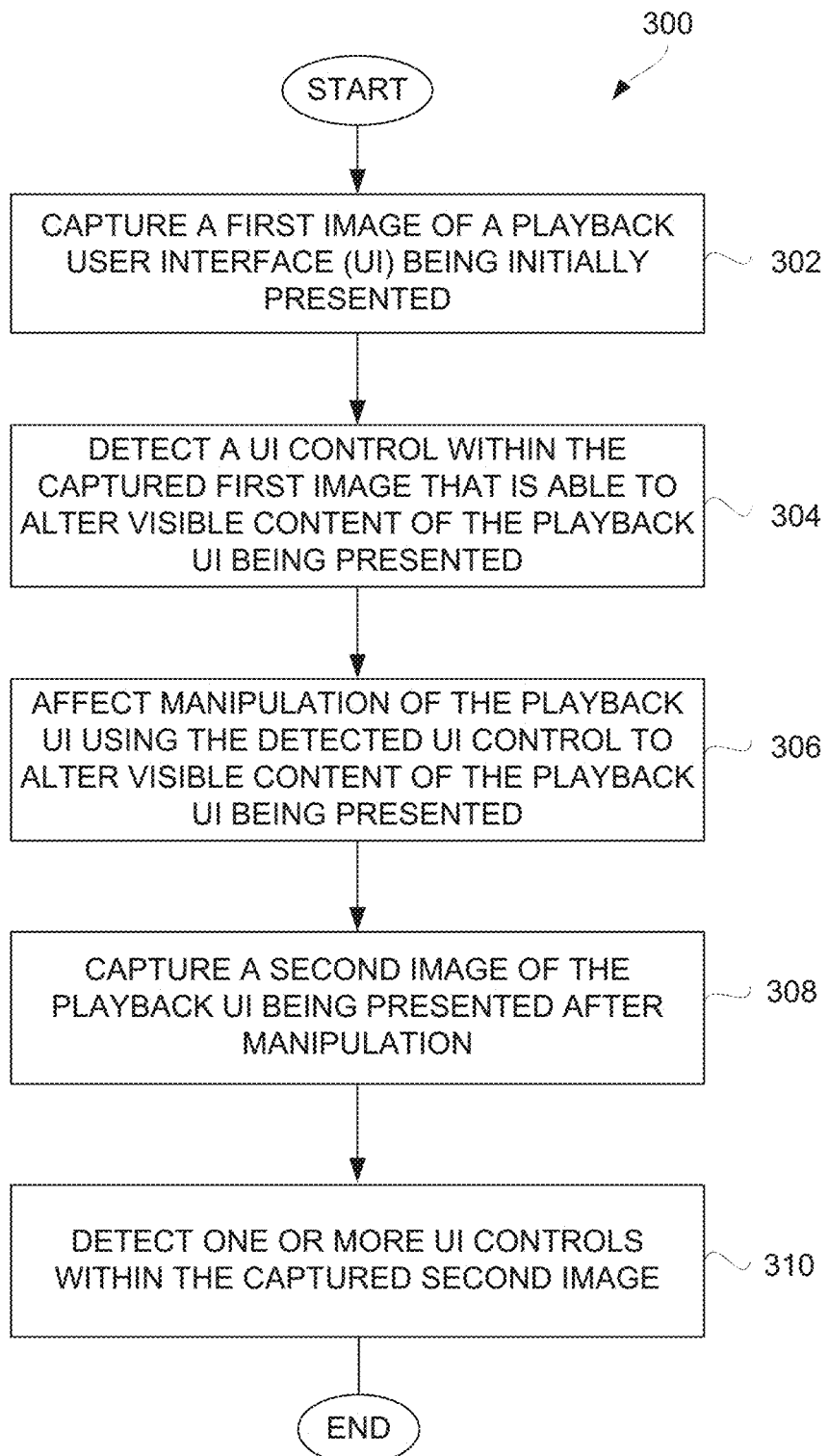
FIG. 3 is a flow diagram of a control locating process according to one embodiment.

FIG. 3 is a flow diagram of a control locating process 300 according to one embodiment. The control locating process 300 is, for example, performed as part of providing robotic automation processing. More particularly, a software automation process that previously recorded user interactions with a graphical user interface presented by computing device can, on subsequent playback of the software automation process, need to locate user interface controls within a graphical user interface presented by a computing device at the time of playback. The control locating process 300 can locate controls within graphical user interfaces, even if such controls are not initially visible.

The control locating process 300 can capture 302 a first image of a playback user interface (UI) being initially presented. For example, the playback UI can be initially presented on a screen (e.g., window) of or associated with a computing device, which can be referred to as a playback computing device. The screen is provided on a display device associated with the computing device. Some display devices support multiple windows, and then the playback UI would be presented in a window provided on the display device. Next, a UI control within the captured first image can be detected 304. The detected UI control is a UI control that is able to alter visible content of the playback UI that is presented on the screen of or associated with the computing device. Then, using the detected UI control, the playback UI can be effectively manipulated 306 to alter visible content of the playback UI being presented.

Thereafter, a second image of the playback UI being presented after the manipulation 306 can be captured 308. Then, one or more UI controls within the captured second image can be detected 310. Here, through manipulation of the playback UI, a desired UI control of the playback UI that is not visible in the playback UI being initially presented can become visible after the playback UI has been manipulated 306. In other words, the manipulation 306 enables other content, including the desired UI control, of the playback UI to become visible on the screen. Once the desired UI control is visible and detected, the software automation process being played back (i.e., executed) is able to programmatically cause interaction with the desired UI control.

In the case of a RPA system, on playing back a previously recorded software automation process (e.g., bot), the ability to effectively manipulate the playback UI allows different areas of the playback UI to be visible. By doing so, the ability for the RPA system to successfully execute previously recorded software automation processes is substantially improved because it is able to tolerate differences in how the associated user interface are visually presented. For example, the RPS system can successfully execute a software automation process even though the associated user interfaces have been resized, rescaled, reformatted, or the like.

Figure 4:
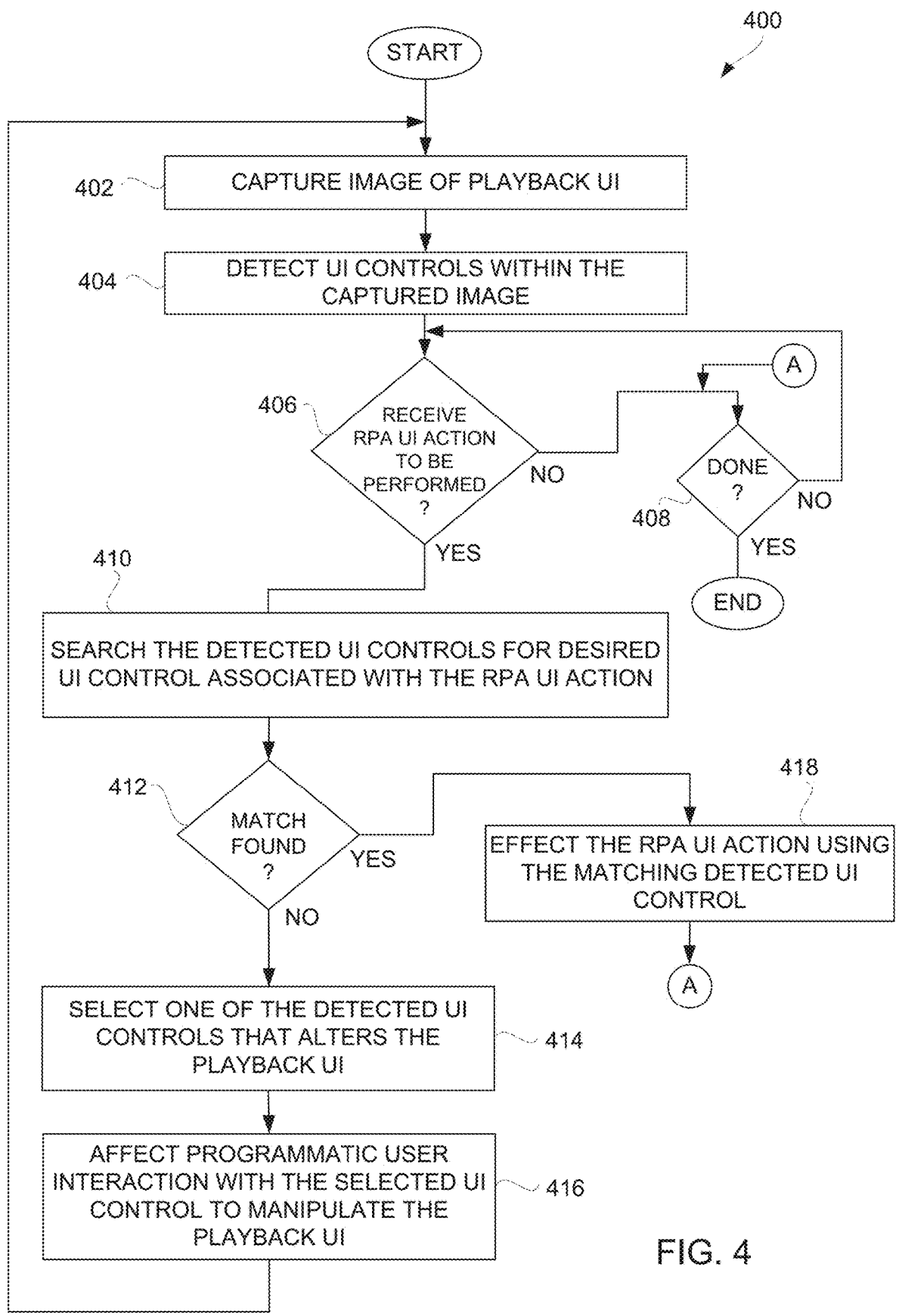
FIG. 4 is a flow diagram of a control matching process according to one embodiment.

FIG. 4 is a flow diagram of a control matching process 400 according to one embodiment. The control matching process 400 is, for example, performed as part of providing robotic automation processing. More particularly, a software automation process implementing previously recorded user interactions with a graphical user interface presented by computing device can, on subsequent playback of the software automation process, need to locate user interface controls within a graphical user interface presented on a display device by a computing device at the time of playback. The control matching process 400 can locate and then use controls within graphical user interfaces, even if such controls are initially not initially visible.

The control matching process 400 can capture 402 an image of a playback UI. Then, UI controls within the captured image can be detected 404. Next, a decision 406 can determine whether an RPA UI action to be performed has been received. The RPA UI action is one of a plurality of actions to be carried out as part of a software automation process being played back. When the decision 406 determines that an RPA UI action has not been received, then a decision 408 can determine whether the control matching process 400 is done. When the decision 408 determines that the control matching process 400 is done, then the control matching process 400 can end. On the other hand, when the decision 408 determines that the control matching process 400 is not done, then the control matching process 400 can return to repeat the decision 406 and subsequent blocks so that once RPA UI actions are received, they are able to be performed.

When the decision 406 determines that an RPA UI action to be performed has been received, then the control matching process 400 searches 410 the detected UI controls for a desired UI control associated with the RPA UI action. A decision 412 can then determines whether a match has been found as a result of the search 410. When the decision 412 determines that a match has not been found, then one of the detected UI controls that is capable of altering the playback UI can be selected 414. Then, a programmatic user interaction with the selected UI control can be affected 416 to manipulate the playback UI. Here, programmatic user interaction denotes that the interaction with a UI control being undertaken is by a computer program that is acting as a user would, thereby providing automation. Following the programmatic user interaction being affected 416, the control matching process 400 can return to repeat the block 402 and subsequent blocks so that additional RPA UI actions can be received and performed. The RPA UI actions were previously recorded and are being playback to execute the software automation process.

Alternatively, when the decision 412 determines that a match has been found as a result of the search 410, then the RPA UI action can be affected 418 using the matching detected UI control. Following the block 418, the control matching process 400 can return to repeat the decision 408 and subsequent blocks so that additional RPA UI actions can be received and suitably performed.

In other embodiments, when a UI control (i.e., the expected control) that is necessary to perform an action in the automation flow is not visible in UI screenshot of the UI at the current playback step, the RPA system can automatically determine an amount and direction of vertical or horizontal scroll to get to the UI screen (or window) where the expected control becomes visible. During such a scrolling procedure, the RPA system can utilize a control detection to identify the currently visible controls. In the control detection, standard controls as well as UI manipulation controls can be detected. Examples of standard controls include: TEXTBOX, COMBOBOX, TEXT BUTTON, CHECKBOX, and RADIO BUTTON. Examples of UI manipulation controls include scrolling controls, such as scrollbars and their child controls. For example, the child controls of scrollbars include one or more handles that can be clicked on and a bar that can be dragged. Once the scrollbars, their children and their respective locations and current scroll positions are computed, geometry of currently visible controls, geometry of expected controls from recording, and/or expected geometry of controls for next automation steps can be used to determine an amount of scroll needed. After an amount of scroll is determined, the scrollbar can be robotically induced (i.e., programmatically) to perform the scroll.

The determination of how to scroll can be implemented in various different ways. In one implementation, the relative direction of a next control (i.e., the control needed to complete the next/intended action in the automation flow) from the top most control, bottom most control, left most control and right most control are all computed and the direction with the most proximity is chosen as the direction of scroll (up, down, left or right). The shortest distance from such computations can be used to compute the amount of scroll. Alternatively, in another implementation, a simple page-based scroll can be performed in the computed direction. In still another implementation, a search can be started from the beginning of the page and scroll can be performed one page at a time. In yet another implementation, when performing the scroll in the computed direction by the computed scroll amount still does not make the targeted control visible, a page by page scroll can be employed.

Additional details on detecting user interface controls can be found in DETECTION OF USER INTERFACE CONTROLS VIA INVARIANCE GUIDED SUB-CONTROL LEARNING, U.S. application Ser. No. 16/876,530, filed May 18, 2020, which is hereby incorporated by reference herein.

Another aspect of embodiments of the invention provides enhanced ability to locate user interface controls within images of user interfaces displayed on screens (or windows). User interfaces tend to have numerous UI controls that are in close proximity to one another and the accuracy with which these UI controls can be located can be challenging. Advantageously, embodiments of the invention are able to capture additional visual cues from user interfaces while recording and during playback so that UI controls needed to carry out a robotic automation can be reliably located and then interacted with.

On playback of a software automation process, UI controls need to be correctly mapped in order to perform a correct action. In certain embodiments, the UI controls and UI labels can be represented and related so that UI controls on playback can be reliably located and matched even when the associated user interface undergoes transformations in resolution, window size, size of display device, embedding into a larger window, geometric layout change, or combinations thereof. Otherwise, many controls of the same type may look the same visually and a UI control during playback may get be confused with a different control during recording due to such transformations.

Figure 5:
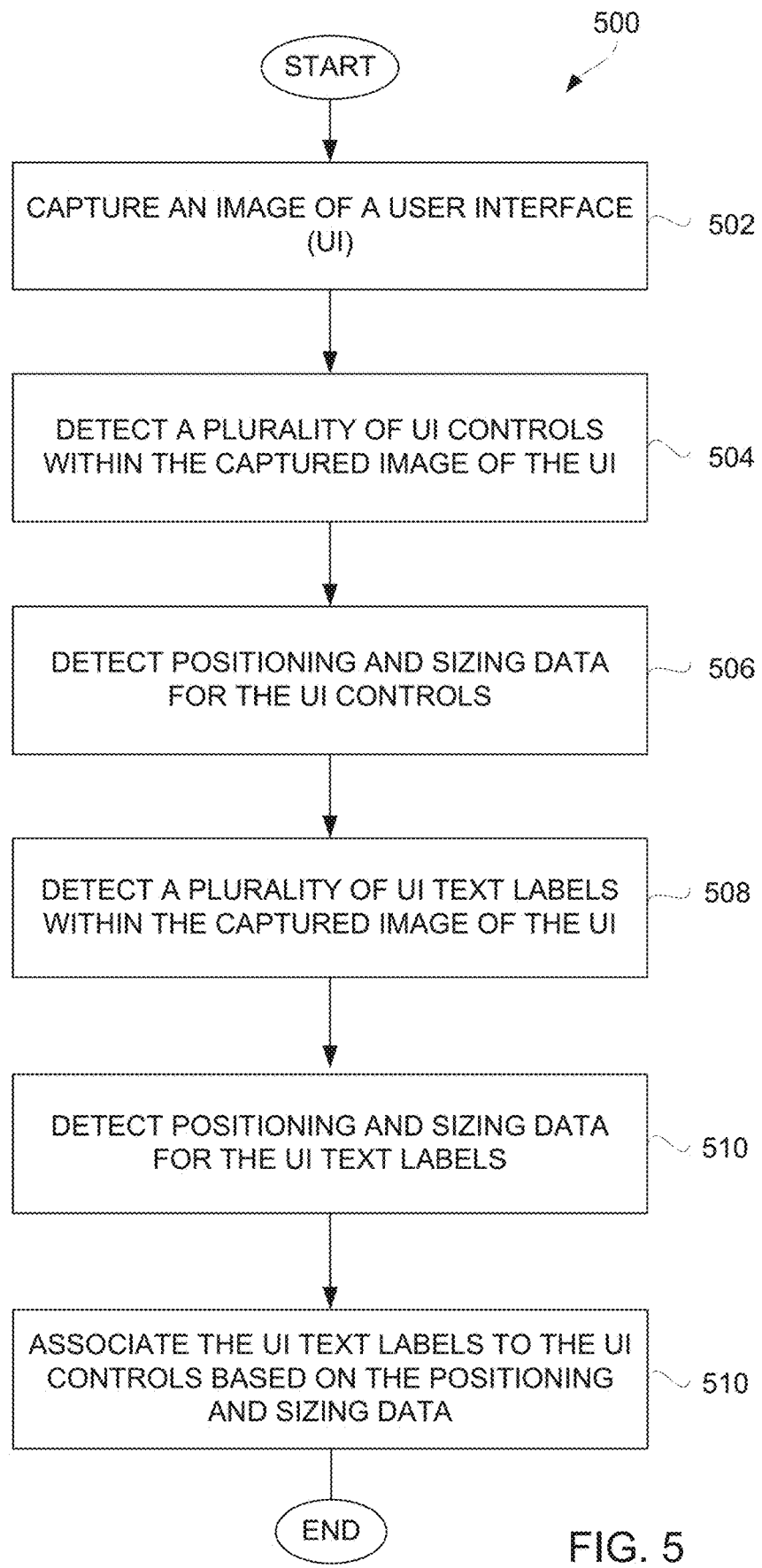
FIG. 5 is a flow diagram of a control recognition process according to one embodiment.

FIG. 5 is a flow diagram of a control recognition process 500 according to one embodiment. The control recognition process 500 can be associated with a robotic automation process in which user interactions with an application program operating on a computing device can be recorded and then subsequently utilized in an automated fashion by playing back such actions in a programmatic fashion.

The control recognition process 500 can capture 500 into an image of a user interface (UI). Next, a plurality of UI controls within the captured image of the user interface can be detected 504. Also, positioning and sizing data for the UI controls can be detected 506. In addition, a plurality of UI text labels within the captured image of the user interface can be detected 506. Also, positioning and sizing data for the UI text labels can be detected 510. Thereafter, the UI text labels can be associated 510 to the UI controls based on the positioning and sizing data. Here, the positioning and sizing data associated with the UI controls as well as for the UI text labels can be used to associate 510 the UI text labels to the UI controls of the user interface. The association 510 being made provides additional references corresponding to the UI controls that are able to be utilized to enhance the ability for robotic automation processes to locate and utilize of such UI controls, even when the associated user interfaces are presented differently.

Figure 6A:
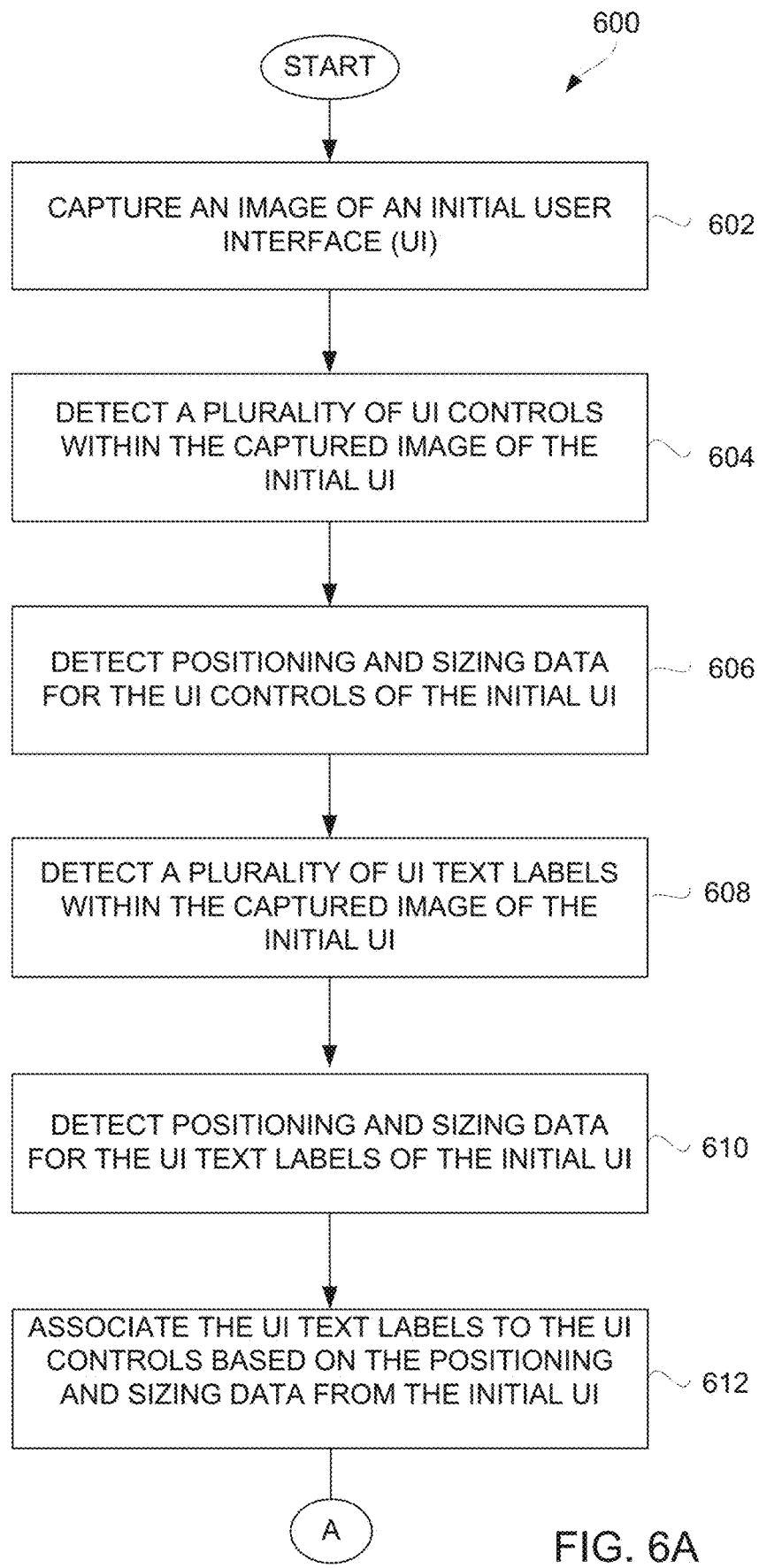
FIGS. 6A-6C are flow diagrams of a robotic automation process according to one embodiment.
Figure 6B:
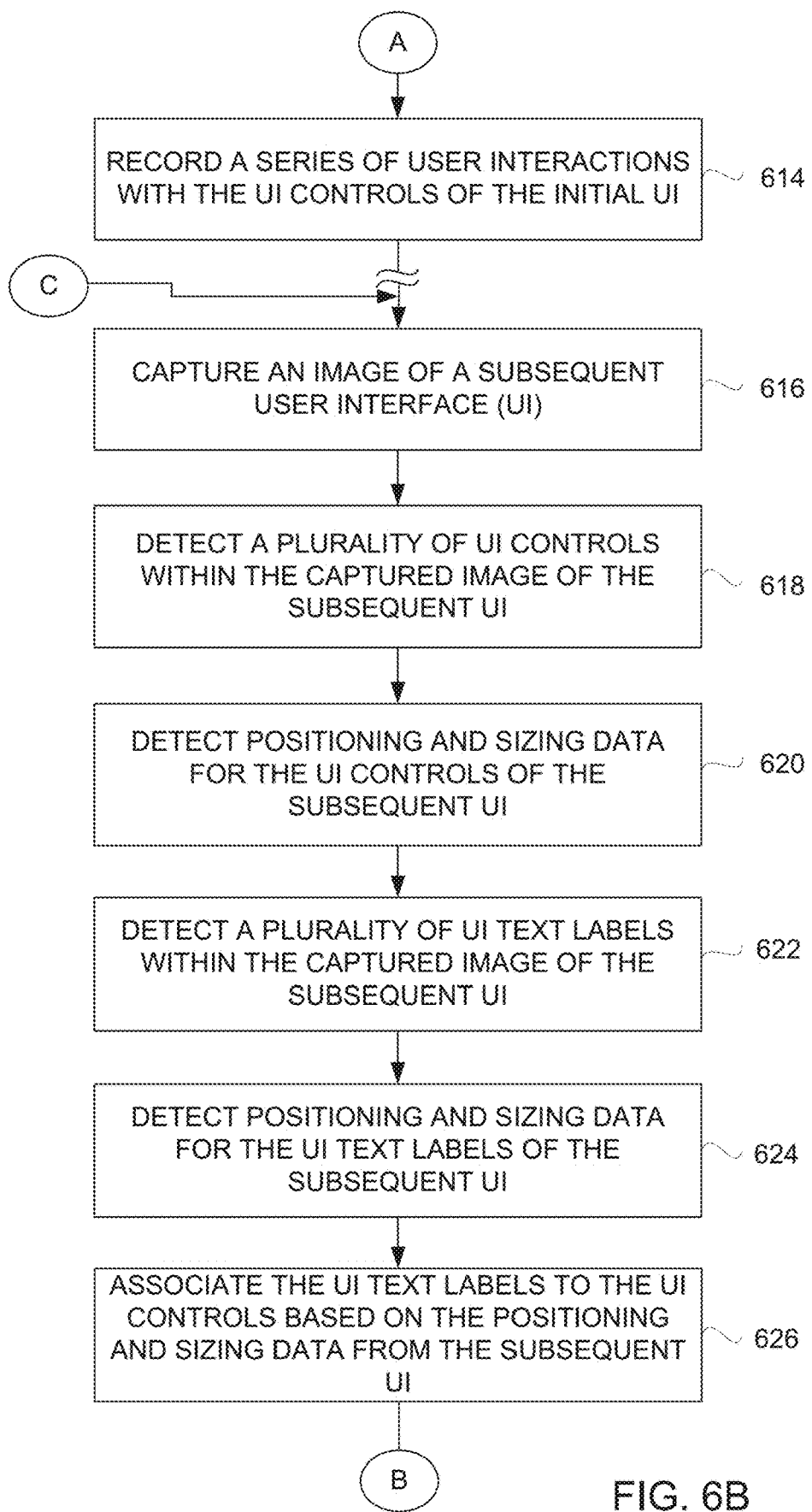
Figure 6C:
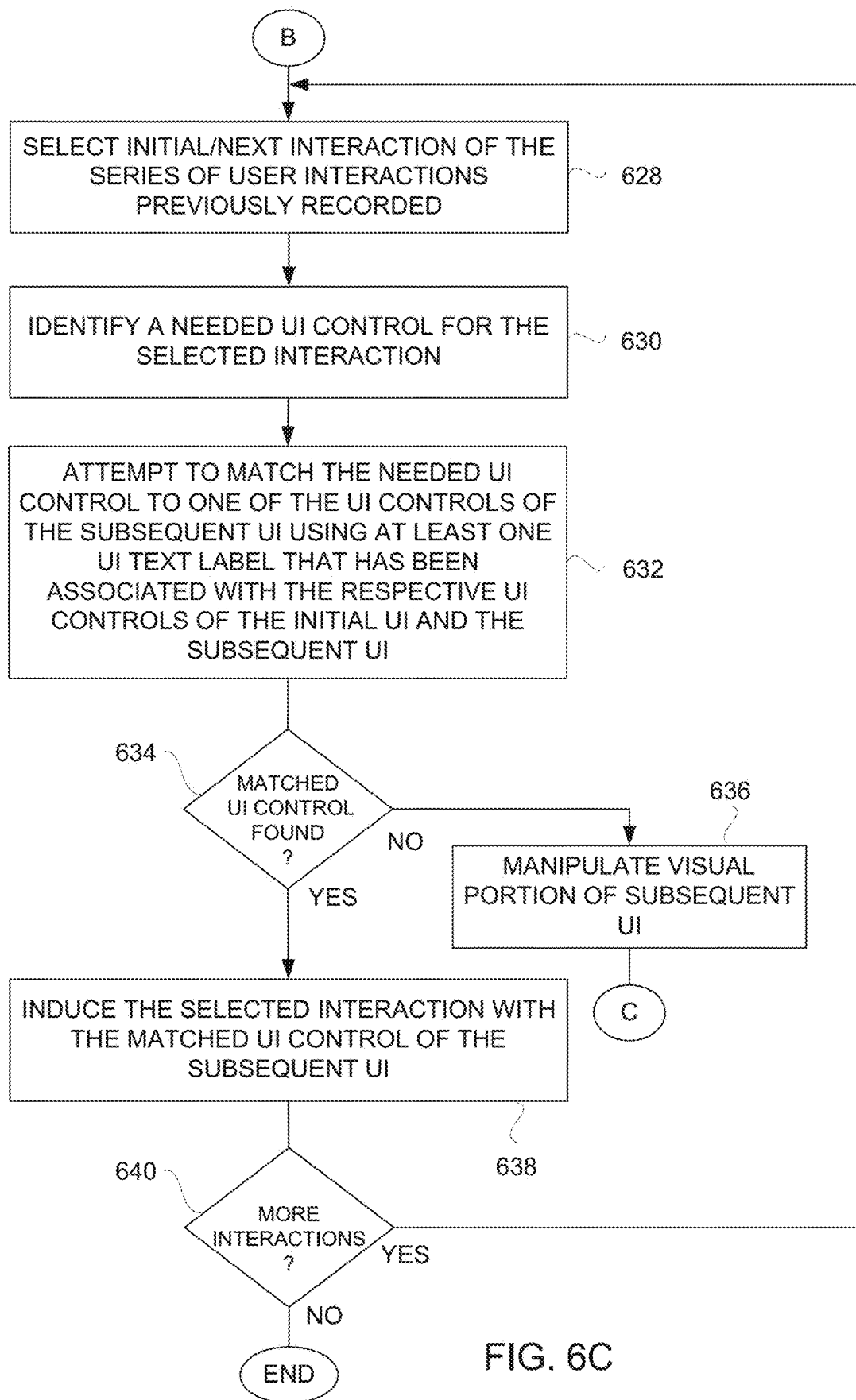

FIGS. 6A-6C are flow diagrams of a robotic automation process 600 according to one embodiment. The robotic automation process 600 captures user interactions with an application program, forms a software automation process to carry out such user interactions, and then executes (or runs) the software automation process to robotically perform operations otherwise performed manually by a user.

FIG. 6A illustrates processing performed prior to recording user interactions with one or more application programs in order to form a particular software automation process. More specifically, an image of an initial user interface (UI) is captured 602. The initial user interface (UI) is presented by an application program. Then, a plurality of UI controls within the captured image of the initial UI can be detected 604. Also, positioning and sizing data for the UI controls of the initial UI can be detected 606. Further, a plurality of UI text labels within the captured image of the initial UI can be detected 608. Also, positioning and sizing data for the UI text labels of the initial UI can be detected 610. Thereafter, the UI text labels can be associated 612 to the UI controls based on the positioning and sizing data from the initial UI. Here, the positioning and sizing data associated with the UI controls as well as for the UI text labels can be used to accurately associate 612 the UI text labels to the UI controls of the initial UI.

Additional processing for the robotic automation process 600 illustrated in FIG. 6B includes recording of user interactions for the particular software automation process to be formed as well as processing to subsequently locate UI controls within an image associated with an application screen (or window) of an application program on playback.

The additional processing shown in FIG. 6B can begin with a series of user interactions with the UI controls of the initial UI being recorded 614. This series of user interactions with the UI controls form the basis for the particular software automation process. The particular software automation process also can include association data in which UI text labels associated with the UI control are denoted, as determined by the associating 612.

Then, sometime later, such as when playback or execution of the particular software automation process is to be performed, additional processing can be carried out such as detailed in the remainder of FIG. 6B and in FIG. 6C. In particular, an image of a subsequent user interface (UI) can be captured 616. Then, a plurality of UI controls within the captured image of the subsequent UI can be detected 618. Also, positioning and sizing data for the UI controls of the subsequent UII can be detected 620. In addition, a plurality of UI text labels within the captured image of the subsequent UI can be detected 622. Also, positioning and sizing data for the UI text labels of the subsequent UI can be detected 624. Then, the UI text labels can be associated 626 to the UI controls based on the positioning and sizing data from the subsequent UI. Here, the positioning and sizing data associated with the UI controls as well as for the UI text labels can be used to accurately associate 626 the UI text labels to the UI controls of the subsequent UI.

At this point in the robotic automation process 600, the UI controls within the captured image of the subsequent UI have been detected and have been correlated to UI text labels so that the UI controls are able to be accurately located within a corresponding captured image.

Subsequent processing shown in FIG. 6C operates to perform the series of user interactions (or "actions") that were previously recorded and utilized to form the particular software automation process to be carried out. In this regard, an initial interaction of the series of user interactions previously recorded can be selected 628. Then, a needed UI control for the selected interaction can be identified 630. Next, the robotic automation process 600 attempts 632 to match the needed UI control to one of the UI controls of the subsequent UI, and in so doing, uses at least one UI text label that has been associated with the respective UI controls of the initial UI and the subsequent UI. The match, if present, is more accurately matched through use of the associated at least UI text label.

A decision 634 can then determine whether a matched UI control is been found. When the decision 634 determines that a matched UI control has not been found within the subsequent UI, then a visual portion of the subsequent UI can be manipulated 636. The manipulation 636 can, for example, use any of the approaches described herein, such as described with reference to FIGS. 3 and 4.

Following the block 636, the robotic automation process 600 can return to block 616 and subsequent blocks so that the processing can repeat for another subsequent user interface that results after the visual appearance of the subsequent UI has been altered by the manipulation 636. In this case, the alteration of the subsequent UI means that different UI controls may be visually presented and detected in another subsequent UI than those previously visually presented in the subsequent UI.

On the other hand, when the decision 634 determines that a matched UI control has been found within the subsequent UI, then the selected interaction can be induced 638 with the matched UI control of the subsequent UI. As a result, the selected interaction of the particular software automation process is then carried out.

Next, a decision 640 determines whether there are more interactions of the software automation process to be processed. When the decision 640 determines that there are more interactions to be performed, the robotic automation process 600 returns to repeat the block 628 and subsequent blocks so that a next interaction of the series of user interactions that were previously recorded and used to form the particular software automation process can be selected and similarly processed. Alternatively, when the decision 640 determines that there are no more interactions of the software automation process to be processed, then the robotic automation process 600 can end.

As noted above, UI controls can be associated with UI text labels (or even other UI controls) that are nearby as presented on a graphical user interface. These associations provide positional references, which can be referred to as anchors, and the association process can be referred to as anchoring.

UI controls can be anchored during recording and playback using nearby text as well as the geometry of neighboring controls. The text may itself be extracted via an Optical Character Recognition (OCR) engine or a text detection or a combination thereof. These anchor-control pairs (i.e., associations) from recording and playback are mapped appropriately using an approximate matching logic that accounts for (i) actual text values of the anchors and (ii) types and geometries of the targeted controls (and possibly also their neighboring controls). Note that the set of detected controls with their type and bounding box geometry can be gathered from control detection and pixel details available from the corresponding UI screenshot.

At the start of the anchoring process, a set of detected controls using control detection and a set of detected labels using text detection and/or an OCR engine are available. According to one embodiment, for each detected control, there can be a few associated parameters, such as type, state, bounding box coordinates, etc. Similarly, according to one embodiment, for each detected label, there can be its actual text value, the bounding box coordinates, and additionally the bounding box geometry for each character in the label.

Anchoring can take these detected controls and labels and compute a proximity between each pair of controls and labels. For each control, a set of top labels are selected in each direction as per their distance values in that direction from the control bounding box for each of a set of predefined directions. Each control may also have a predefined preference score for label directions. For example, a label on the right is preferable to a label on top or bottom for a control type CHECKBOX whereas a left or top label may be preferable for a TEXTBOX. Based on the distance values and directional preferences, a set of proximal or preferred labels can be computed for each control. Then, a proximal label can be selected based on a weighted score of proximity and direction.

Anchoring can also use alignment between neighboring controls to tune the preferred label mapping direction for a control. Neighboring controls which are either vertically or horizontally aligned can be grouped together and assigned a preferred direction based on the majority of their proximal labels. Additionally, a similar alignment and grouping for labels can also be utilized. Finally, the set of proximal labels for each control and the group preferences can be used to compute a set of final anchors for that control. This set of final anchors can be obtained by revising the proximal labels and pruning away or de-ranking the labels that are not consistent with the control group that the control belongs too. This can provide an accurate way of finding an anchor for a control. In addition to computing anchors that are proximal text values on the screen, the system may also compute one or more nearby controls as anchors as well. It may further assign edge context as an anchor using the proximity to the edges of the UI window. Such edge anchors can be helpful in anchoring outer scrollbars where other references may not be as reliable. In general, control to anchor mappings can be many to many.

There also can be scenarios where there is a variable number of controls during recording and playback. For example, a screen where a set of quantities are needed to be filled in for a set of products and are to be added to a shopping cart. The actual name of these products and the number of the products may vary between different playback sessions, however there is always a TEXTBOX next to each product to enter the quantity. The anchors can be variable or dynamic and assigned to a control of certain type to solve such scenarios. For example, a user can select a product name to be a variable anchor for the corresponding TEXTBOX during recording and put this anchor-control pair action of entering quantity in a loop that follows a list. The anchoring can thus use static or dynamic anchors. These anchors along with control properties such as type, state and bounding box geometry provide a good representation for UI controls and are robust to changes in recording to playback transformations.

To perform the correct action during playback, the anchors are used assist in accurately mapping the associated control from a recording to a control during playback once it is visible (which might require scrolling). A matching score can be computed between particular recorded control and one or more of the various visible controls in the playback screen. This matching score may come from a combination of one or more of the following: control type consistency score, text matching score, and control geometry matching score. In one embodiment, a control can be mapped only to a control of same type, subtype and state. In another embodiment, a control can be mapped to a control of same type, and a non-zero score may be assigned. In one embodiment, a text matching score is simply the normalized set difference between the corresponding anchor text wherein the anchor text is considered as a set of characters. In another embodiment, a text matching score is computed as edit distance between the two anchor texts. In one embodiment, a control geometry matching score can be computed based on intersection over union of the corresponding bounding boxes. Additionally, a pixel blob-based matching score may also be used wherein the score can be calculated based on a function of the actual pixel values of the controls. In one embodiment, this blob based matching score can be calculated as a traditional visual template match.

Another aspect disclosed herein is attention-tuned control detection. There may be scenarios where control detection is not confident about certain controls. A human is usually available to guide the selection of control during recording (e.g., as they design the bot), but such intervention is not possible or desired during playback. But, the human-boosted confidence from recording can be used to tune the attention of the control detection during playback to correctly identify the control. In this regard, all the detected controls that a user recorded an action on during recording can be considered high confidence detections and must be found during playback to complete those actions. It is possible that, due to certain unfavorable visual transformations during playback, some of the detected controls have a lower confidence than a threshold deployed during recording. Hence, unless a threshold lower than during playback is used, the system will not detect such controls and they would be deemed not visible on the current playback screen. To address this, in addition to high confidence controls, a set of low confidence controls can be determined and further have anchors computed for them. To perform an action, if the corresponding recorded control has an anchor that can be matched only to a low confidence control, the confidence score of that low confidence score could be boosted so that it can be declared as a match.

The aspects of scrolling and anchoring can be used together or separately. The attention-tuned control detection is optionally available for use with control detection that can be performed as a precursor to anchoring of controls to visible features (e.g., test labels, UI controls) of a user interface.

As noted above, one aspect disclosed herein is an ability to scroll a user interface in context of executing a software automation process (i.e., bot).

Automating UI level tasks or processes using visual screenshots of the UI is often the only choice available in scenarios such as virtual and remote desktop environments. However, the visual nature of information also means that it is often transformed, and as a result UI screenshots may often look quite different during playback (i.e., when a bot is run) as compared to that during recording (i.e., when the bot was created) due to changes in resolution and/or application window contexts or sizes. In many cases, UI control information that was visible during recording is not even visible during playback. Some examples of such transformations are illustrated in FIG. 7-10.

Figure 7:
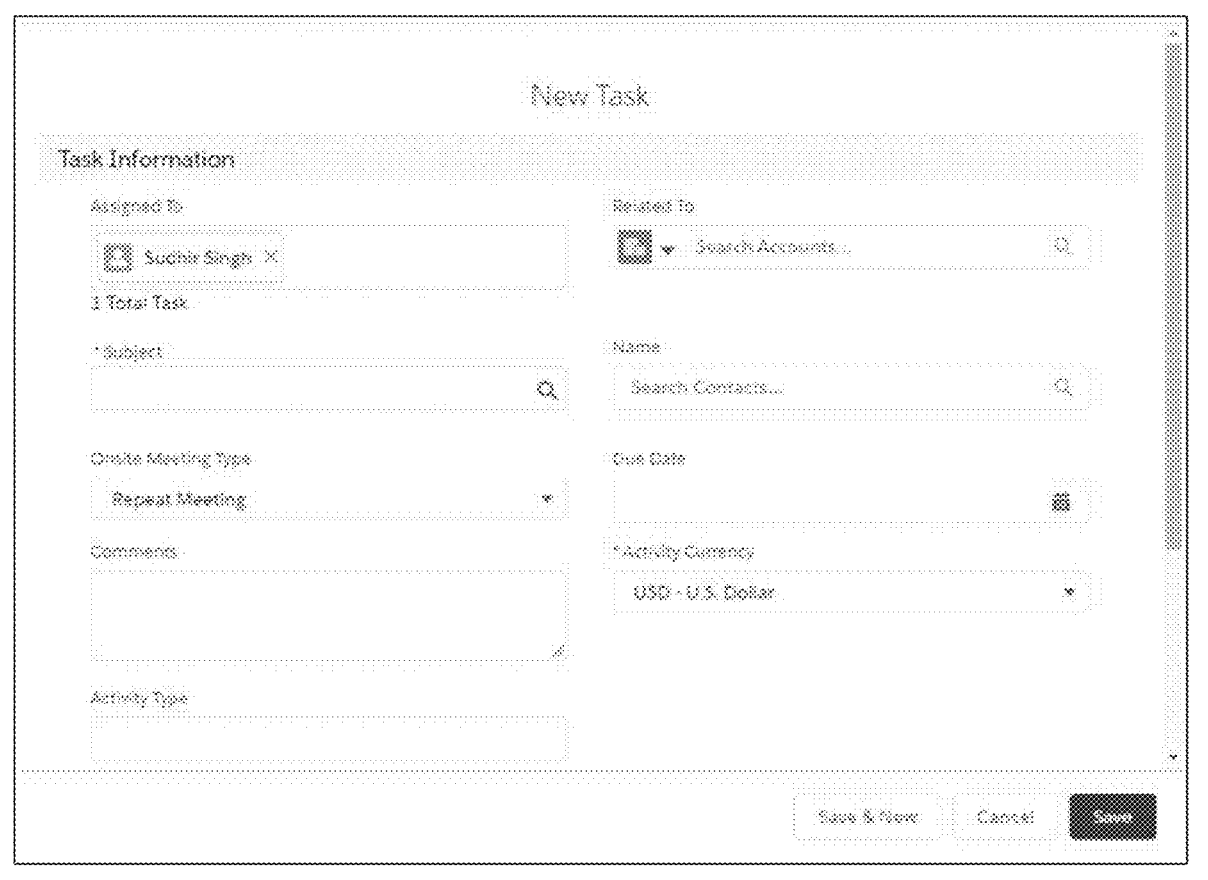
Figure 8:
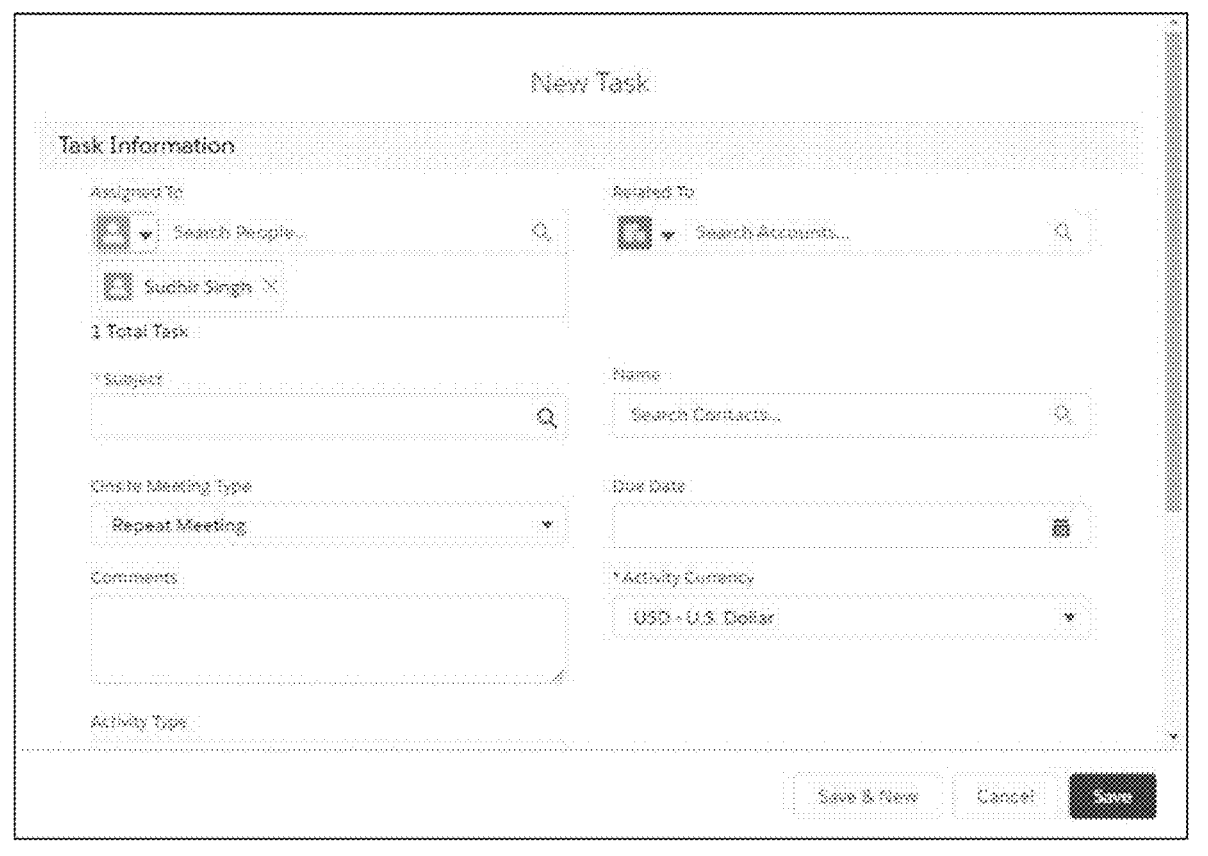

FIG. 7 is a screenshot of a representative User Interface (UI) that might be captured during recording of a software automation process. A portion of the UI is presented in a screen. The screen can include or pertain to a window displayed on a display device. FIG. 8 is a screenshot of the same UI as illustrated in FIG. 7 but is presented at a lower resolution screen. As can be noted, the TEXTBOX "Activity type" is not visible on the screen depicted in FIG. 8, but is visible in the screen depicted in FIG. 7.

Figure 9:
FIG. 9 is another screenshot of the same UI as illustrated in FIG. 7 which is presented at an even lower resolution screen along with window resizing.
Figure 10:
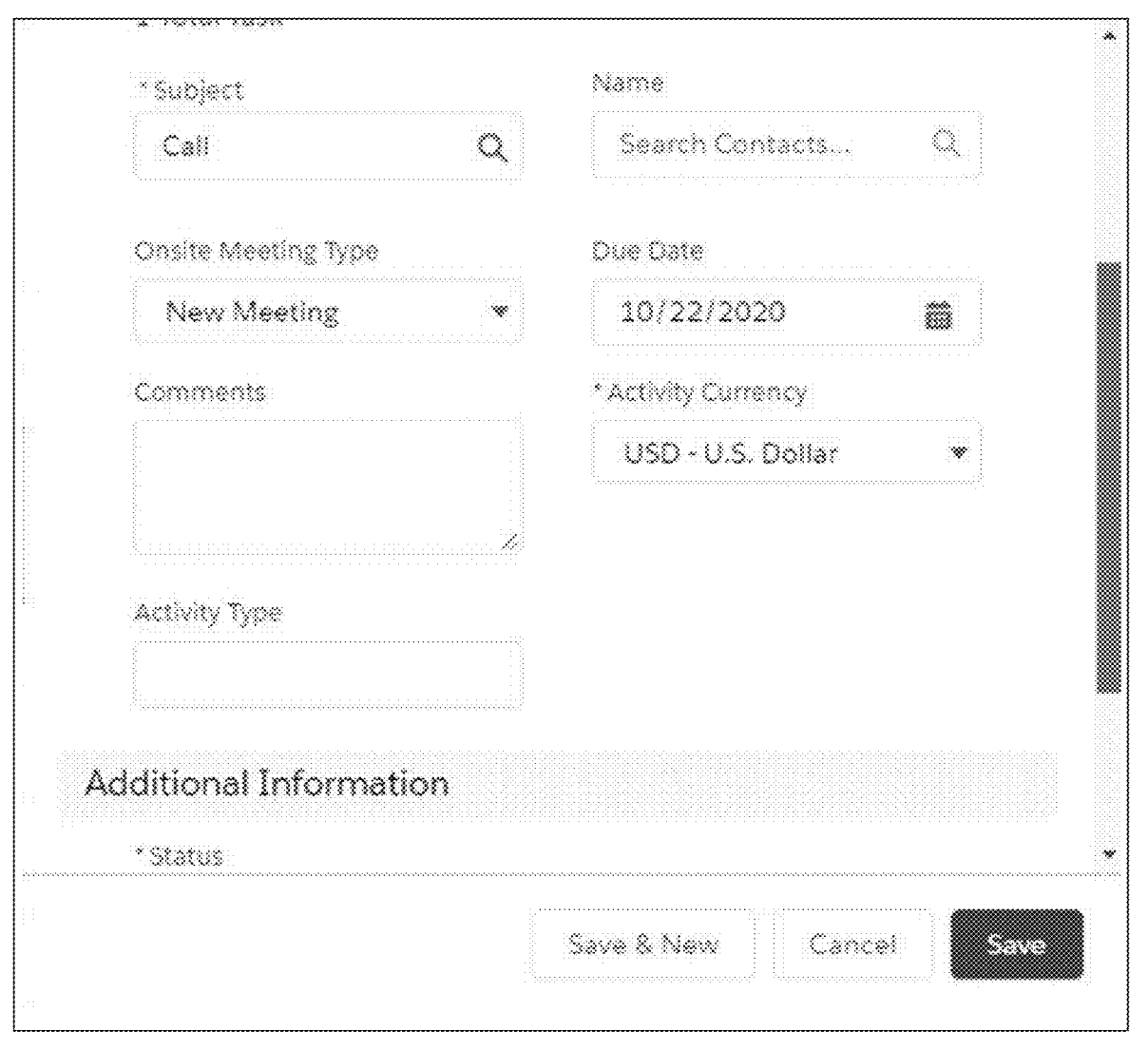

FIG. 9 is another screenshot of the same UI as illustrated in FIG. 7 which is presented at an even lower resolution screen along with window resizing. As can be noted, several of the UI controls such as TEXTBOX "Activity Type" and COMBOBOX "Activity Currency" that were visible in the screen depicted in FIG. 7 are not visible anymore on the screen depicted in FIG. 9. Further, the sizes of various UI controls have become much smaller in FIG. 9 compared to FIG. 7. FIG. 10 is a screenshot of the same UI illustrated in FIG. 9, after a downward scroll has been performed to reveal another portion of the UI, and thus render the another portion of the UI visible. Note that the UI controls of TEXTBOX "Activity Type" and COMBOBOX "Activity Currency" that are not visible in FIG. 9 are now visible in the screen depicted in FIG. 10.

Figure 11:
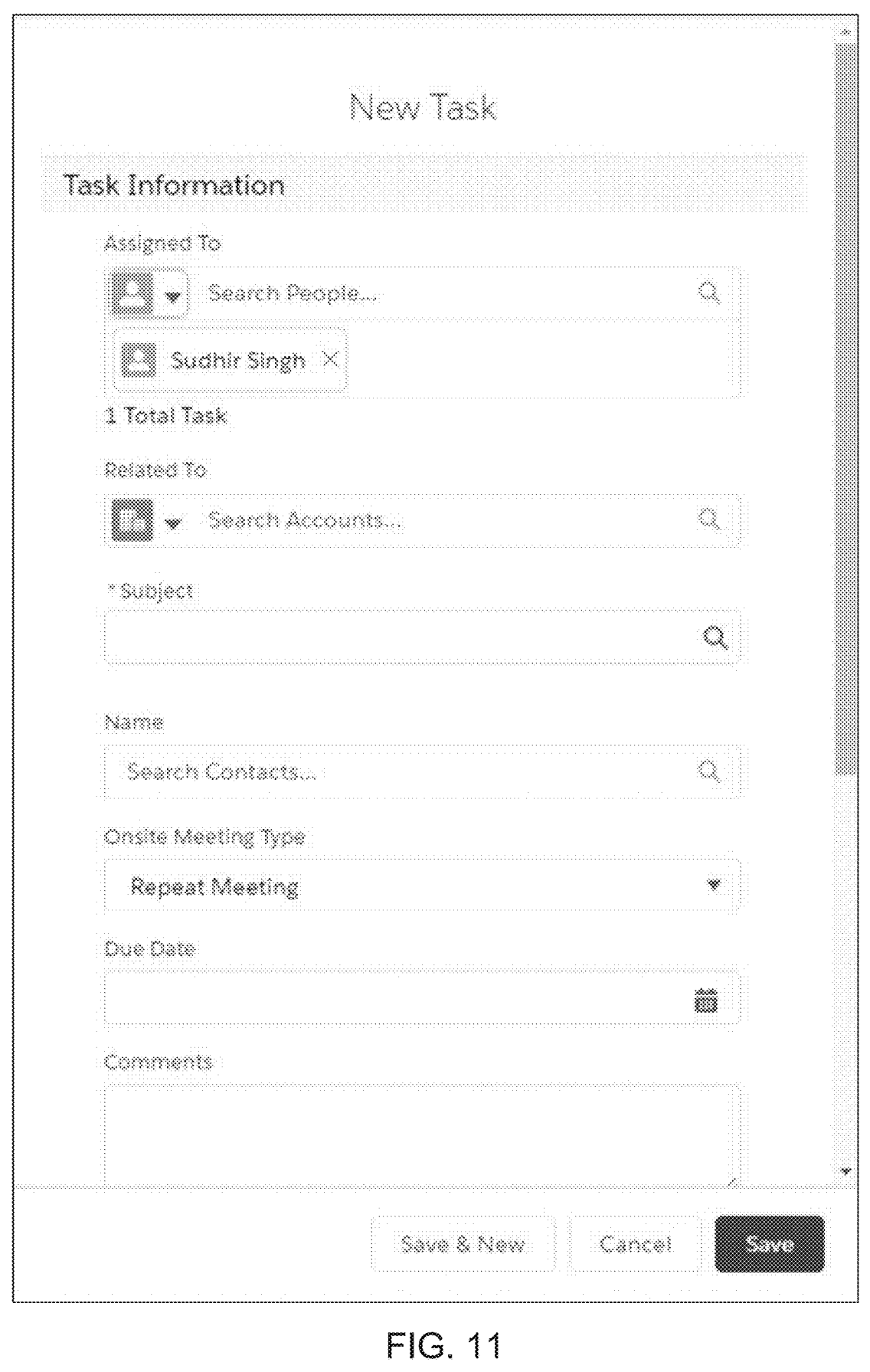
Figure 12:
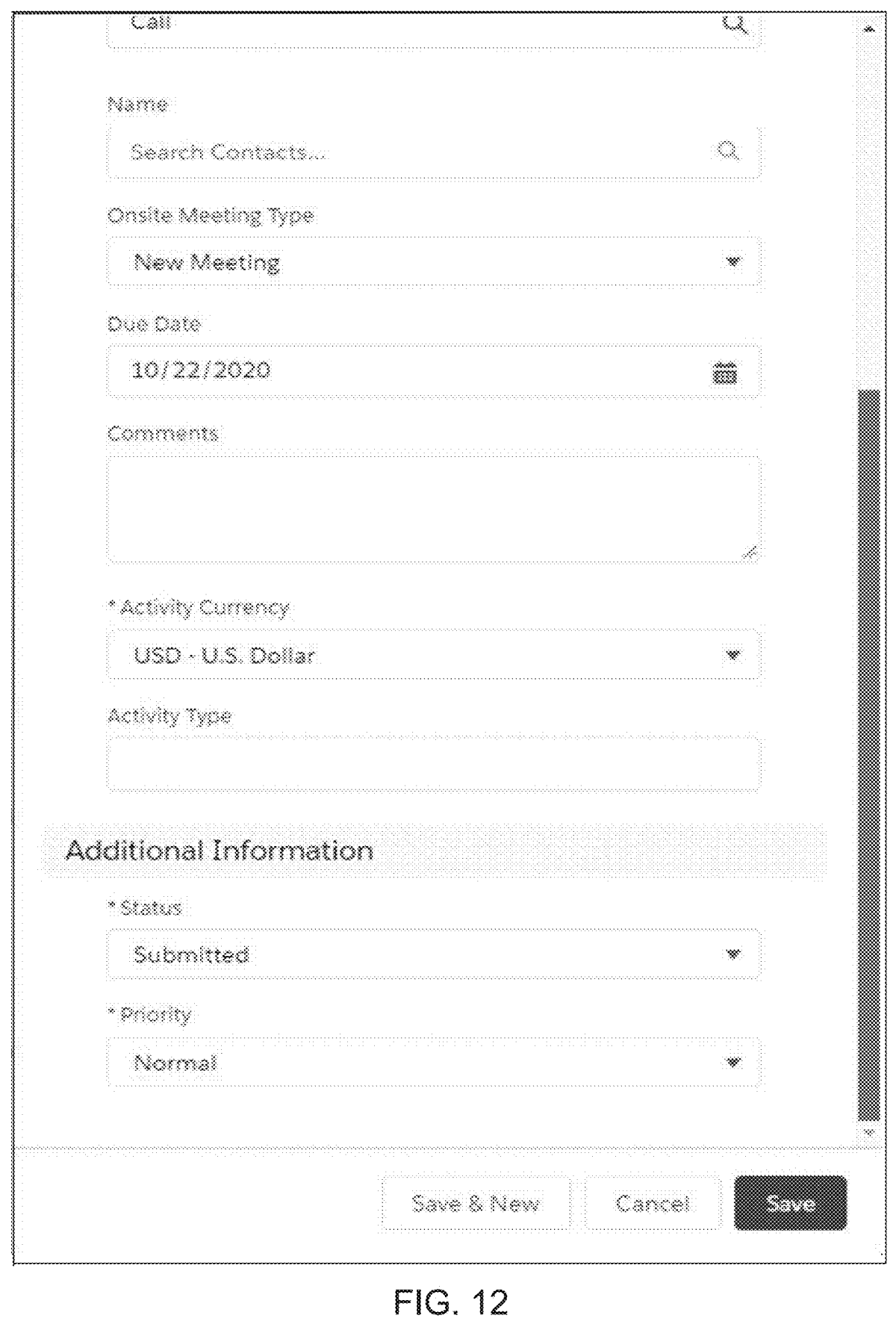

FIG. 11 depicts a screenshot of the same UI captured on the same resolution as FIG. 7 but has a different layout. The layout of the UI in FIG. 11 is a single column layout as compared to a two-column layout in FIG. 7. The different layout can be due to different window sizes for the different screens. Once again, several of the UI controls, such as TEXTBOX "Activity Type" and COMBOBOX "Activity Currency," visible in FIG. 7 are not visible in FIG. 11. Moreover, the geometric arrangement of various controls with respect to each other as shown in FIG. 11 has significantly changed as compared to the original geometric arrangement shown in FIG. 7. FIG. 12 is a screenshot of the same UI illustrated in FIG. 11, after a downward scroll has been performed to reveal another portion of the UI, and thus render the another portion of the UI visible. Note that the UI controls of TEXTBOX "Activity Type" and COMBOBOX "Activity Currency" that are not visible in FIG. 11 are now visible in the screen depicted in FIG. 12.

Figure 13:
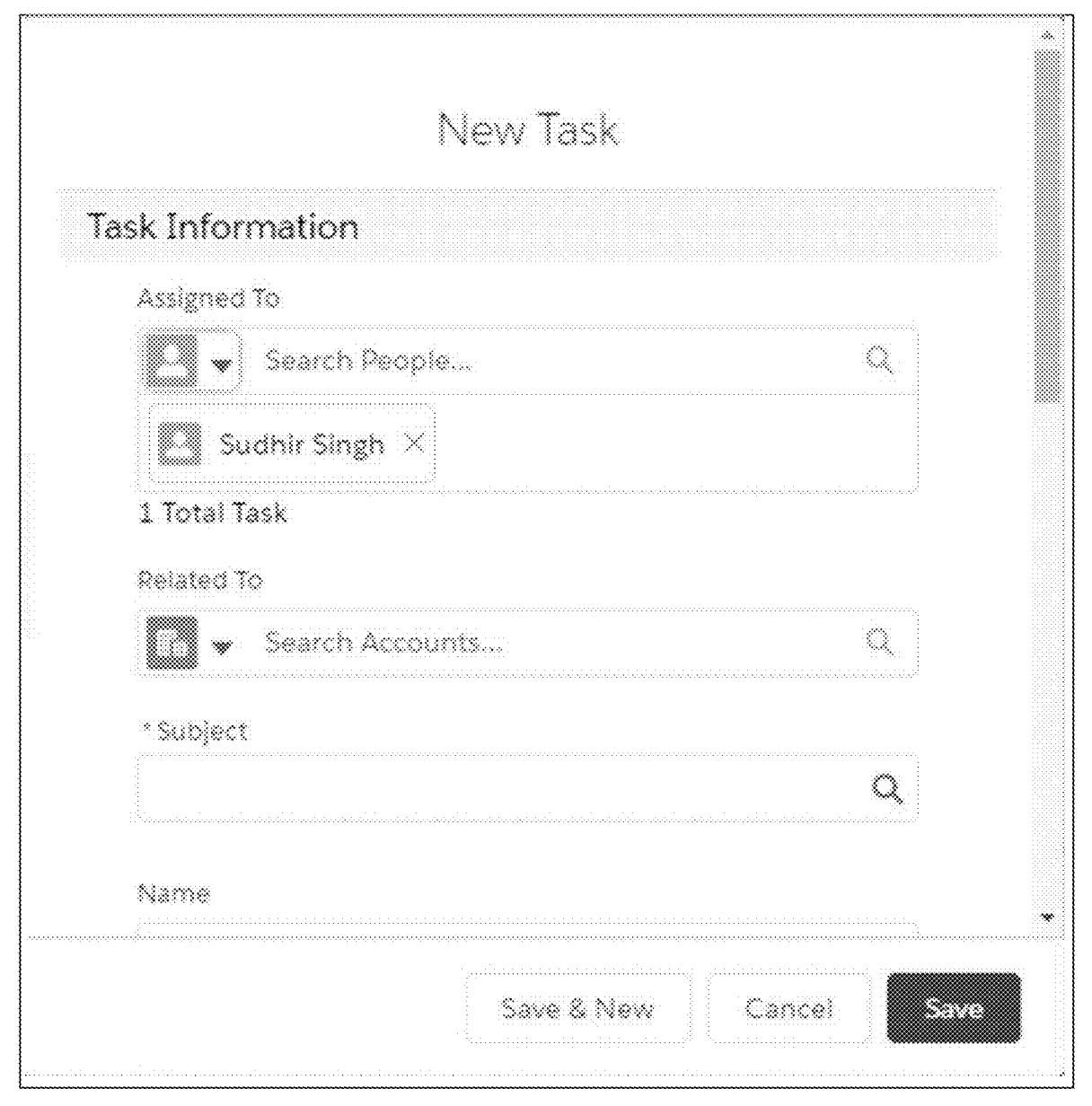
Figure 14:
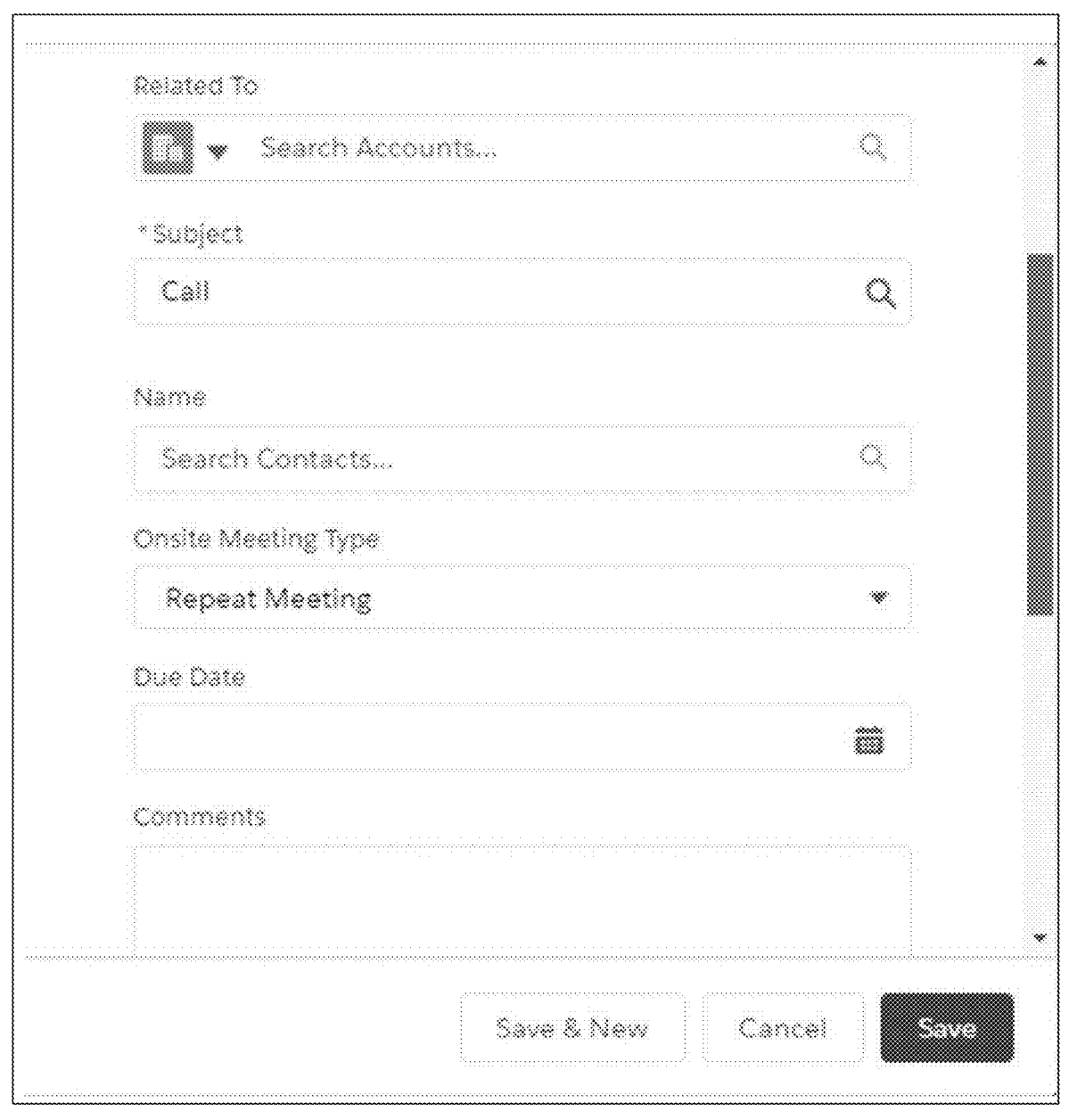
Figure 15:
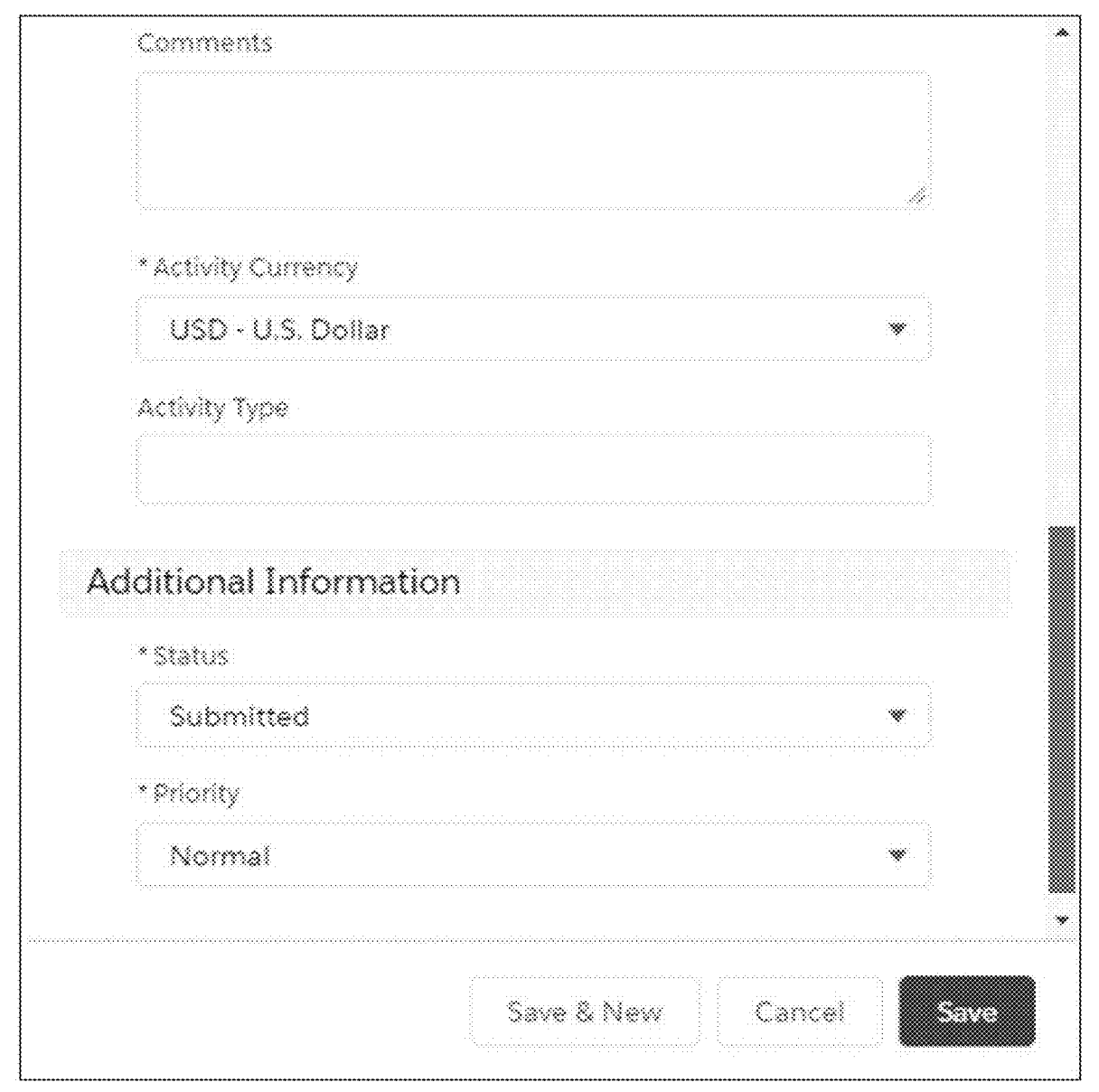

FIG. 13 depicts a screenshot of the same UI captured as FIG. 7 but has not only a lower resolution but also a single column layout, as compared to a two-column layout in FIG. 7. Several UI controls are now not visible and have geometrically dislocated as compared to FIG. 7. FIGS. 14 and 15 illustrate other, different portions of the same UI as depicted in FIG. 13, which can be displayed by successive scrolling downward.

Figure 16:
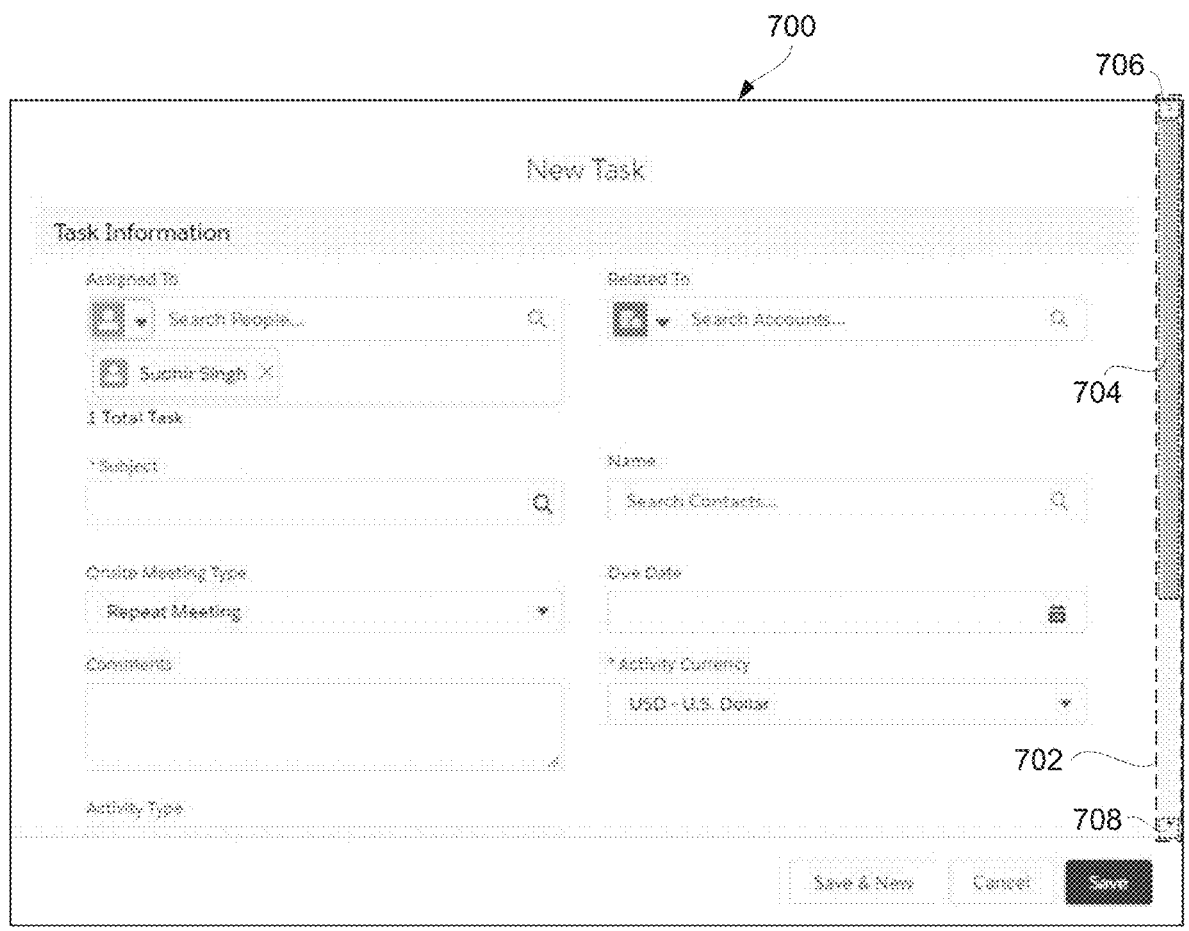
FIG. 16 is a screenshot of screen having a detected scrollbar control, according to one embodiment.

FIG. 16 is a screenshot of screen 700 having a detected scrollbar control 702, according to one embodiment. The screen 700 depicts the same UI as illustrated in FIG. 8. However, as depicted in FIG. 16, the screen 700 depicts the detected scrollbar control 702. By processing operations on a captured UI within the screen 700, the scrollbar control 702 is able to be detected. Additionally, secondary controls (i.e., child controls) or attributes of the scrollbar control 702 can also be detected. In this embodiment, the secondary controls or attributes of the scrollbar control 702 can include a slider bar 704, a scroll-up control 706, and a scroll-down control 708.

Figure 17:
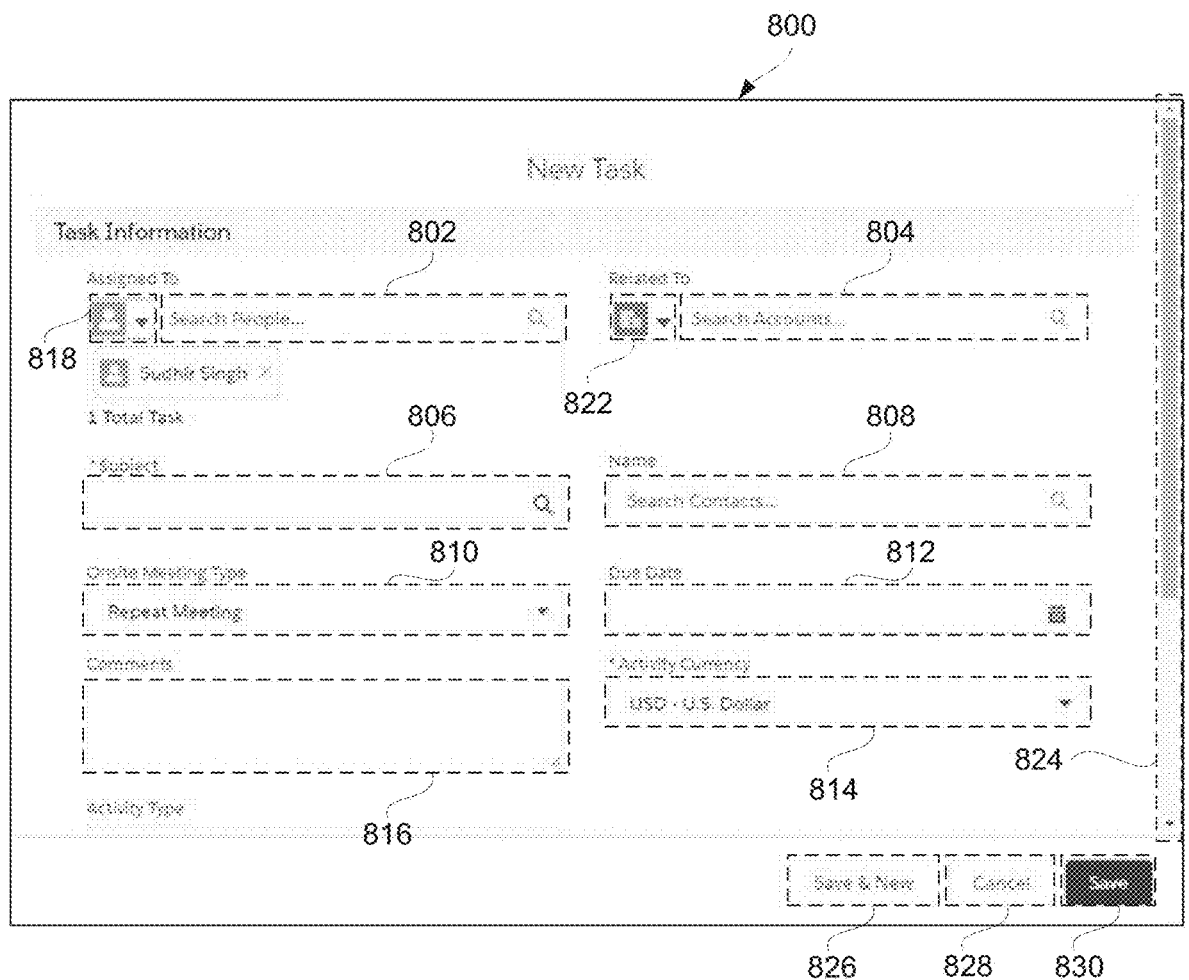
FIG. 17 is a screenshot of a screen having a plurality of detected UI controls, according to one embodiment.

FIG. 17 is a screenshot of a screen 800 having a plurality of detected UI controls 802-830, according to one embodiment. The screen 800 depicts the same UI as illustrated in FIG. 8. However, as depicted in FIG. 17, the screen 800 depicts the plurality of UI controls 802-830 that have been detected. By processing operations on a captured UI within the screen 800, the plurality of detected UI controls 802-830 are able to be detected. As examples, the plurality of detected UI controls 802-830 can include: SEARCHBOX 802, SEARCHBOX 804, SEARCHBOX 806, SEARCHBOX 808, COMBOBOX 810, TEXTBOX 812, COMBOBOX 814, TEXTBOX 816, IMAGE COMBOBOX 818, IMAGE COMBOBOX 822, SCROLLBAR 824, BUTTON 826, BUTTON 828, and BUTTON 830.

Figure 18:
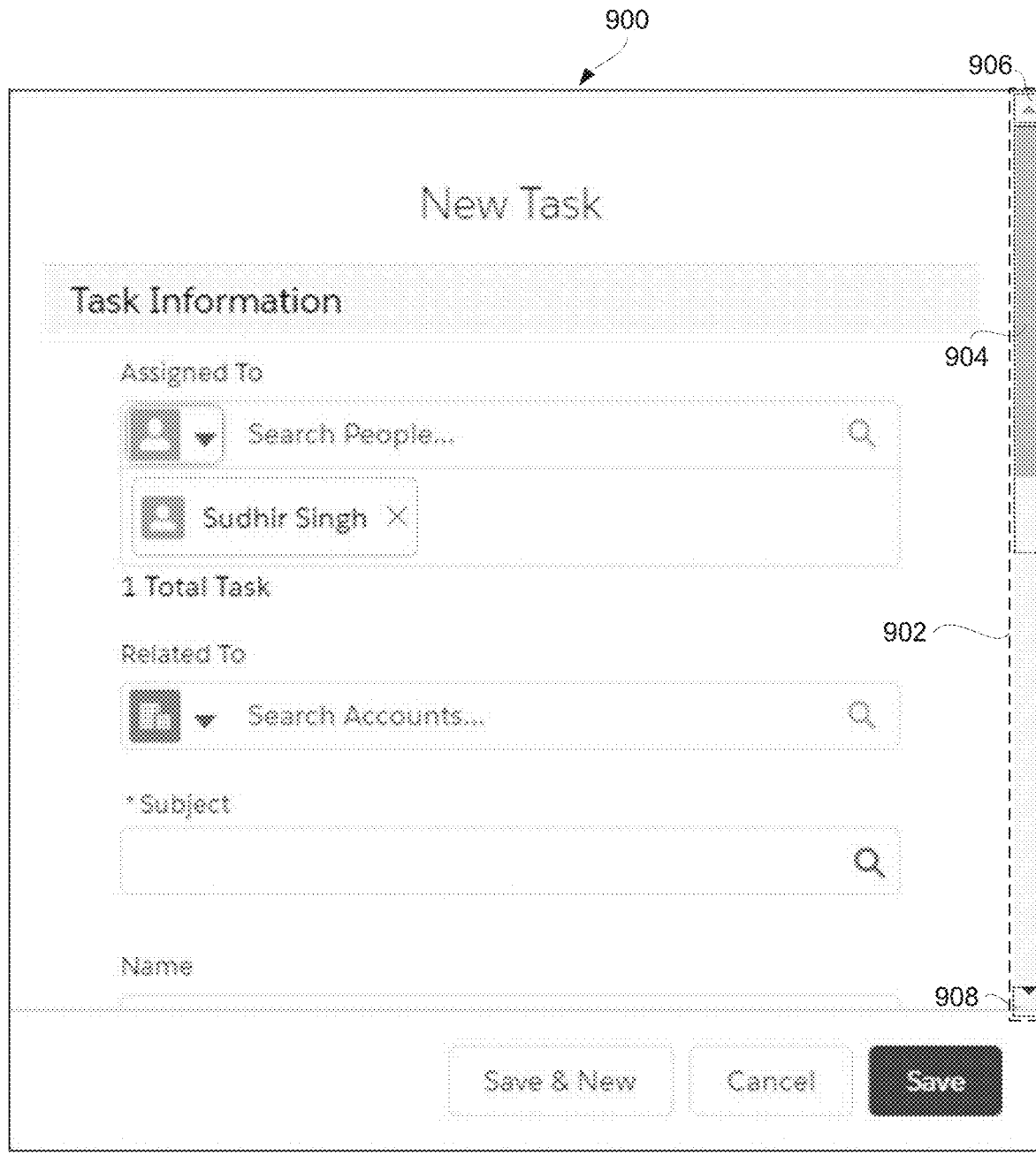
FIG. 18 is a screenshot of screen having a detected scrollbar control, according to one embodiment.

FIG. 18 is a screenshot of screen 900 having a detected scrollbar control 902, according to one embodiment. The screen 900 depicts the same UI as illustrated in FIG. 13. However, as depicted in FIG. 18, the screen 900 depicts the detected scrollbar control 902. By processing operations on a captured UI within the screen 900, the scrollbar control 902 is able to be detected. Additionally, secondary controls (e.g., secondary controls) or attributes of the scrollbar control 902 can also be detected. In this embodiment, the secondary controls or attributes of the scrollbar control 902 can include a slider bar 904, a scroll-up control 906, and a scroll-down control 908.

Figure 19:
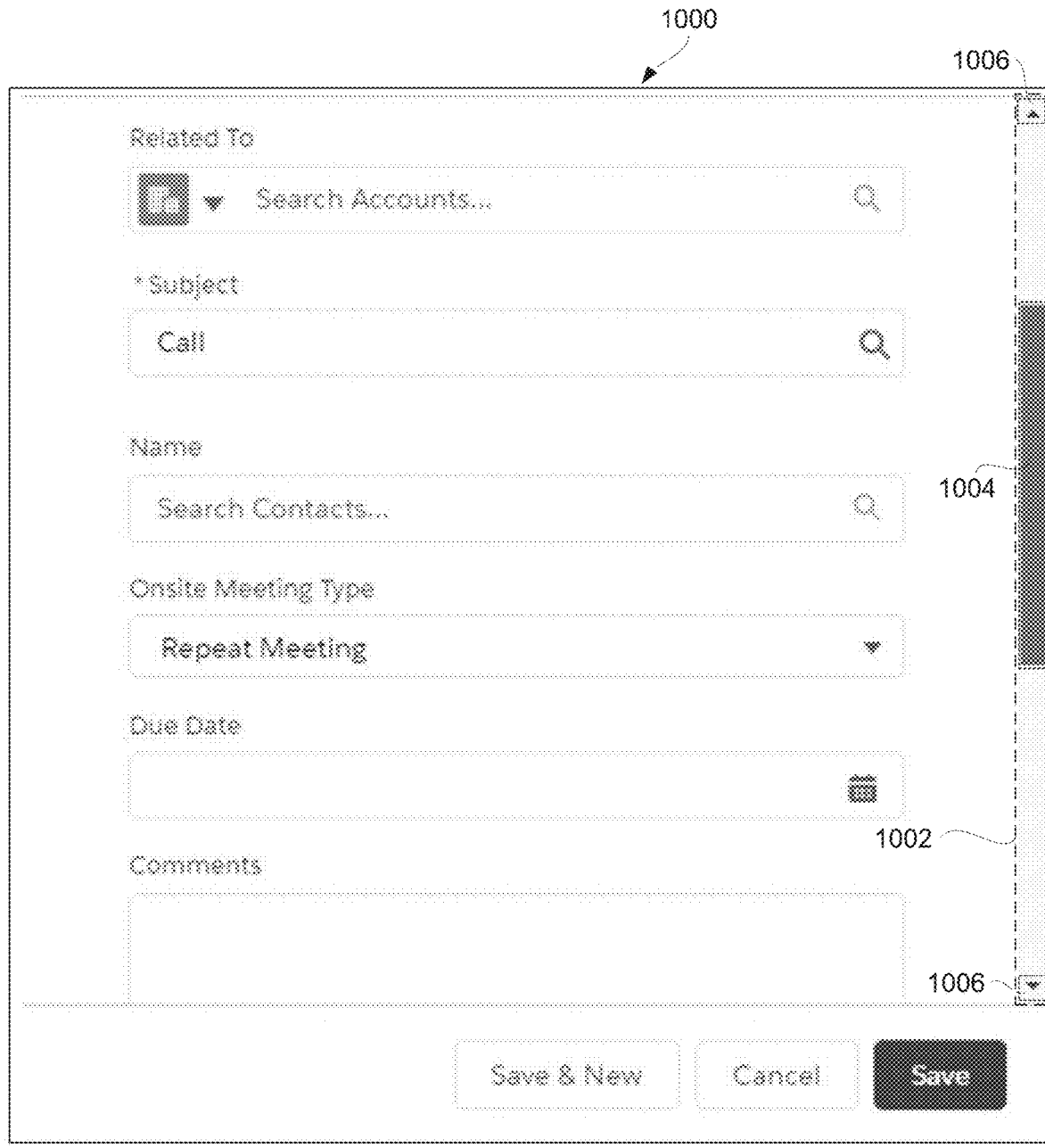
FIG. 19 is a screenshot of another screen having a detected scrollbar control, according to one embodiment.

FIG. 19 is a screenshot of screen 1000 having a detected scrollbar control 1002, according to one embodiment. The screen 1000 depicts the same UI as illustrated in FIG. 14. However, as depicted in FIG. 19, the screen 1000 depicts the detected scrollbar control 1002. By processing operations on a captured UI within the screen 1000, the scrollbar control 1002 is able to be detected. Additionally, secondary controls (e.g., secondary controls) or attributes of the scrollbar control 1002 can also be detected. In this embodiment, the secondary controls or attributes of the scrollbar control 1002 can include a slider bar 1004, a scroll-up control 1006, and a scroll-down control 1008.

Figure 20:
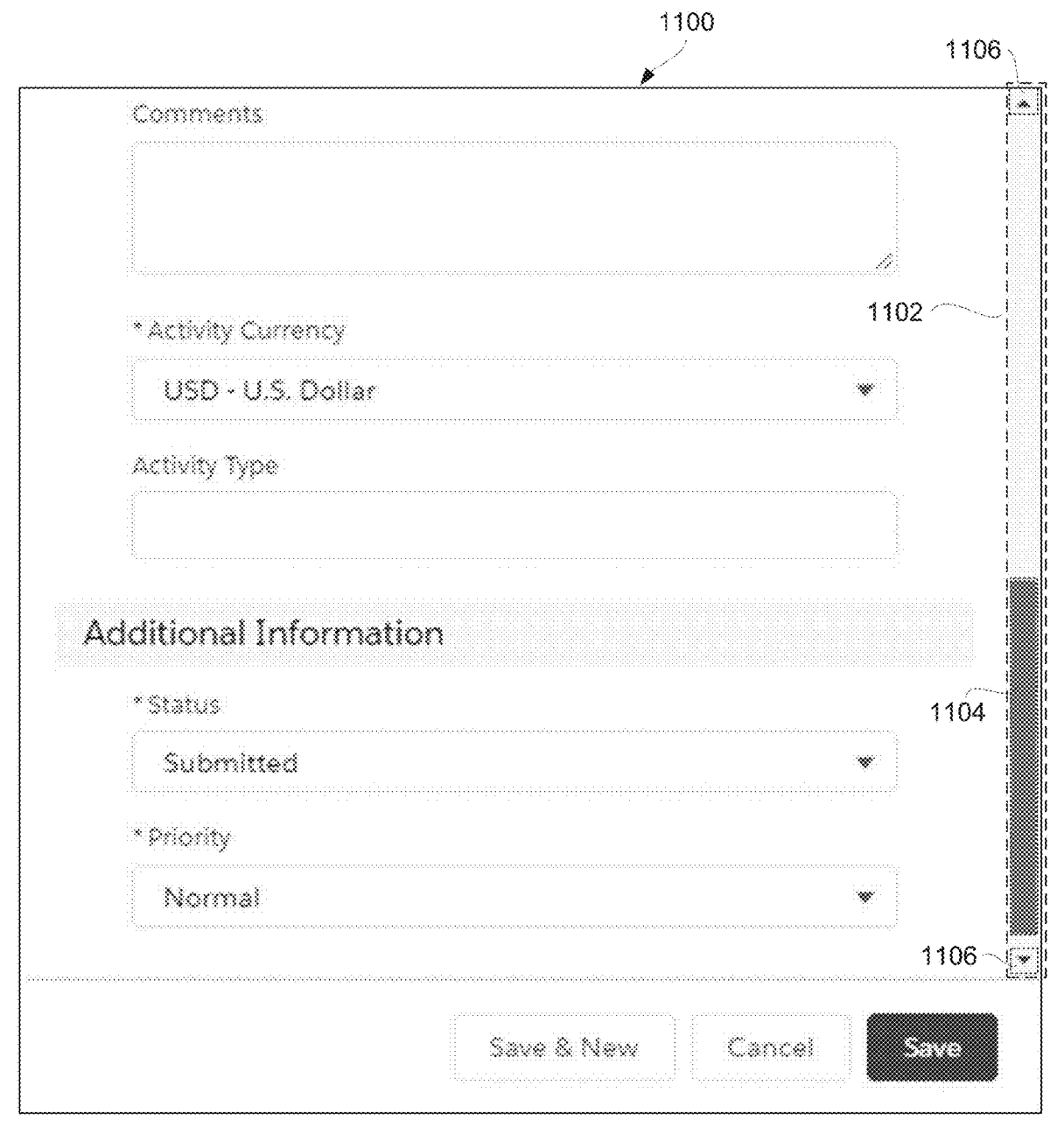

FIG. 20 is a screenshot of screen 1100 having a detected scrollbar control 1102, according to one embodiment. The screen 1100 depicts the same UI as illustrated in FIG. 15. However, as depicted in FIG. 20, the screen 1100 depicts the detected scrollbar control 1102. By processing operations on a captured UI within the screen 1100, the scrollbar control 1102 is able to be detected. Additionally, secondary controls (e.g., secondary controls) or attributes of the scrollbar control 1102 can also be detected. In this embodiment, the secondary controls or attributes of the scrollbar control 1102 can include a slider bar 1104, a scroll-up control 1106, and a scroll-down control 1108.

Figure 21:
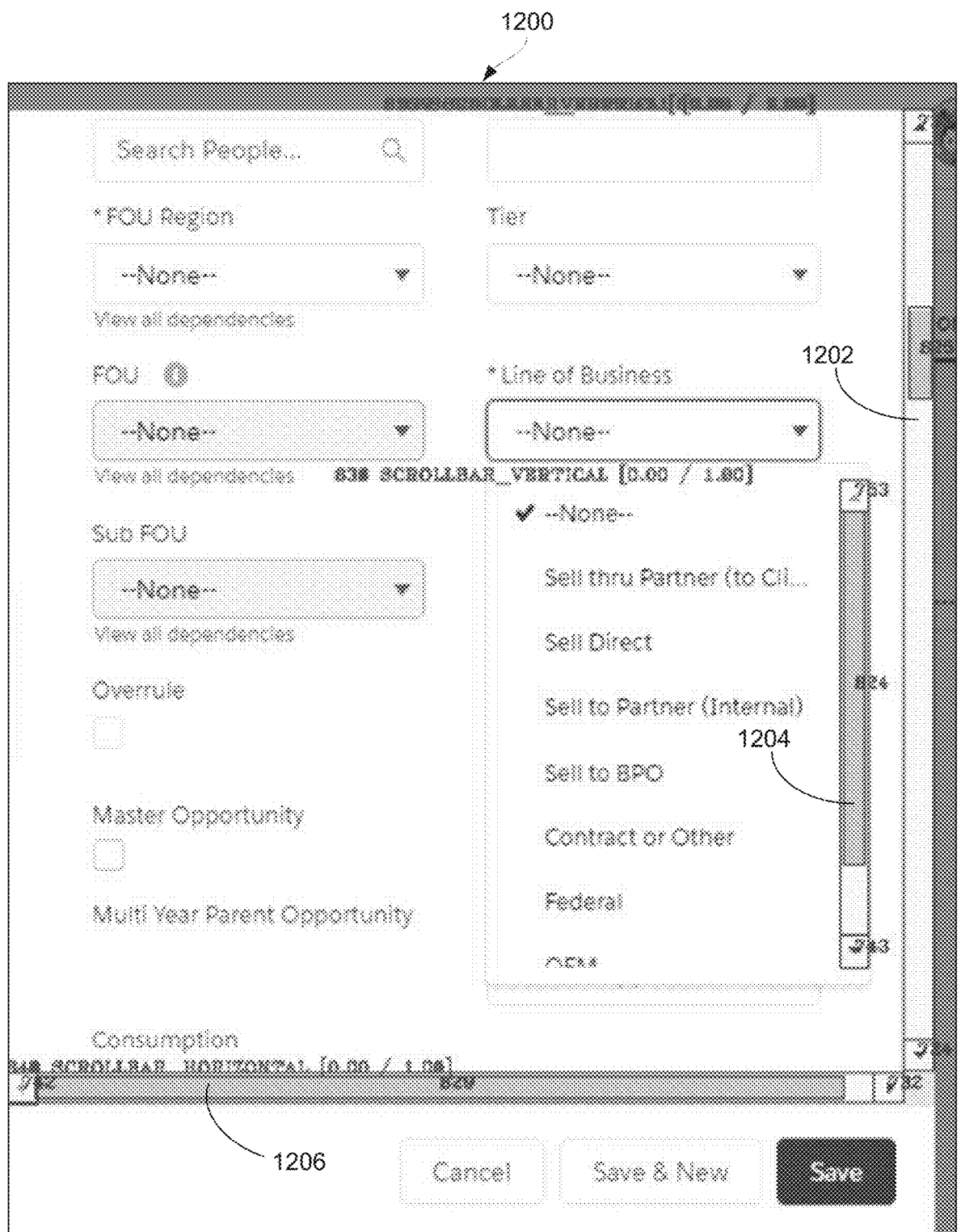
FIG. 21 is a screenshot of screen having a plurality of detected scrollbar controls, according to one embodiment.

FIG. 21 is a screenshot of screen 1200 having a plurality of detected scrollbar controls, according to one embodiment. The screen 1200 depicts various UI controls and labels. In particular, the UI controls include three scrollbars that are depicted from an image of the screen. The three detected scrollbars include (i) a first vertical scrollbar 1202 at a right edge of the screen, (ii) a horizontal scrollbar 1204 at a bottom edge of the screen, and (iii) a second vertical scrollbar 1206 at an interior position and dynamically provided as a dropdown list when the COMBOBOX "Line of Business" is expanded.

Figure 22:
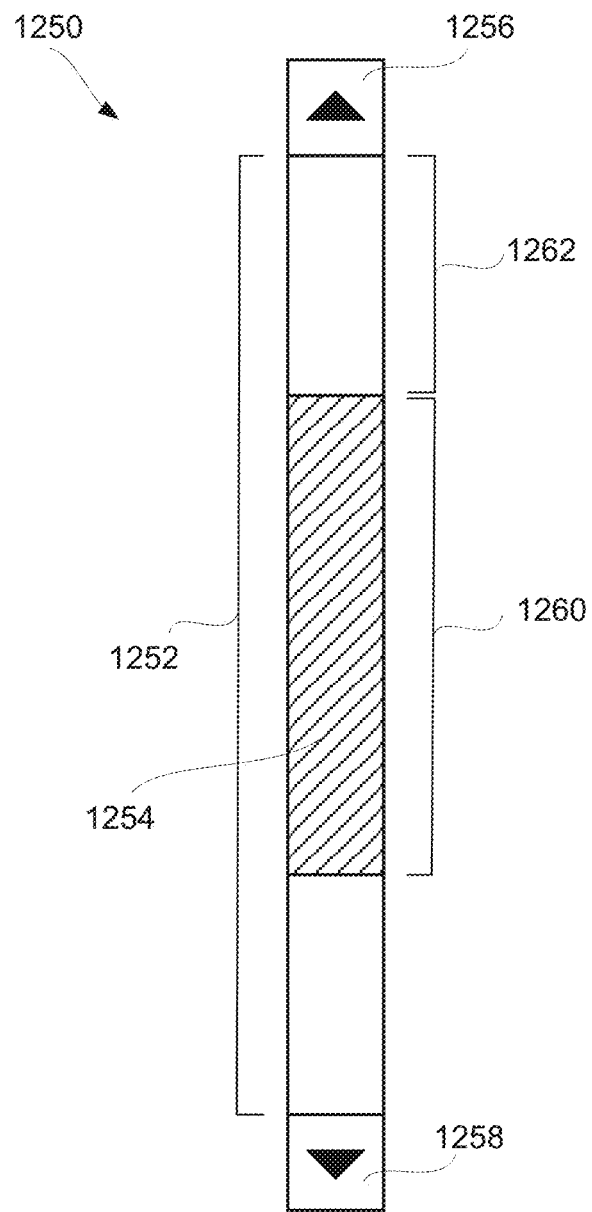
FIG. 22 illustrated a representative scrollbar according to one embodiment.

FIG. 22 illustrated a representative scrollbar 1250 according to one embodiment. The scrollbar 1250 includes a scrollbar area 1252, a slider bar 1254 configured to slide along the scrollbar area 1252, a scroll-up control 1256, and a scroll-down control 1258. The slider bar 1254 has a slider area 1260. The slider area 1260 represents a portion of the scrollbar area 1252. The ratio of the slider area 1260 to the scrollbar area 1252 indicates an amount of the UI that is visible in a screen being depicted. This allows the system to understand an amount of scrolling that is available. Additionally, a bar offset 1262 can be determined. The bar offset 1262 allows the system to understand which direction(s) the slider bar 1252 can be moved to affect a scrolling action.

Advantageously, when a UI control that is necessary to perform the next action in an automation flow (i.e., the expected control) is not visible in UI screenshot of a current playback step, the system can automatically choose an amount and direction of a vertical or horizontal scroll to adjust the UI screen such that the expected control becomes visible. For example, by scrolling the vertical scrollbar down to the next page, the TEXTBOX "Activity Type" which was not visible in FIG. 8 would become visible. As another example, in case of a different transformation of the same recording shown in FIG. 13, it takes scroll down by two pages to render that TEXTBOX visible, as shown in FIG. 15.

During this scrolling procedure, the system can utilize a control detection to identify currently visible controls. In addition to detecting standard controls, such as TEXTBOX, COMBOBOX, TEXT BUTTONS, CHECKBOX and RADIO BUTTON, also detected are scrollbars and their child controls which can be used to perform scrolling. This detection can either be part of the same control detection as used to detect the standard controls or can be a separate model that detects the scrollbars and their child controls. To effectuate a scrolling action, the child controls of a scrollbar include one or more handles that can be selected (e.g., clicked on) and the bar can be dragged.

Further, there can be multiple scrollbars as part of a UI screenshot with any combinations of vertical and horizontal scrollbars. The scrollbars might be external or edge scrollbars that move the whole application window or internal scrollbars that move only a subpart of the application window (e.g., a list in a COMBOBOX). Depending on the expected control and action, one or a combination of scrolling movements can be computed and performed. Furthermore, a scrollbar may appear only upon certain action.

As previously noted, control detection can also detect scrollbars. In such case, detection output can also include a state of scroll using 'current_page' and 'num_pages' to indicate a current location of the scrollbar and a number of scrollable pages, respectively. In one embodiment, bounding box geometries of the scrollbar and its children are used to compute the value of these parameters. The axis having the longest side of the scrollbar is considered the active axis so if it is a vertical scrollbar the active axis is y-axis and if it is a horizontal scrollbar the active axis is x-axis. In one embodiment, three quantities can be calculated along this active axis: (i) handle-to-handle distance which measures the length where the bar can actually move across, i.e., from the end of the starting handle (left or up) to the beginning of the ending handle (right or down); (ii) bar length which is simply the length of the actual bar (height if active axis is y and width if active axis is x; and (iii) the bar offset which is the distance in pixels from the end of the starting handle to the start of the bar along the active axis. These quantities are depicted in FIG. 22 for a representative scrollbar. Once these three values are calculated, the total number of scrollable pages can be computed as the ratio of handle-to-handle distance to bar length, and the current bar position can be computed as the ratio of bar offset to bar length.

Once the scrollbars, their children and their respective locations and current scroll positions are computed, one or more of: the geometry of currently visible controls, the geometry of expected controls from recording, and the expected geometry of controls for next automation steps can be used to determine an amount of scroll and perform the scroll. In one embodiment, the relative direction of the next control (i.e., the control needed to complete the next/intended action) from the top most control, bottom most control, left most control and right most control can be computed and the direction of the most proximate is chosen as the direction for a scroll (up, down, left or right). The amount of scroll can be determined in various ways. In one implementation, a shortest distance to visualize the expected control can be computed and used to determine the amount of scroll. Alternatively, in another implementation, a page-based scroll can be performed in the computed direction. In another implementation, a search can be started from the beginning of the page and a scroll can be performed one page at a time. In yet another implementation, when performing a scroll in computed direction and where the computed scroll amount still does not make the targeted control visible, a page by page scroll can then be employed.

For further illustration, one example of associating controls to labels (or other controls) as well as scrolling to effect improved ability to execute an exemplary software automation process is detailed below. This example is non-limiting and for explanatory purposes. In this regard, consider the following exemplary software automation process, which is referred to as a bot for this example, that includes six (6) previously recorded actions using the UI illustrated in FIG. 7.

Action 1: Text entry in the SEARCHBOX for "Subject"
Action 2: Text entry in the SEARCHBOX for "Name"
Action 3: Text entry in the calendar picker TEXTBOX for "Due Date"
Action 4: Selection from the list of currencies in COMBOBOX for "Activity Currency"
Action 5: Text entry in the TEXTBOX for "Activity Type"
Action 6: Click on the "Save" BUTTON Later, as the system runs (i.e., plays back) this bot in the screen/window context of FIG. 13 which has a much lower resolution compared to when the bot was recorded, and also has a single column layout as compared to the two-column layout when the bot was recorded. When the bot runs, the bot sees the UI screen of FIG. 13 where the UI control needed for the Action 1 (i.e., SEARCHBOX for "Subject") is visible and it can perform that action. However, the next intended action, Action 2, needs a UI control SEARCHBOX for "Name". But that UI control is not presently not visible on this UI screen depicted in FIG. 13. Here, the system can decide that it needs to scroll to alter the UI screen. Therefore, the system can detect scrollbars available within the UI screen, and then find a vertical scrollbar and its children as shown in FIG. 18. From the relative geometry and arrangement of controls that was captured during recording, the system can determine that the "Name" SEARCHBOX is likely to be found on the right of the "Subject" SEARCHBOX but since there is no horizontal scroll possible its more likely to find it down the page (i.e., at a lower portion of the UI) as the detected vertical bar is currently at the start of the page (i.e., at a top portion of the UI). Since the expected control was also expected to be very close to the bottom of the screen depicted in FIG. 13, the system might determine to perform vertical scroll down by just half a page. This alters the UI screen to that visible portion of the UI shown in FIG. 14. Then, after performing control detection on the altered UI screen, the system can find the "Name" SEARCHBOX and thus the expected control and can then perform the Action 2 correctly. On the same UI screen, the system also finds the UI control needed for the next action, that is, the calendar picker TEXTBOX for "Due Date" to perform Action 3. The system can then perform Action 3 correctly. However, the UI control needed for Action 4 is "Activity Currency" COMBOBOX for Action 4, is not yet visible within the UI screen depicted in FIG. 14. The system can then detect a vertical scrollbar and its children and recognize that it is already scrolled halfway through the screen as shown in FIG. 19. Using logic based on the geometrical arrangement of the UI controls when the bot was recorded, expected UI controls and their relationship from last performed scroll (e.g., "Name" control was on the right of "Subject" and it was found below it in the playback layout), the system might determine to perform a scroll down by one page which takes it to the end of the page (i.e., at a bottom portion of the UI) in this case. As a result, the UI screen that is then visible is as shown in FIG. 15. The system can then perform control detection on this UI screen and can find the expected control "Activity Currency" COMBOBOX and then perform the action correctly. The controls needed for next two actions, i.e., Action 5 and Action 6, are also visible on this same UI screen and thus the bot can also perform those actions correctly.

As noted above, another aspect disclosed herein is an improved ability to detect controls of a UI, including scroll bars, within a visual screenshot of the UI through use of visual associations that are recorded on creation of a software automation process (i.e., bot) and then later used during playback to location the correct UI controls within the visual screenshot of the UI. These visual associations enable the system to more accurately locate controls within a screenshot of the UI on playback, and thus permits the software automation process to be more reliable and resilient in its usage. These associations can be referred to as anchoring, or smart anchoring.

Many UI controls are of the same type and look the same visually. Hence, detecting UI controls from a visual screenshot can be challenging. Additionally, UI controls during playback may further be confused with a different control during recording due to any one or more of a variety of transformations to UIs discussed above. For example, there is not much visual difference between the two COMBOBOXes names "Onsite Meeting Type" and "Activity Currency" in FIG. 7 other than the pre-selected text entries whose values may change from playback to playback. Further, these two COMBOBOXes can be substantially resized when the UI is transformed into a different layout, such as shown in FIG. 10. Regardless, the system needs to correctly map UI controls at time of playback in order to perform the correct action requested by the bot. Accordingly, the system disclosed herein operates to represent UI controls using a representation that is robust to a variety of transformations, such as resolution, window size, embedding into a larger window, geometric layout change, or combinations thereof. The representation uses additional associations, which provide anchoring.

Each UI control is "anchored" during recording and playback using text nearby and/or using geometry of neighboring controls. The UI controls with their type and bounding box geometry can be obtained from control detection used to detect them as well as pixel details available from the corresponding image (i.e., screenshot) of the UI screen. The text within the UI screen (i.e., within an image of the UI screen) can be extracted via an OCR engine or can be detected through text detection, a combination thereof. These anchor-control pairs from recording and playback can be mapped appropriately using matching logic that accounts for the actual text values of the anchors (e.g., labels), and types and geometries of the targeted UI controls. The matching logic can consider text, type or geometry of their neighboring controls.

At the start of the anchoring process, a set of UI controls have been detected using a control detection and a set of UI labels have been detected using a text detection and/or an OCR engine. For each detected UI control, there are also a few associated parameters, such as type, state, bounding box coordinates, etc. Similarly, for each detected UI label, there are also a few associated parameters, such as its actual text value and the bounding box coordinates and additionally the bounding box geometry for each character in the label.

Figure 23:
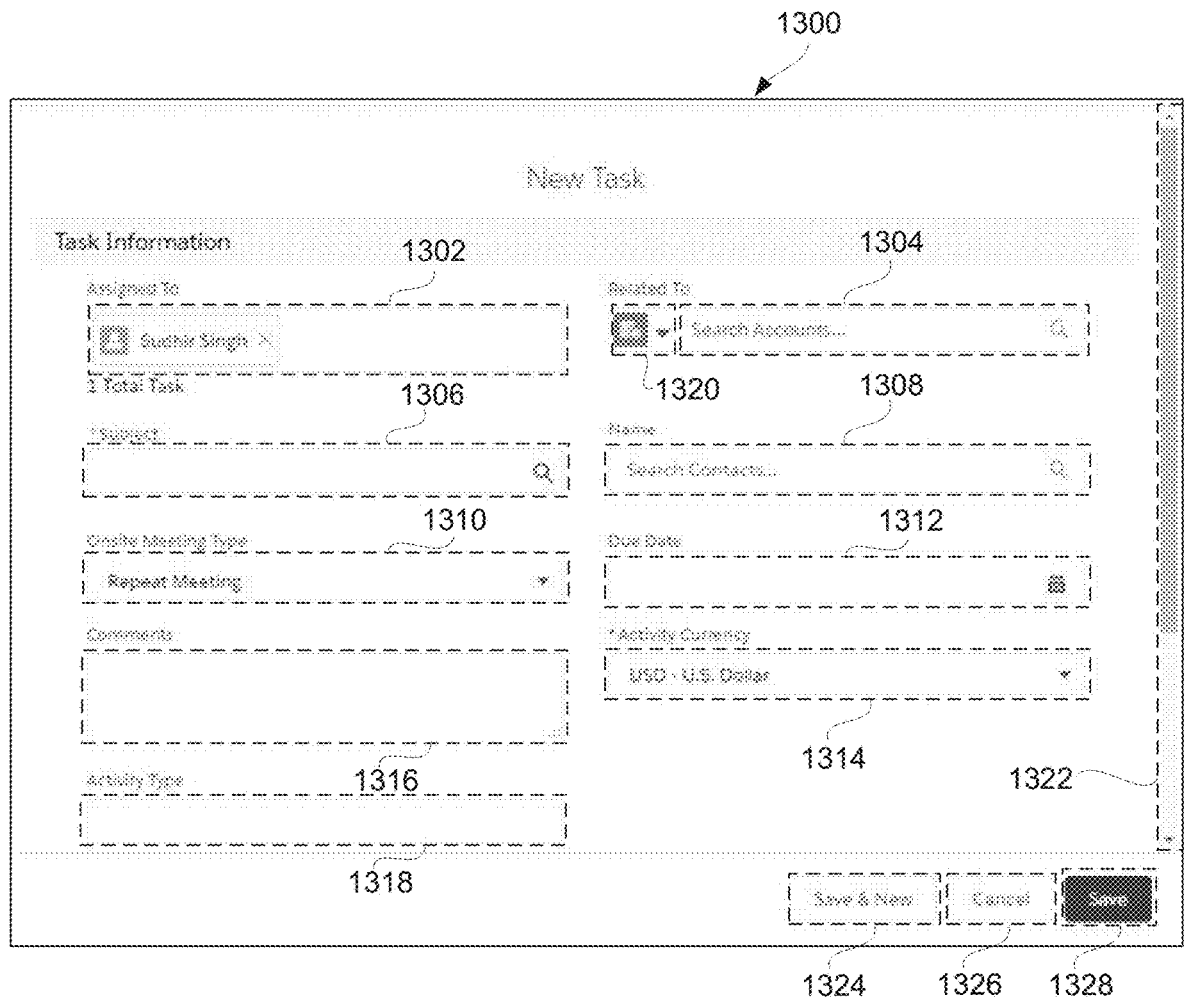
FIG. 23 is a screenshot of screen having various detected UI controls indicated, according to one embodiment.

FIG. 23 is a screenshot of screen 1300 having various detected UI controls indicated, according to one embodiment. The screen 1300 depicts the various detected UI controls for the UI screen in FIG. 7. The various detected UI controls include TEXTBOXES 1302-1308, COMBOBOX 1310, TEXTBOX 1312, COMBOBOX 1314, TEXTBOXES 1316 AND 1318, IMAGE COMBOBOX 1320, SCROLL-BAR 1322, and BUTTONS 1324-1328. Each of the detected UI controls has associated parameters.

Figure 24:
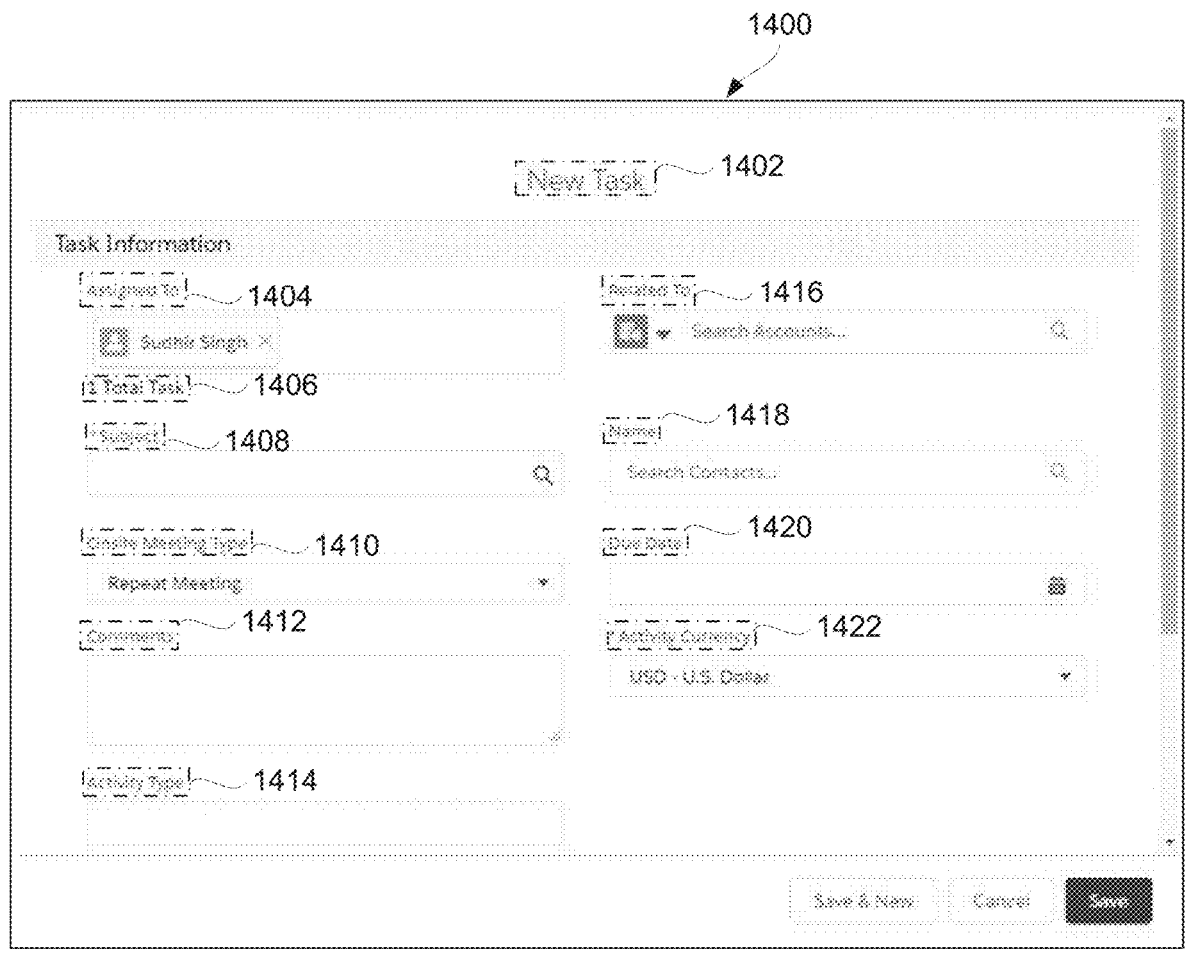
FIG. 24 is a screenshot of screen having various detected UI labels indicated, according to one embodiment.

FIG. 24 is a screenshot of screen 1400 having various detected UI labels 1402-1422 indicated, according to one embodiment. The screen 1400 depicts the various detected UI labels 1402-1422 for the UI screen in FIG. 7. Each of the detected UI labels has associated parameters.

According to one embodiment, anchoring can use these detected UI controls and UI labels and compute a proximity between each pair of UI controls and UI labels. For each UI control, a set of top-ranked UI labels can be selected in each direction as per their distance values in that direction from the UI control's bounding box for each of a set of pre-defined directions.

Figure 25:
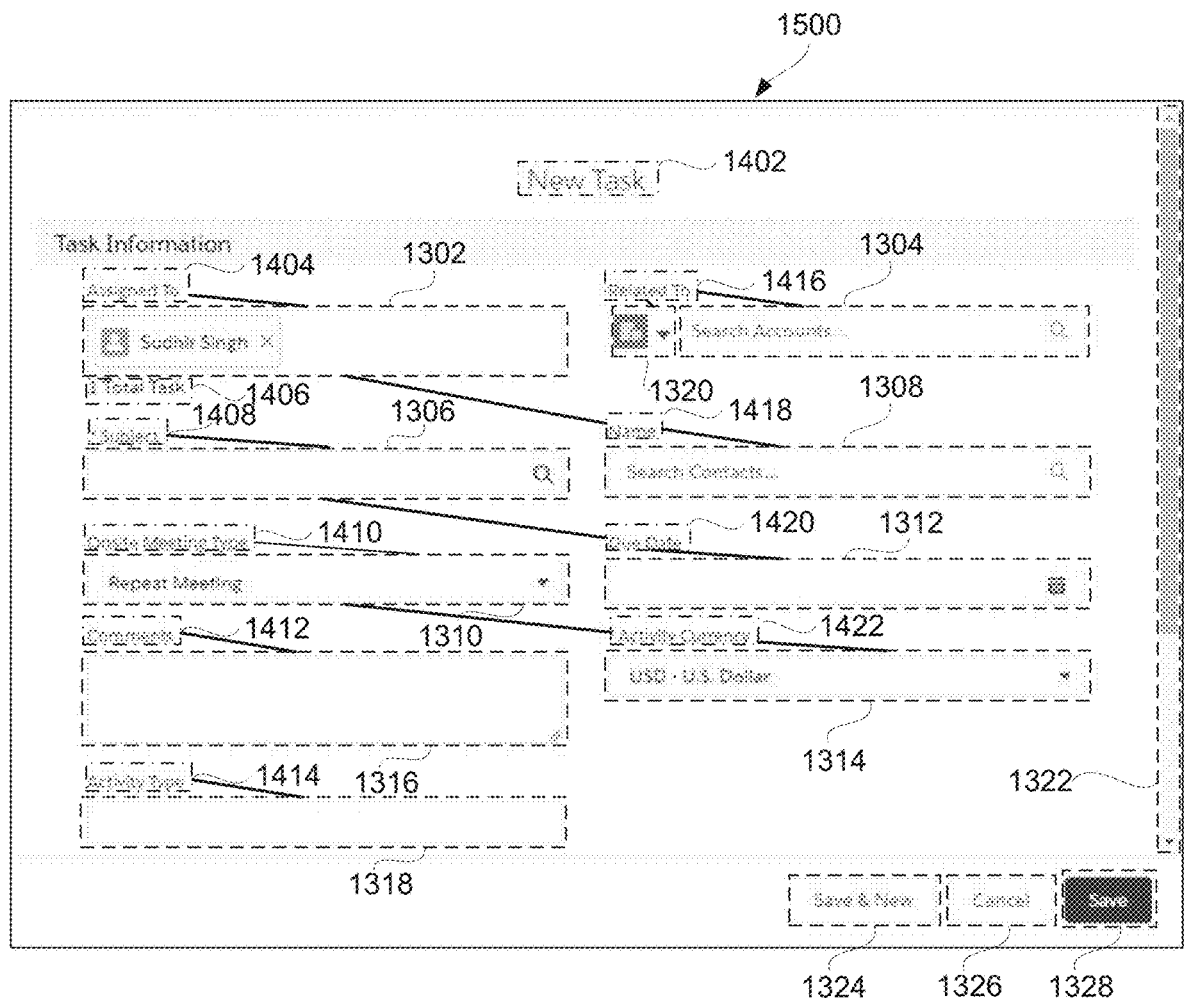
FIG. 25 shows such an exemplary proximal mapping of UI labels from FIG. 25 to UI controls from FIG. 23.

FIG. 25 shows such an exemplary proximal mapping of UI labels from FIG. 25 to UI controls from FIG. 23. As shown in FIG. 25, the label 1404 can be used as an anchor for the TEXTBOX 1302. While the label 1418 is another potential anchor for the TEXTBOX 1302, the label 1404 is closer and position in a more preferred direction (e.g., top). The label 1416 can be used as an anchor for the TEXTBOX 1304. Similarly, the other detected UI controls can be associated with the detected labels, for purposes of establishing anchors.

Each UI control may also have a pre-defined preference for UI label directions. For example, a label on the right may be preferable to a label on top or bottom for a control type "CHECKBOX", whereas a label to left or top may be preferable for a TEXTBOX. Based on the distance values and directional preferences, a set of proximal or preferred UI labels can be computed for each UI control, and a proximal UI label for a UI control can be selected based on a weighted score of proximity and direction.

In one embodiment, anchoring can also use alignment between neighboring UI controls to tune a preferred UI label mapping direction for a UI control. Neighboring UI controls which are either vertically or horizontally aligned can be grouped together and assigned a preferred direction based on the majority of their proximal UI labels.

Figure 26:
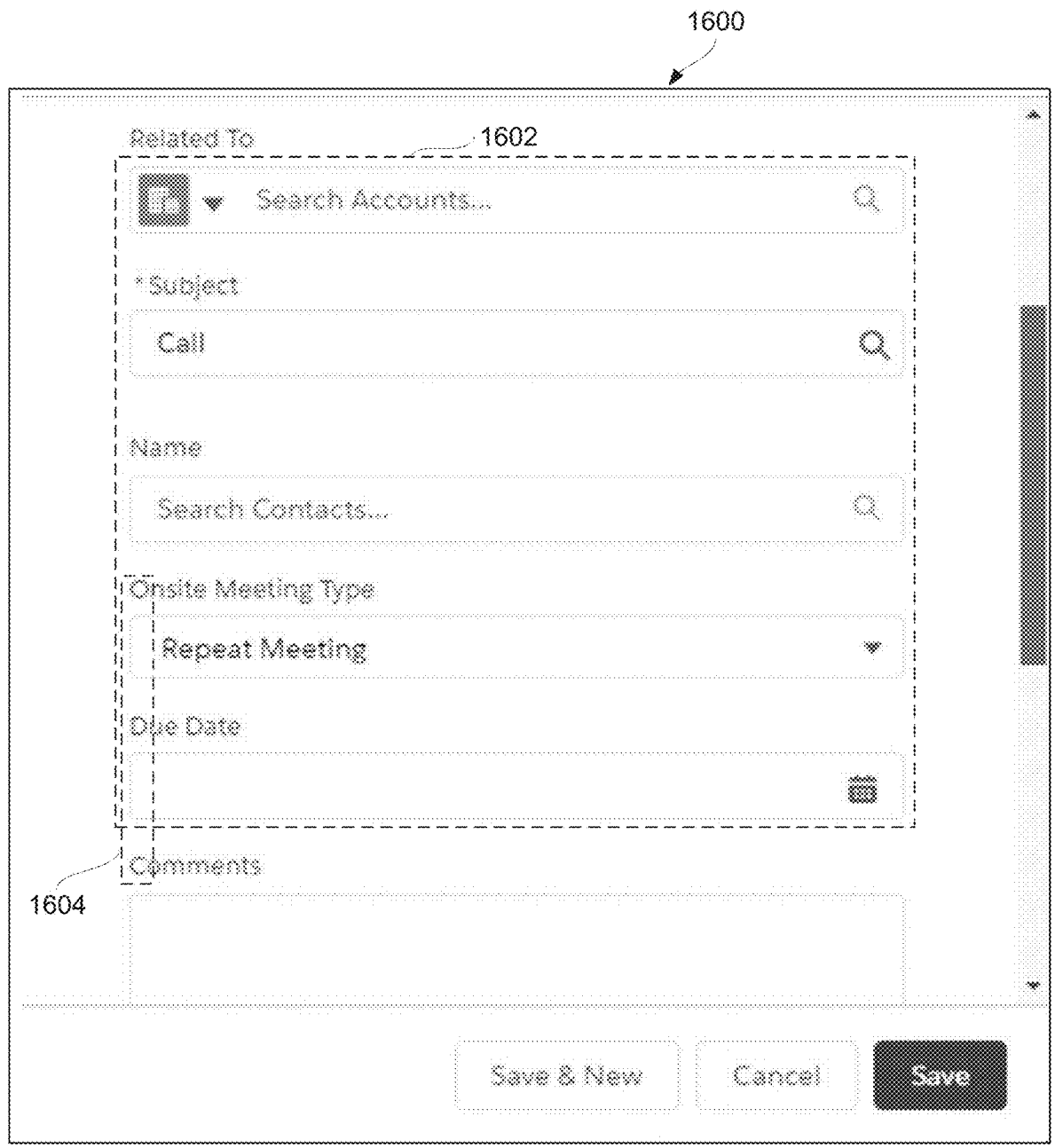
FIG. 26 is a screenshot of screen having various detected UI controls indicated, according to one embodiment.

FIG. 26 is a screenshot of screen 1600 having various detected UI controls indicated, according to one embodiment. The screen 1600 depicts an example of grouping of controls and preferred direction for proximal UI labels improved by grouping. The screen 1600 denotes an example of a control grouping and preferred direction selection. Additionally, a similar alignment and grouping for UI labels can be employed. In FIG. 26, a control grouping 1602 can establish an alignment of UI controls, and a label grouping 1604 can establish an alignment of UI labels.

The set of proximal UI labels for each UI control and any group preferences can be used to compute a set of final anchors for that UI control. In one embodiment, this set can be obtained by revising the set of proximal UI labels and pruning away or de-ranking the UI labels that are not consistent with the control group that the control belongs too.

Figure 27:
FIG. 27 illustrates a sets of proximal UI labels for the UI controls, according to one embodiment.

FIG. 27 illustrates a screenshot of a screen 1700 illustrating a set of proximal UI labels for the UI controls, according to one embodiment. The screen 1700 depicts an example of a set of proximal UI labels for UI controls along with control grouping and preferred proximal label direction improved by grouping. The screen 1700 depicts UI controls 1702-1710, which are RADIO BUTTON controls, that are detected. The screen 1700 also depicts UI labels 1712-1722 that are detected. For example, the topmost RADIO BUTTON 1702 might have initially been associated with a wrong topmost proximal UI label 1712 with text "Select a record type". However, the five UI controls 1702-1710 form a control group of RADIO BUTTONS which are aligned vertically and have "right" as a preferred direction for mapping labels. As a result, in one embodiment, the system can correct the wrong anchor "Select a record type" for the topmost RADIO BUTTON 1702 (see dotted line associating such) to the correct UI label 1714 "New Opportunity" (see solid line associating such). FIG. 27 depicts the proximal UI labels that are associated with the UI controls (as shown by solid lines) after the correction has been made.

In addition to computing anchors that are proximal text values on the UI screen, the system can compute one or more nearby UI controls as anchors as well. Still further, the system can also assign edge context as an anchor using its proximity to the edges of the UI screen (or window). Such edge anchors can be particularly useful as anchors for outer scrollbars where other references may not be as reliable.

In general, a UI control can have one or more anchor mappings. Different UI controls can also have one or more of the same anchors, though the corresponding parameters would differ.

There can also be scenarios where there is a variable number of controls during recording and playback. For example, a screen where a set of quantities are needed to be filled in for a set of products and are to be added to a shopping cart. The actual name of these products and the number of the products may vary between different playback sessions; however, there is consistently a TEXTBOX next to each product to enter the quantity. The anchoring provided by the system can permit the anchors to be variable or dynamic and assigned to a UI control of a certain type to solve such scenarios. For example, a user can select the product name to be a variable anchor for the corresponding TEXTBOX during recording, and this anchor-control pair action of entering quantity can be put in a loop that follows a list. As such, anchoring can thus use static as well as dynamic anchors. These anchors along with their parameters, such as, type, state and bounding box geometry, can provide reliable representations for UI controls and are robust to changes in recording to playback transformations.

On playback, to perform the correct action during operation of the software automation process, anchors can be used to accurately map the associated UI control from recording (e.g., UI control R) to a UI control from playback (e.g., UI control P) once it is visible, which may entail inducing scrolling. A matching score can be computed between control R and each of the visible controls in a playback screen. This matching score may come from a combination of one or more of the following: (i) control type consistency score, (ii) text matching score, and (iii) control geometry matching score. In one embodiment, a UI control can be mapped only to a control of same type, subtype and state; otherwise is can receive a score of zero. In another embodiment, the constraints on subtype and state can be removed or relaxed. In one embodiment, the text matching score can be a normalized set of differences between the corresponding anchor text wherein the anchor text is considered as a set of characters.

Figure 28:
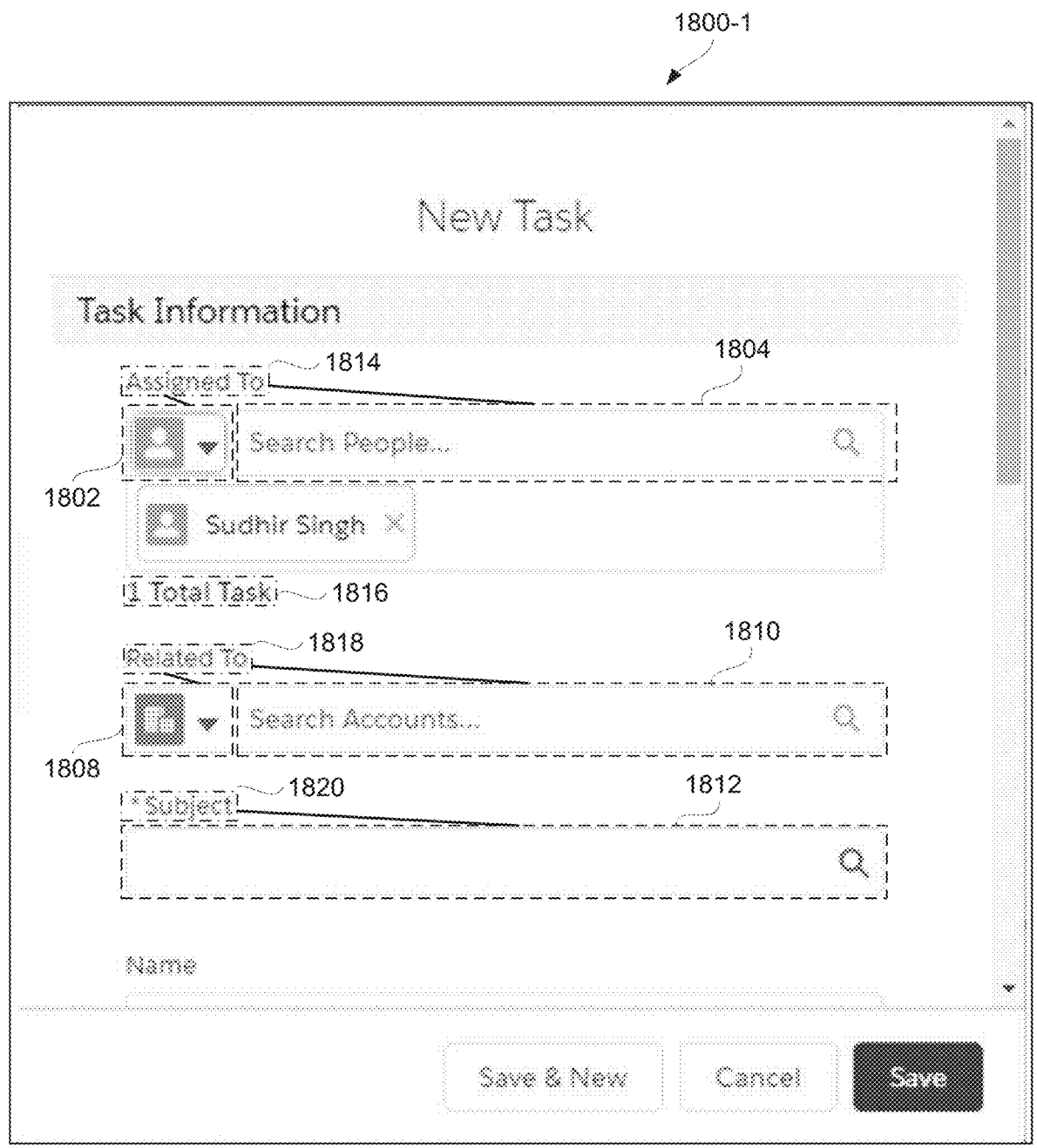
FIG. 28 is a screenshot of screen having various detected UI controls indicated, according to one embodiment.
Figure 29:
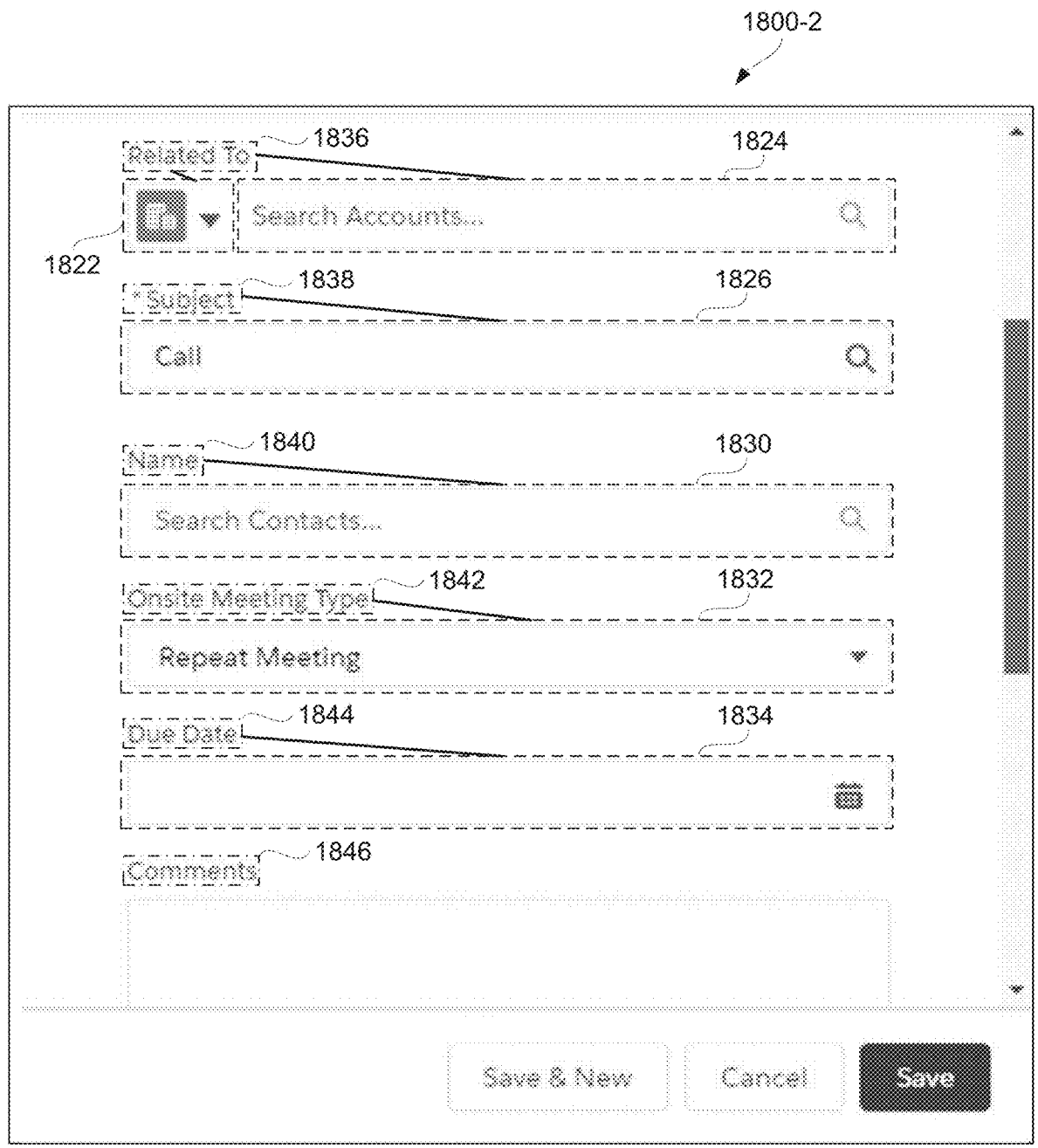
FIG. 29 is a screenshot of another screen having various detected UI controls indicated, according to one embodiment.
Figure 30:
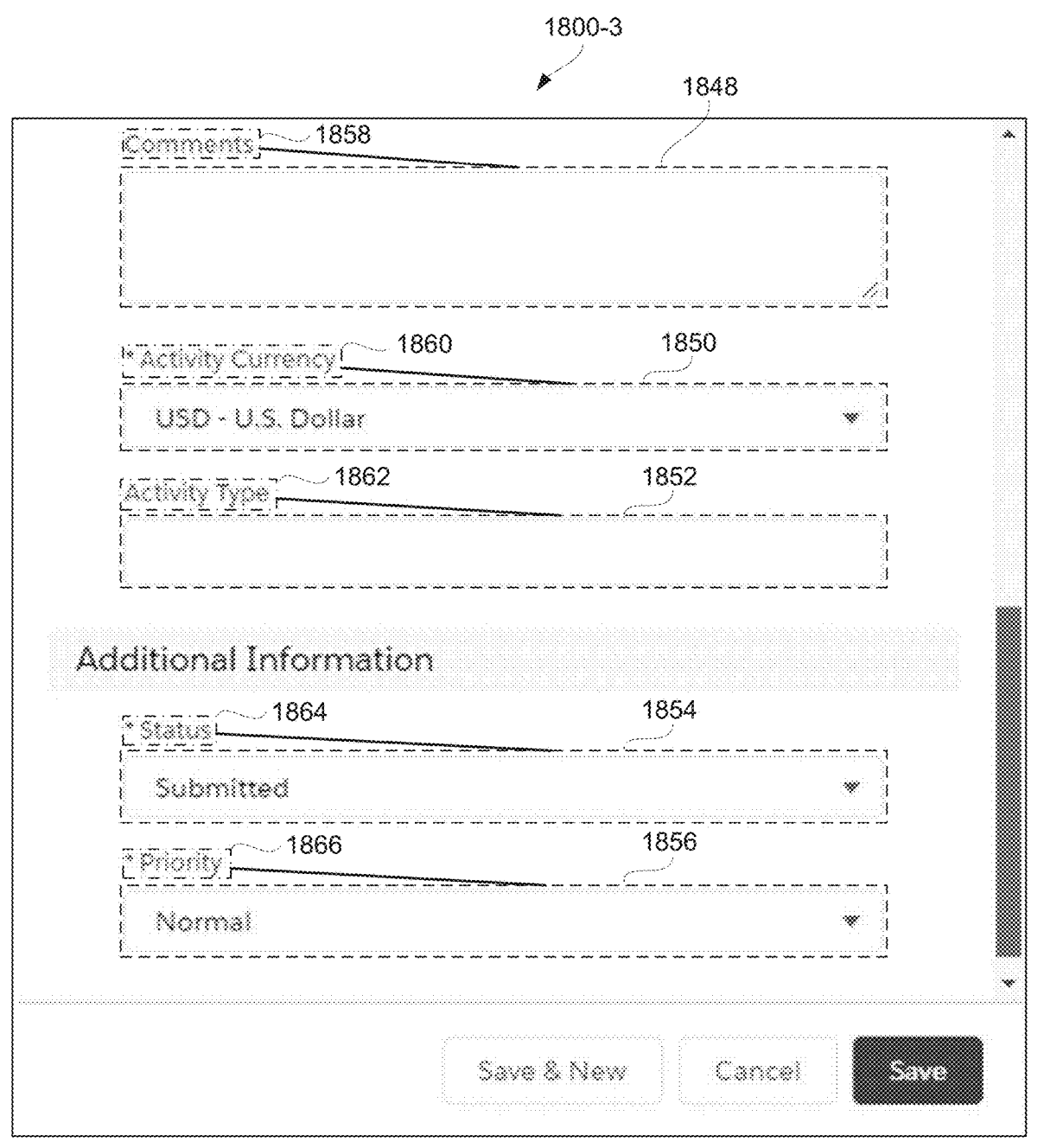

FIGS. 28, 29 and 30 illustrate different portions of a user interface 1800 having screens 1800-1, 1800-2 and 1800-2, and depicts assigned anchors for UI controls. Although there is overlap in the successive screens 1800-1, 1800-2 and 1800-2, each screen is processed separately as an image.

FIG. 28 is a screenshot of screen 1800-1 having various detected UI controls indicated, according to one embodiment. The screen 1800-1 depicts an example of having various detected UI controls indicated along with their respective UI label assignments, where the assigned UI labels server as anchors. The screen 1800-1 depicts the various detected UI controls for the UI screen in FIG. 13. The various detected UI controls include an IMAGE COMBOBOX 1802 and 1808, and TEXTBOXES 1804, 1810 and 1812. Each of the detected UI controls has associated parameters. The screenshot of screen 1800-1 also depicts various detected UI labels 1402-1422 indicated, according to one embodiment. The screen 1800-1 also depicts the various detected UI labels 1814-1820 for the UI screen in FIG. 13. Each of the detected UI labels has associated parameters. Furthermore, according to one embodiment, a mapping can be established between these detected UI controls and UI labels based on proximity therebetween. The mappings can be used to choose anchors for the UI controls. As shown in FIG. 28, the UI label 1814 can serve as an anchor for the UI control 1802 and the UI control 1804; the UI label 1816 is not needed as an anchor; the UI label 1818 can serve as an anchor for the UI control 1808 and the UI control 1810; and the UI label 1820 can serve as an anchor for the UI control 1812.

FIG. 29 is a screenshot of screen 1800-2 having various detected UI controls indicated, according to one embodiment. The screen 1800-2 depicts another example of having various detected UI controls indicated along with their respective UI label assignments, where the assigned UI labels server as anchors. The screen 1800-2 depicts the various detected UI controls for the UI screen in FIG. 14. The various detected UI controls include an IMAGE COMBOBOX 1822, and TEXTBOXES 1824, 1826, 1830, 1832 and 1834. Each of the detected UI controls has associated parameters. The screen 1800-2 also depicts various detected UI labels 1836-1846 for the UI screen in FIG. 14. Each of the detected UI labels has associated parameters. Furthermore, according to one embodiment, a mapping can be established between these detected UI controls and UI labels based on proximity therebetween. The mappings can be used to choose anchors for the UI controls. As shown in FIG. 29, the UI label 1836 can serve as an anchor for the UI control 1822 and the UI control 1824; the UI label 1838 can serve as an anchor for the UI control 1826; the UI label 1840 can serve as an anchor for the UI control 1830; and the UI label 1844 can serve as an anchor for the UI control 1834.

FIG. 30 is a screenshot of screen 1800-3 having various detected UI controls indicated, according to one embodiment. The screen 1800-3 depicts still another example of having various detected UI controls indicated along with their respective UI label assignments, where the assigned UI labels server as anchors. The screen 1800-3 depicts the various detected UI controls for the UI screen in FIG. 15. The various detected UI controls include TEXTBOXES 1848, 1850, 1852, 1854 and 1856. Each of the detected UI controls has associated parameters. The screen 1800-3 also depicts various detected UI labels 1858-1866 for the UI screen in FIG. 15. Each of the detected UI labels has associated parameters. Furthermore, according to one embodiment, a mapping can be established between these detected UI controls and UI labels based on proximity therebetween. The mappings can be used to choose anchors for the UI controls. As shown in FIG. 30, the UI label 1858 can serve as an anchor for the UI control 1848; the UI label 1860 can serve as an anchor for the UI control 1850; the UI label 1862 can serve as an anchor for the UI control 1852; the UI label 1864 can serve as an anchor for the UI control 1854; and the UI label 1866 can serve as an anchor for the UI control 1856.

FIGS. 28, 29 and 30 shows lines linking the assigned anchors to each of the UI controls. As can be duly noted, the assigned anchors for each of the UI controls needed for all the intended actions, Action 1 through Action 6, of the exemplary software automation process, are either same or consistent and can be reliably matched even though the playback scenario has gone through a very low resolution and layout transformation. In this regard, as an example, the assigned anchors to UI controls denoted in FIG. 25 can be compared with the assigned anchors to UI controls denoted in FIGS. 28-30.

Still another aspect disclosed herein is attention-tuned control detection. The system, as noted above, detects of UI controls during recording and playback by utilizing control detection. However, there can be scenarios where control detection might not confidently detect certain UI controls. A human is usually available to guide the detection of such controls during recording (as they are participating in the recording or designing of the bot), but such an intervention is not possible or desired during playback. For this aspect, the human boosted confidence from recording can be used to tune the attention of the control detection during playback to be better able identify the correct UI control.

All the detected controls that a user recorded an action on during recording can be considered high confidence detections and must be found during playback to complete those actions. It is possible that due to certain unfavorable visual transformations during playback some of the detected controls have lower confidence than the threshold deployed during recording. In such case, unless a lower threshold is used during playback, the system will not detect them and would think of them as not visible on the current playback screen and would likely perform a scroll or would fail, both of which are not desired outcomes in this case.

Next, a system, such as operated in accordance with one embodiment, can be used to explain operations. In doing so, the system can create the above-noted exemplary software automation process (e.g., bot) that includes the following six (6) actions using the UI in FIG. 7.

Action 1: Text entry in the SEARCHBOX for "Subject"
Action 2: Text entry in the SEARCHBOX for "Name"
Action 3: Text entry in the calendar picker TEXTBOX for "Due Date"
Action 4: Selection from the list of currencies in COMBOBOX for "Activity Currency"
Action 5: Text entry in the TEXTBOX for "Activity Type"
Action 6: Click on the "Save" BUTTON The system can capture the UI window that is, for example, such as depicted in FIG. 7. The system can perform control detection and obtain a list of detected UI controls on the screen of FIG. 7. As part of the detection, for each UI control on the screen, the system can detect its control type, bounding box geometry (e.g., coordinate description of the rectangle that tightly covers the controls from all sides), and a confidence score that indicates how confident the system is about its detection. The system can also detect the child controls of the UI controls, if any.

For FIG. 7, an exemplary resulting list of the detected UI controls can be configured as provided below. The detected UI controls noted below are those that are relevant to the six (6) actions of the exemplary software automation process (e.g., bot).

```
(id=3, xpos=1159, ypos=815, width=67, height=36, control_type='BUTTON',
score=0.9828385710716248),
(id=101, xpos=795, ypos=400, width=380, height=35, control_type='TEXTBOX',
control_subtype='SEARCHBOX', score=0.45409415662288666, children=[6]),
(id=102, xpos=795, ypos=488, width=379, height=34, control_type='TEXTBOX',
control_subtype='ICONBOX', score=0.5737689882516861, children=[7]),
(id=103, xpos=795, ypos=560, width=379, height=33, control_type='COMBOBOX',
score=0.6714870929718018, children=[12]),
(id=106, xpos=381, ypos=402, width=380, height=34, control_type='TEXTBOX',
control_subtype='SEARCHBOX', score=0.7125729322433472),
(id=107, xpos=381, ypos=674, width=380, height=34, control_type='TEXTBOX',
score=0.5927667319774628)
```

The detected UI controls can also detect scrollbars. For FIG. 7, the detected scrollbar can also be provided in the resulting list of detected UI controls and be represented as follows.

```
(id=116, xpos=1232, ypos=132, width=16, height=663,
control_type='SCROLLBAR_VERTICAL', score=0.6101301461458206,
state={'current_page': 0.0, 'num_pages': 1.2151162790697674}, children=[94, 95, 111]),
(id=94, xpos=1232, ypos=132, width=16, height=17,
control_type='SCROLLBAR_VERTICAL_HANDLE_UP', score=0.807799),
(id=95, xpos=1231, ypos=776, width=17, height=19,
control_type='SCROLLBAR_VERTICAL_HANDLE_DOWN', score=0.430688),
(id=111, xpos=1233, ypos=149, width=14, height=516,
control_type='SCROLLBAR_VERTICAL_BAR', score=0.601017)
```

In one embodiment, in addition to using high confidence detection of UI controls (high confidence UI controls), a set of low confidence UI controls can also be detected and further processed to determine anchors for them. To perform an action of a bot, if the corresponding recorded control has an anchor that can be matched only to a low confidence control, the confidence score of that low confidence score can be enhanced or boosted so as a match can be found.

The id refers to a unique identifier assigned to a UI control specific to this image. The xpos, ypos refers to the x and y coordinates of the upper left corner of the bounding box respectively. Width or height means width and height of the bounding box respectively. The control_type is the type or class of the control, control_subtype denotes the sub class of the controls if any, and the score means the confidence for the detection. The flag "low_scoring" when set to "true"

indicates whether the confidence is considered low to trigger guidance from the user. In case of certain control types such as "CHECKBOX" and "RADIO", their state whether checked or unchecked, clicked or unclicked is indicated by the flag "checked". The children refer to the set of ids for each of the control's children. In the case of scrollbars, the output can also include the state of scroll using 'current_page' and 'num_pages' to indicate the current location of the scrollbar and the number of scrollable pages, respectively.

The system can also perform text detection, such as using OCR, on the same captured UI screen (i.e., FIG. 7 in this case). The system output can provide a list of UI text labels and their bounding box geometry (i.e., the right rectangle covering the text from each side). An exemplary resulting list for the text detection on for the UI screen of FIG. 7 is as follows. Those UI text labels relevant to the six (6) actions of the exemplary software automation process (e.g., bot) are highlighted (i.e., bolded).

```
[733, 181, 824, 197, "New Task\n"],
[356, 232, 493, 245, "Task Information\n"],
[382, 270, 454, 283, "Assigned To\n"],
[796, 271, 859, 280, "Related To\n"],
[861, 302, 980, 312, "Search Accounts ... \n"],
[383, 346, 458, 356, "1 Total Task\n"],
[796, 381, 832, 390, "Name\n"],
[384, 384, 437, 397, "\u2019Subject\n"],
[1147, 410, 1162, 425, "Q.\n"],
[810, 412, 927, 422, "Search Contacts...\n"],
[382, 467, 507, 480, "Onsite Meeting Type\n"],
[796, 468, 852, 477, "Due Date\n"],
[399, 499, 502, 512, "Repeat Meeting\n"],
[796, 540, 906, 553, "\u2019Activity Currency\n"],
[382, 541, 449, 550, "Comments\n"],
[813, 572, 922, 582, "USD - U.S. Dollar\n"],
[382, 654, 457, 667, "Activity Type\n"],
[1178, 828, 1207, 838, "Save\n"],
[424, 310, 527, 324, "Sudhir Singh X\n"],
```

Each entry in the resulting list pertains to a detected UI label (or UI text label). For each entry in the resulting list, the first four values detail the bounding box geometry correspond to x coordinate of top left corner, y coordinate of top left corner, x coordinate of bottom right corner, and y coordinate of bottom right corner, respectively, and the fifth value shows the value of actual text.

Next, after the UI controls and UI labels have been detected, the system can assign anchors as described above based on the proximity of the UI controls to the UI text labels and the preferred direction for each type of the UI control. For example, for the detected UI control with id=106 and description (id=106, xpos=381, ypos=402, width=380, height=34, control_type='TEXTBOX', control_subtype='SEARCHBOX', score=0.7125729322433472), the closest detected UI label is [384, 384, 437, 397, "\u2019Subject\n"], which is also in a preferred direction "top" for the control type TEXTBOX and there is no other UI label in comparable distance in left direction which is equally preferred. A similar argument applies for the mapping of the UI control (id=103, xpos=795, ypos=560, width=379, height=33, control_type='COMBOBOX', score=0.6714870929718018, children=[12]) to the UI label [796, 540, 906, 553, "\u2019Activity Currency\n"].

For certain UI controls, a text value of either a current entry of the UI control or a name is also computed if the bounding box of the corresponding text is contained within the bounding box of the corresponding UI control. For example, the UI text [813, 572, 922, 582, "USD—U.S. Dollar\n"], is contained in the control (id=103, xpos=795, ypos=560, width=379, height=33, control_type='COMBOBOX', score=0.6714870929718018, children=[12]), and is computed as its currently selected value. Similarly, the UI text [1178, 828, 1207, 838, "Save\n"], is contained in the UI control (id=3, xpos=1159, ypos=815, width=67, height=36, control_type='BUTTON', score=0.9828385710716248) and therefore computed as the name/value of this button control.

An example output for the assigned anchors for FIG. 7 is listed below in json format. Each UI control can have one or more anchors (e.g., UI labels) associated with it. The anchors relevant for the six (6) actions of the exemplary software automation process (e.g., bot) are highlighted (i.e., bolded).

```
{'controls': [{'anchors': {},
               'control': {'bounding_box': {'bottom': 850,
                                            'left': 943,
                                            'right': 1057,
                                            'top': 815},
                           'score': 0.9846774339675903,
                           'type': 'BUTTON',
                           'value': 'Save & New'}}, {'anchors': {},
               'control': {'bounding_box': {'bottom': 851,
                                            'left': 1159,
                                            'right': 1226,
```

```
                'top': 815},
    'score': 0.9828385710716248,
    'type': 'BUTTON',
    'value': 'Save'}}, {'anchors': {},
 'control': {'bounding_box': {'bottom': 850,
                'left': 1067,
                'right': 1149,
                'top': 815},
    'score': 0.9753634929656982,
    'type': 'BUTTON',
    'value': 'Cancel'}}, {'anchors': {'top_left': {'bounding_box': {'bottom': 283,
                    'left': 382,
                    'right': 454,
                    'top': 270},
            'distance': 80,
            'group': None,
            'id': 124,
            'type': 'LABEL',
            'value': 'Assigned To'}},
 'control': {'bounding_box': {'bottom': 337,
                'left': 492,
                'right': 534,
                'top': 295},
    'score': 0.7253755331039429,
    'type': 'DROPDOWN_HANDLE',
    'value': None}},
```

```
{'anchors': {'top': {'bounding_box': {'bottom': 477,
                                      'left': 796,
                                      'right': 852,
                                      'top': 468},
                    'distance': 68,
                    'group': None,
                    'id': 133,
                    'type': 'LABEL',
                    'value': 'Due Date'}},
 'control': {'bounding_box': {'bottom': 520,
                              'left': 728,
                              'right': 761,
                              'top': 488},
             'score': 0.6930678486824036,
             'type': 'DROPDOWN_HANDLE',
             'value': None}}, {'anchors': {'top': {'bounding_box': {'bottom': 280,
                                      'left': 796,
                                      'right': 859,
                                      'top': 271},
                    'distance': 12,
                    'group': None,
                    'group_anchor': True,
                    'id': 125,
                    'type': 'LABEL',
                    'value': 'Related To'}},
 'control': {'bounding_box': {'bottom': 326,
                              'left': 796,
                              'right': 1174,
```

```
                'top': 292},
    'child_controls': [{'control': {'bounding_box': {'bottom': 325,
                                                    'left': 796,
                                                    'right': 830,
                                                    'top': 292},
                                    'score': 0.5984084606170654,
                                    'type': 'LEFT_TEXTBOX',
                                    'value': None}},
                      {'control': {'bounding_box': {'bottom': 326,
                                                    'left': 1137,
                                                    'right': 1174,
                                                    'top': 290},
                                    'score': 0.5530609488487244,
                                    'type': 'SEARCH_ICON',
                                    'value': None}}],
    'score': 0.5757347047328949,
    'subtype': 'SEARCHBOX',
    'type': 'TEXTBOX',
    'value': 'ET\nSearch Accounts...Q.'}}, {'anchors': {'top': {'bounding_box': {'bottom': 390,
                                      'left': 796,
                                      'right': 832,
                                      'top': 381},
              'distance': 10,
              'group': None,
              'group_anchor': True,
              'id': 129,
              'type': 'LABEL',
              'value': 'Name'}},
 'control': {'bounding_box': {'bottom': 435,
```

```
                'left': 795,
                'right': 1175,
                'top': 400},
'child_controls': [{'control': {'bounding_box': {'bottom': 435,
                'left': 795,
                'right': 830,
                'top': 400},
            'score': 0.46994084119796753,
            'type': 'LEFT_TEXTBOX',
            'value': None}},
        {'control': {'bounding_box': {'bottom': 435,
                'left': 1140,
                'right': 1175,
                'top': 400},
            'score': 0.4382474720478058,
            'type': 'SEARCH_ICON',
            'value': None}}],
'score': 0.45409415662288666,
'subtype': 'SEARCHBOX',
'type': 'TEXTBOX',
'value': 'Search Contacts...Q.'}}, {'anchors': {'top': {'bounding_box': {'bottom': 477,
                'left': 796,
                'right': 852,
                'top': 468},
        'distance': 11,
        'group': None,
        'group_anchor': True,
        'id': 133,
        'type': 'LABEL',
```

```
                    'value': 'Due Date'}},
'control': {'bounding_box': {'bottom': 522,
            'left': 795,
            'right': 1174,
            'top': 488},
    'child_controls': [{'control': {'bounding_box': {'bottom': 522,
                        'left': 795,
                        'right': 829,
                        'top': 488},
            'score': 0.6609042286872864,
            'type': 'LEFT_TEXTBOX',
            'value': None}},
        {'control': {'bounding_box': {'bottom': 522,
                        'left': 1140,
                        'right': 1174,
                        'top': 488},
            'score': 0.4866337478160858,
            'type': 'NON_SEARCH_ICON',
            'value': None}}],
    'score': 0.5737689882516861,
    'subtype': 'ICONBOX',
    'type': 'TEXTBOX',
    'value': ''}}, {'anchors': {'top': {'bounding_box': {'bottom': 553,
                'left': 796,
                'right': 906,
                'top': 540},
        'distance': 7,
        'group': None,
        'group_anchor': True,
```

```
                'id': 136,

'type': 'LABEL',

'value': "Activity Currency'}},

'control': {'bounding_box': {'bottom': 593,

'left': 795,

'right': 1174,

'top': 560},

'child_controls': [{'control': {'bounding_box': {'bottom': 591,

'left': 795,

'right': 827,

'top': 560},

'score': 0.5771700143814087,

'type': 'LEFT_TEXTBOX',

'value': None}},

{'control': {'bounding_box': {'bottom': 593,

'left': 1141,

'right': 1174,

'top': 560},

'score': 0.7658041715621948,

'type': 'DROPDOWN_HANDLE',

'value': None}}],

'score': 0.6714870929718018,

'type': 'COMBOBOX',

'value': 'USD - U.S. Dollar'}},

{'anchors': {'top': {'bounding_box': {'bottom': 550,

'left': 382,

'right': 449,

'top': 541},

'distance': 10,

'group': None,
```

```
                'group_anchor': True,
                'id': 137,
                'type': 'LABEL',
                'value': 'Comments'}},
    'control': {'bounding_box': {'bottom': 628,
            'left': 381,
            'right': 761,
            'top': 560},
        'child_controls': [{'control': {'bounding_box': {'bottom': 629,
                    'left': 381,
                    'right': 450,
                    'top': 560},
                'score': 0.8782998323440552,
                'type': 'LEFT_TEXTBOX',
                'value': None}},
            {'control': {'bounding_box': {'bottom': 628,
                    'left': 693,
                    'right': 761,
                    'top': 560},
                'score': 0.9527382850646973,
                'type': 'RIGHT_TEXTBOX',
                'value': None}}],
        'score': 0.9155190587043762,
        'type': 'TEXTBOX',
        'value': ''}}, {'anchors': {'top': {'bounding_box': {'bottom': 283,
                'left': 382,
                'right': 454,
                'top': 270},
            'distance': 11,
```

'group': None,

'id': 124,

'type': 'LABEL',

'value': 'Assigned To'}},

'control': {'bounding_box': {'bottom': 337,

'left': 386,

'right': 534,

'top': 294},

'child_controls': [{'control': {'bounding_box': {'bottom': 337,

'left': 386,

'right': 429,

'top': 294},

'score': 0.7639132738113403,

'type': 'LEFT_TEXTBOX',

'value': None}},

{'control': {'bounding_box': {'bottom': 337,

'left': 492,

'right': 534,

'top': 295},

'score': 0.7253755331039429,

'type': 'DROPDOWN_HANDLE',

'value': None}}],

'score': 0.7446444034576416,

'type': 'COMBOBOX',

'value': 'Sudhir Singh X'}},

{'anchors': {'top': {'bounding_box': {'bottom': 397,

'left': 384,

'right': 437,

'top': 384},

'distance': 5,

```
               'group': None,
               'group_anchor': True,
               'id': 130,
               'type': 'LABEL',
               'value': "Subject'}},
   'control': {'bounding_box': {'bottom': 436,
                'left': 381,
                'right': 761,
                'top': 402},
       'child_controls': [{'control': {'bounding_box': {'bottom': 436,
                             'left': 381,
                             'right': 415,
                             'top': 402},
                     'score': 0.7238739728927612,
                     'type': 'LEFT_TEXTBOX',
                     'value': None}},
                 {'control': {'bounding_box': {'bottom': 436,
                             'left': 727,
                             'right': 761,
                             'top': 402},
                     'score': 0.7012718915939331,
                     'type': 'SEARCH_ICON',
                     'value': None}}],
       'score': 0.7125729322433472,
       'subtype': 'SEARCHBOX',
       'type': 'TEXTBOX',
       'value': ''}}, {'anchors': {'top': {'bounding_box': {'bottom': 667,
                   'left': 382,
                   'right': 457,
```

```
                        'top': 654},
            'distance': 7,
            'group': None,
            'group_anchor': True,
            'id': 140,
            'type': 'LABEL',
            'value': 'Activity Type'}},
'control': {'bounding_box': {'bottom': 708,
            'left': 381,
            'right': 761,
            'top': 674},
    'child_controls': [{'control': {'bounding_box': {'bottom': 709,
                    'left': 381,
                    'right': 415,
                    'top': 674},
            'score': 0.6449000835418701,
            'type': 'LEFT_TEXTBOX',
            'value': None}},
        {'control': {'bounding_box': {'bottom': 708,
                    'left': 727,
                    'right': 761,
                    'top': 674},
            'score': 0.5406333804130554,
            'type': 'RIGHT_TEXTBOX',
            'value': None}}],
    'score': 0.5927667319774628,
    'type': 'TEXTBOX',
    'value': ''}}, {'anchors': {'left': {'bounding_box': {'bottom': 507,
                    'left': 280,
```

```
                    'right': 322,
                    'top': 497},
            'distance': 59,
            'group': None,
            'id': 146,
            'type': 'LABEL',
            'value': 'Add tr'},
        'top': {'bounding_box': {'bottom': 480,
                    'left': 382,
                    'right': 507,
                    'top': 467},
            'distance': 8,
            'group': None,
            'group_anchor': True,
            'id': 132,
            'type': 'LABEL',
            'value': 'Onsite Meeting Type'}},
    'control': {'bounding_box': {'bottom': 520,
            'left': 381,
            'right': 761,
            'top': 488},
        'child_controls': [{'control': {'bounding_box': {'bottom': 520,
                        'left': 381,
                        'right': 413,
                        'top': 488},
                    'score': 0.7207659482955933,
                    'type': 'LEFT_TEXTBOX',
                    'value': None}},
            {'control': {'bounding_box': {'bottom': 520,
                        'left': 728,
                        'right': 761,
```

'top': 488},
                'score': 0.6930678486824036,
                'type': 'DROPDOWN_HANDLE',
                'value': None}}],
        'score': 0.7069168984889984,
        'type': 'COMBOBOX',
        'value': 'Repeat Meeting'}}

[00145]   Additionally, depending on the action type, control detection and text detection might be run again. For example, when a COMBOBOX is expanded by clicking on the dropdown handle a list of text item may appear, in which case the UI screen should be again captured and re-processed. An example output in case of the Action 4 is listed below in which a selection from a list of currencies can be made.

{'bounding_box': {'bottom': 798, 'left': 795, 'right': 1175, 'top': 500},
     'child_controls': [{'control': {'bounding_box': {'bottom': 510,
                'left': 811,
                'right': 894,
                'top': 498},
            'match_score': None,
            'type': 'LABEL',
            'value': '10/20/2020'}},
        {'control': {'bounding_box': {'bottom': 549,
                'left': 828,
                'right': 878,
                'top': 539},
            'match_score': None,
            'type': 'LABEL',
            'value': '-None--'}},
        {'control': {'bounding_box': {'bottom': 585,
                'left': 828,
                'right': 968,
                'top': 575}, 'match_score': None, 'type': 'LABEL', 'value': 'AUD - Australian Dollar'}}, {'control': {'bounding_box': {'bottom': 622, 'left': 828, 'right': 964, 'top': 612}, 'match_score': None, 'type': 'LABEL', 'value': 'CAD - Canadian Dollar'}}, {'control': {'bounding_box': {'bottom': 658, 'left': 829, 'right': 892, 'top': 649}, 'match_score': None, 'type': 'LABEL', 'value': 'EUR • Euro'}}, {'control': {'bounding_box': {'bottom': 695, 'left': 828, 'right': 946, 'top': 685}, 'match_score': None, 'type': 'LABEL', 'value': 'GBP - British Pound'}}, {'control': {'bounding_box': {'bottom': 734, 'left': 828, 'right': 941, 'top': 722}, 'match_score': None, 'type': 'LABEL', 'value': 'JPY - Japanese Yen'}},

```
{'control': {'bounding_box': {'bottom': 768,
                              'left': 811,
                              'right': 929,
                              'top': 759},
             'match_score': None,
             'type': 'LABEL',
             'value': '✓ USD - U.S. Dollar'}}],
 'match': None,
 'scrollbar': None,
 'type': 'EXPANDED_DROPDOWN'}
```

[00146] This exemplary software automation process (e.g., bot) is saved and can be run or played back on the recording device or any other compatible device having capability of running the software automation process.

[00147] The processing of running (or playing back) the exemplary software automation process (e.g., bot) is now described. In the following exemplary explanation, the playback device's configuration has its screen and window context as shown in FIG. 13, which has a substantially lower resolution as compared to the resolution at time of recording. Indeed, the layout for the UI at playback is a single column layout, whereas the layout for the UI at recoding was a two-column layout. The system starts with capturing a UI screen (e.g., window) and obtains an image such as illustrated in FIG. 13. Then, control detection as well as text detection/OCR are run on this captured image and results are obtained. The control detection outputs for the UI screen (e.g., window) associated with the captured image of FIG. 13 are listed below. Within the outputs, UI controls are first denoted followed by UI labels. Those outputs relevant to the next action of the exemplary software automation process (e.g., bot) is highlighted (i.e., bolded).

```
(id=5, xpos=480, ypos=586, width=68, height=36, control_type='BUTTON',
    score=0.9908643960952759), (id=6, xpos=389, ypos=586, width=83, height=35, control_type='BUTTON',
    score=0.9901347756385803),
```

(id=7, xpos=266, ypos=586, width=115, height=35, control_type='BUTTON', score=0.9852246046066284), (id=45, xpos=103, ypos=294, width=149, height=43, control_type='COMBOBOX', score=0.9837326109409332, children=[39]), (id=39, xpos=210, ypos=295, width=42, height=42, control_type='DROPDOWN_HANDLE', score=0.995213),

(id=46, xpos=99, ypos=474, width=398, height=35, control_type='TEXTBOX', control_subtype='SEARCHBOX', score=0.9259371757507324, children=[14]),

(id=14, xpos=461, ypos=474, width=36, height=35, control_type='SEARCH_ICON', score=0.924697),

(id=47, xpos=100, ypos=401, width=397, height=35, control_type='TEXTBOX', control_subtype='SEARCHBOX', score=0.8655964732170105, children=[15]), (id=15, xpos=460, ypos=400, width=37, height=36, control_type='SEARCH_ICON', score=0.875085), (id=48, xpos=60, ypos=221, width=477, height=37, control_type='TEXTBOX', score=0.6745297312736511), (id=49, xpos=19, ypos=9, width=236, height=31, control_type='COMBOBOX', score=0.19258974492549896, low_scoring=True, children=[38]), (id=38, xpos=224, ypos=8, width=31, height=32, control_type='DROPDOWN_HANDLE', score=0.2613901197910309), (id=50, xpos=19, ypos=9, width=268, height=33, control_type='TEXTBOX', score=0.19772985577583313, low_scoring=True),

(id=55, xpos=553, ypos=132, width=17, height=434, control_type='SCROLLBAR_VERTICAL', score=0.45043863356113434, state={'current_page': 0.00641025641025641, 'num_pages': 2.5641025641025643}, children=[51, 52, 53]),

(id=51, xpos=555, ypos=150, width=14, height=156, control_type='SCROLLBAR_VERTICAL_BAR', score=0.4344683736562729)

(id=52, xpos=553, ypos=132, width=17, height=17, control_type='SCROLLBAR_VERTICAL_HANDLE_UP', score=0.386591)

(id=53, xpos=553, ypos=549, width=17, height=17, control_type='SCROLLBAR_VERTICAL_HANDLE_DOWN', score=0.546226)

[254, 181, 344, 197, "New Task\n"],

[74, 232, 211, 245, "Task Information\n"],

[101, 380, 176, 390, "1 Total Task\n"],

[101, 415, 163, 424, "Related To\n"],

[165, 446, 284, 456, "Search Accounts...\n"],

[102, 491, 155, 504, "\u2019Subject\n"],

[100, 575, 136, 584, "Name\n"],

[285, 633, 362, 643, "Save & New\n"],

[409, 633, 452, 643, "Cancel\n"],

[500, 633, 529, 643, "Save\n"],

[110, 339, 245, 361, "Q Sudhir Singh X\n"],

[100, 270, 172, 283, "Assigned To\n"],

[137, 302, 269, 315, "\u25BC Search People...\n"]

With the above detected UI controls and UI labels having been detected, the anchoring process can be applied similar to that during recording. A set of results with structure similar to that during recording can be obtained. To perform the first action in the set of recorded actions, i.e., the Action 1 of Text entry in the SEARCHBOX for "Subject", the system needs to find the corresponding UI control from the list of UI controls detected in the current playback screen (i.e., FIG. 13). In this case, the representation of the UI control from recording corresponding to this action is:

```
{'anchors': {'top': {'bounding_box': {'bottom': 397,
                                      'left': 384,
                                      'right': 437,
                                      'top': 384},
                    'distance': 5,
                    'group': None,
                    'group_anchor': True,
                    'id': 130,
                    'type': 'LABEL',
                    'value': "Subject'}},
 'control': {'bounding_box': {'bottom': 436,
                              'left': 381,
                              'right': 761,
                              'top': 402},
             'child_controls': [{'control': {'bounding_box': {'bottom': 436,
                                                              'left': 381,
                                                              'right': 415,
                                                              'top': 402},
                                             'score': 0.7238739728927612,
                                             'type': 'LEFT_TEXTBOX',
                                             'value': None}},
                                {'control': {'bounding_box': {'bottom': 436,
                                                              'left': 727,
                                                              'right': 761,
                                                              'top': 402},
                                             'score': 0.7012718915939331,
                                             'type': 'SEARCH_ICON',
                                             'value': None}}],
             'score': 0.7125729322433472,
             'subtype': 'SEARCHBOX',
             'type': 'TEXTBOX',
             'value': ''}}
```

The anchor matching process can then be invoked to search for this UI control of the exemplary software automation process (e.g., bot). In one embodiment, a similarity score of this UI control to all the UI controls detected during the current playback can be determined. As described earlier, there are several factors that can be combined to obtain the similarity score. These factors can include one or more of: similarity between the anchor text, type of the UI control, size of the bounding box geometry, distance and direction of the UI control from its anchor text and neighboring controls, etc. In this case, a UI control with exact same anchor text, i.e., 'Subject', in the exact same direction "top", with exact control type and control_subtype is found, and thus such UI control is returned as the best matching result by the anchor matching process with a confidence of 90, as listed below. The confidence is a confidence value (or confidence score) indicating a degree of confidence that the anchor matching processing attributes to a particular match. In this example, the confidence is still 90 and not 100 because the bounding box geometry for the UI control has changed, but this is well above a predetermined threshold (e.g., 75) for its selection as a correct matching result. This threshold can be computed based on data obtained from various previous runs of the recording to playback transformations.

```
{'anchors': {'top': {'bounding_box': {'bottom': 469,
                                      'left': 102,
                                      'right': 155,
                                      'top': 456},
                    'distance': 5,
                    'group': None,
                    'id': 64,
                    'type': 'LABEL',
                    'value': "Subject'}},
 'confidence': 90,
 'control': {'bounding_box': {'bottom': 509,
                              'left': 99,
                              'right': 497,
                              'top': 474},
             'child_controls': [{'control': {'bounding_box': {'bottom': 510,
                                                              'left': 99,
                                                              'right': 135,
                                                              'top': 474},
                                             'score': 0.9271771311759949,
                                             'type': 'LEFT_TEXTBOX',
                                             'value': None}},
                                {'control': {'bounding_box': {'bottom': 509,
                                                              'left': 461,
                                                              'right': 497,
                                                              'top': 474},
                                             'score': 0.92469722032547,
                                             'type': 'SEARCH_ICON',
                                             'value': None}}],
             'score': 0.9259371757507324,
             'subtype': 'SEARCHBOX',
             'type': 'TEXTBOX',
             'value': 'Q.'}}
```

The software automation process (i.e., bot) can then complete this particular action by entering the correct text "Call" at the correct UI control location, i.e., at (x, y) coordinate (99, 474).

The next action in the recorded list to be performed is Action 2, i.e., text entry in the SEARCHBOX for "Name". The representation of the corresponding UI control from the recording is as follows.

```
{'anchors': {'top': {'bounding_box': {'bottom': 390,
                                      'left': 796,
                                      'right': 832,
                                      'top': 381},
                    'distance': 10,
                    'group': None,
                    'group_anchor': True,
                    'id': 129,
                    'type': 'LABEL',
                    'value': 'Name'}},
 'control': {'bounding_box': {'bottom': 435,
                              'left': 795,
                              'right': 1175,
                              'top': 400},
             'child_controls': [{'control': {'bounding_box': {'bottom': 435,
                                                              'left': 795,
                                                              'right': 830,
                                                              'top': 400},
                                             'score': 0.46994084119796753,
                                             'type': 'LEFT_TEXTBOX',
                                             'value': None}},
                                {'control': {'bounding_box': {'bottom': 435,
                                                              'left': 1140,
                                                              'right': 1175,
                                                              'top': 400},
                                             'score': 0.4382474720478058,
                                             'type': 'SEARCH_ICON',
                                             'value': None}}],
             'score': 0.45409415662288666,
             'subtype': 'SEARCHBOX',
             'type': 'TEXTBOX',
             'value': 'Search Contacts...Q.'}}
```

The anchor matching processing can again be applied to search for this UI control in the list of UI controls detected during current playback. This time there are UI controls detected of similar type and geometry but there is no control with anchor text similar to "Name" and therefore the best result returned by anchor matching has very low confidence score of 31.

```
{'anchors': {'top': {'bounding_box': {'bottom': 197,
                                       'left': 254,
                                       'right': 344,
                                       'top': 181},
                    'distance': 24,
                    'group': None,
                    'id': 60,
                    'type': 'LABEL',
                    'value': "New Task'}},
 'confidence': 31,
 'control': {'bounding_box': {'bottom': 258,
                              'left': 60,
                              'right': 537,
                              'top': 221},
             'child_controls': [{'control': {'bounding_box': {'bottom': 258,
                                                              'left': 60,
                                                              'right': 97,
                                                              'top': 221},
                                             'score': 0.8395494818687439,
                                             'type': 'LEFT_TEXTBOX',
                                             'value': None}},
                                {'control': {'bounding_box': {'bottom': 258,
                                                              'left': 500,
                                                              'right': 537,
                                                              'top': 221},
                                             'score': 0.5095099806785583,
                                             'type': 'SEARCH_ICON',
                                             'value': None}}],
             'score': 0.6745297312736511,
             'type': 'TEXTBOX',
             'value': 'Task Information'}}
```

Since the confidence score from the anchor matching processing is below the predetermined threshold, the system determines that the UI control required for the current action is not visible and thus activates a scrolling process. The scrollbar present on the current playback screen (i.e., FIG. 13) can be determined. In this example, the control detection can have already detected the scrollbar and can provide the following information therefor.

```
(id=55, xpos=553, ypos=132, width=17, height=434,
control_type='SCROLLBAR_VERTICAL', score=0.45043863356113434,
state={'current_page': 0.00641025641025641, 'num_pages': 2.5641025641025643},
children=[51, 52, 53]),
(id=51, xpos=555, ypos=150, width=14, height=156,
control_type='SCROLLBAR_VERTICAL_BAR', score=0.4344683736562729)
(id=52, xpos=553, ypos=132, width=17, height=17,
control_type='SCROLLBAR_VERTICAL_HANDLE_UP', score=0.386591)
(id=53, xpos=553, ypos=549, width=17, height=17,
control_type='SCROLLBAR_VERTICAL_HANDLE_DOWN', score=0.546226)
```

This vertical scrollbar, which has been detected, can then be used to scroll the UI screen. The system can also compute the general layout change in the UI screen by analyzing the change in the relative position of the UI controls and the associated anchor texts. For example, during recording the text "Related To" with geometry [796, 271, 859, 280] was located on the right-hand side of the text "Assigned To" with geometry [382, 270, 454, 283]. During the current playback, however, such text has shifted down below as computed using geometry for [101, 415, 163, 424, "Related To\n"], and geometry for [100, 270, 172, 283, "Assigned To\n"]. Using this shift from right during recording to down during playback, the system determines that it expects the UI control anchored at "Name" (which was on the right to the UI control anchored at "Subject") to now be below that UI control. Therefore, the system can decide to do a scroll down instead of scroll up. Further, using the same geometry, the UI control anchored at "Name" is expected below by approximately 145 pixels (415−270=145) compared to the UI control anchored at "Subject" which amounts to less than a page of scroll (expected location/bar length=145/156=0.93) and system can conservatively determine to do a half-page scroll. Now, after the scrolling, the system again captures the UI window which is the new screen visible after scroll down as shown in FIG. 14. The whole process of image capture of UI screen, UI control detection, UI label detection, anchor computation and anchor matching the UI controls detected during the current playback is again performed on this new screen image. This time the anchor matching response obtained has now a confidence of 92, as shown below. The match is now sufficiently confident, so the UI control deemed matching is then used to perform Action 2 on.

```
{'anchors': {'top': {'bounding_box': {'bottom': 313,
                                       'left': 101,
                                       'right': 136,
                                       'top': 304},
                    'distance': 10,
                    'group': None,
                    'group_anchor': True,
                    'id': 68,
                    'type': 'LABEL',
                    'value': 'Name'}},
 'confidence': 92,
 'control': {'bounding_box': {'bottom': 358,
                              'left': 100,
                              'right': 497,
                              'top': 323},
             'child_controls': [{'control': {'bounding_box': {'bottom': 358,
                                                              'left': 100,
                                                              'right': 134,
                                                              'top': 323},
                                             'score': 0.9005790948867798,
                                             'type': 'LEFT_TEXTBOX',
                                             'value': None}},
                                {'control': {'bounding_box': {'bottom': 358,
                                                              'left': 460,
                                                              'right': 497,
                                                              'top': 322},
```

-continued

```
                                             'score': 0.8397408723831177,
                                             'type': 'SEARCH_ICON',
                                             'value': None}}],
             'score': 0.8701599836349487,
             'subtype': 'SEARCHBOX',
             'type': 'TEXTBOX',
             'value': 'Search Contacts...'}}
```

The of the recorded actions, that is, Actions 3, 4, 5 and 6, are performed in a similar manner. On the other hand, when anchor matching does not find a matching UI control with high confidence, the scrolling process can be invoked to appropriately scroll the UI screen to find the UI control. In this particular exemplary software automation process, the UI control of Action 3 is found on the same screen as that for Action 2. However, to find the UI control for Action 4, the scrolling can be invoked again and the UI window can be scrolled again to get to the screen shown in FIG. 15. Hence, the UI controls for the rest of the actions, Actions 4, 5 and 6, are found on this same screen by the anchoring and anchor matching methods and the Actions 4, 5 and 6 are performed successfully.

The various aspects disclosed herein can be utilized with or by robotic process automation systems.

Figure 31:
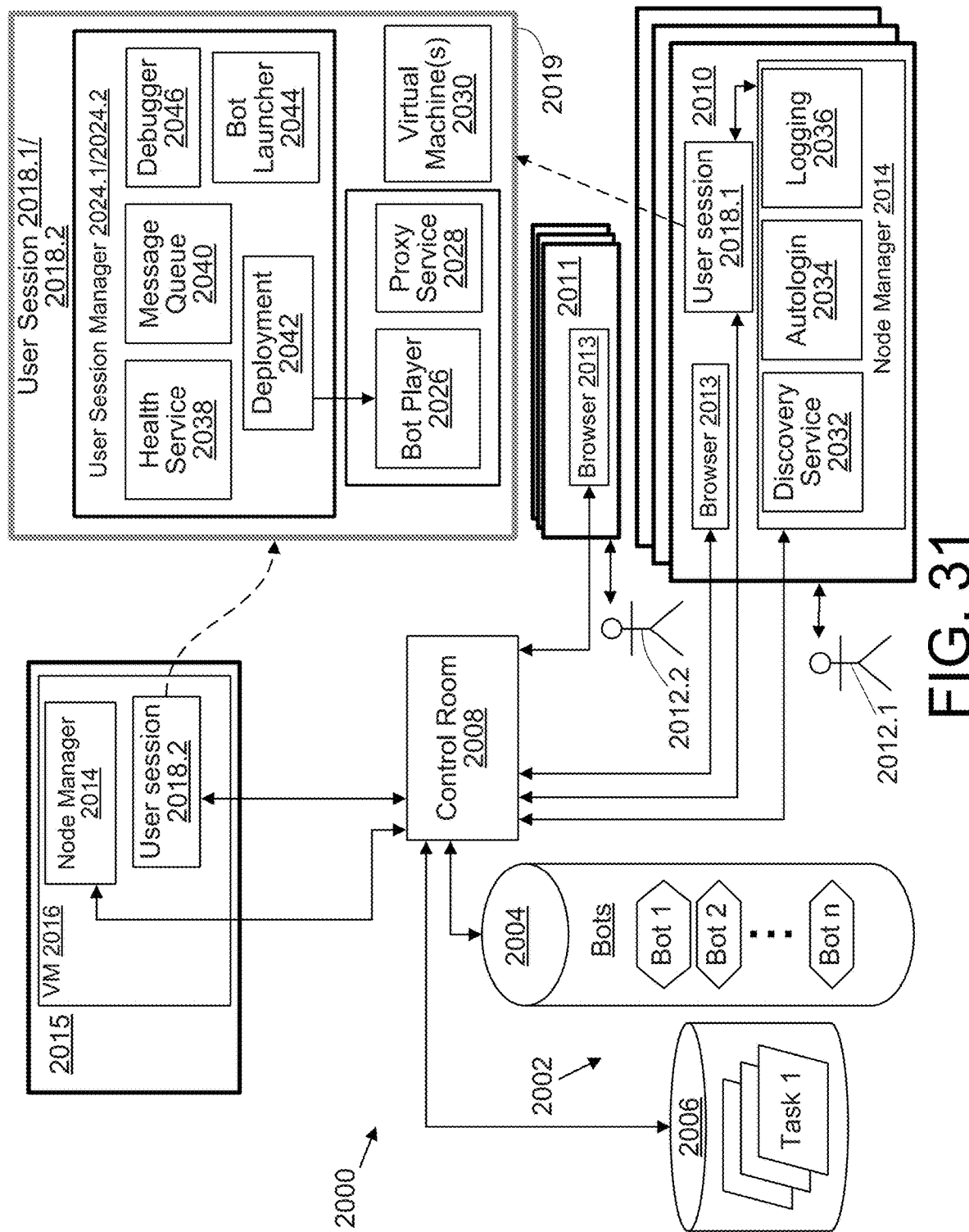
FIG. 31 is a block diagram of a robotic process automation system according to one embodiment.

FIG. 31 is a block diagram of a robotic process automation (RPA) system 2000 according to one embodiment. The RPA system 2000 includes data storage 2002. The data storage 2002 can store a plurality of software robots 2004, also referred to as bots (e.g., Bot 1, Bot 2, . . . , Bot n). The software robots 2004 can be operable to interact at a user level with one or more user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 2026), on which a bot will execute or is executing. The data storage 2002 can also stores a plurality of work items 2006. Each work item 2006 can pertain to processing executed by one or more of the software robots 2004.

The RPA system 2000 can also include a control room 2008. The control room 2008 is operatively coupled to the data storage 2002 and is configured to execute instructions that, when executed, cause the RPA system 2000 to respond to a request from a client device 2010 that is issued by a user 2012.1. The control room 2008 can act as a server to provide to the client device 2010 the capability to perform an automation task to process a work item from the plurality of work items 2006. The RPA system 2000 is able to support multiple client devices 2010 concurrently, each of which will have one or more corresponding user session(s) 2018, which provides a context. The context can, for example, include security, permissions, audit trails, etc. to define the permissions and roles for bots operating under the user session 2018. For example, a bot executing under a user session, cannot access any files or use any applications that the user, under whose credentials the bot is operating, does not have permission to do so. This prevents any inadvertent or malicious acts from a bot under which bot 2004 executes.

The control room 2008 can provide, to the client device 2010, software code to implement a node manager 2014. The node manager 2014 executes on the client device 2010 and provides a user 2012 a visual interface via browser 2013 to view progress of and to control execution of automation tasks. It should be noted that the node manager 2014 can be provided to the client device 2010 on demand, when required by the client device 2010, to execute a desired automation task. In one embodiment, the node manager 2014 may remain on the client device 2010 after completion of the requested automation task to avoid the need to download it again. In another embodiment, the node manager 2014 may be deleted from the client device 2010 after completion of the requested automation task. The node manager 2014 can also maintain a connection to the control room 2008 to inform the control room 2008 that device 2010 is available for service by the control room 2008, irrespective of whether a live user session 2018 exists. When executing a bot 2004, the node manager 2014 can impersonate the user 2012 by employing credentials associated with the user 2012.

The control room 2008 initiates, on the client device 2010, a user session 2018 (seen as a specific instantiation 2018.1) to perform the automation task. The control room 2008 retrieves the set of task processing instructions 2004 that correspond to the work item 2006. The task processing instructions 2004 that correspond to the work item 2006 can execute under control of the user session 2018.1, on the client device 2010. The node manager 2014 can provide update data indicative of status of processing of the work item to the control room 2008. The control room 2008 can terminate the user session 2018.1 upon completion of processing of the work item 2006. The user session 2018.1 is shown in further detail at 2019, where an instance 2024.1 of user session manager 2024 is seen along with a bot player 2026, proxy service 2028, and one or more virtual machine(s) 2030, such as a virtual machine that runs Java® or Python®. The user session manager 2024 provides a generic user session context within which a bot 2004 executes.

The bots 2004 execute on a player, via a computing device, to perform the functions encoded by the bot. Some or all of the bots 2004 may in certain embodiments be located remotely from the control room 2008. Moreover, the devices 2010 and 2011, which may be conventional computing devices, such as for example, personal computers, server computers, laptops, tablets and other portable computing devices, may also be located remotely from the control room 2008. The devices 2010 and 2011 may also take the form of virtual computing devices. The bots 2004 and the work items 2006 are shown in separate containers for purposes of illustration but they may be stored in separate or the same device(s), or across multiple devices. The control room 2008 can perform user management functions, source control of the bots 2004, along with providing a dashboard that provides analytics and results of the bots 2004, performs license management of software required by the bots 2004 and manages overall execution and management of scripts, clients, roles, credentials, security, etc. The major functions performed by the control room 2008 can include: (i) a dashboard that provides a summary of registered/active users, tasks status, repository details, number of clients connected, number of scripts passed or failed recently, tasks that are scheduled to be executed and those that are in progress; (ii) user/role management—permits creation of different roles, such as bat creator, bat runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the control room; (vi) task scheduler—permits scheduling tasks which need to be executed on different clients at any particular time; (vii) credential management—permits password management; and (viii) security: management—permits rights management for all user roles. The control room 2008 is shown generally for simplicity of explanation. Multiple instances of the control room 2008 may be employed where large numbers of bots are deployed to provide for scalability of the RPA system 2000.

In the event that a device, such as device 2011 (e.g., operated by user 2012.2) does not satisfy the minimum processing capability to run a node manager 2014, the control room 2008 can make use of another device, such as device 2015, that has the requisite capability. In such case, a node manager 2014 within a Virtual Machine (VM), seen as VM 2016, can be resident on the device 2015. The node manager 2014 operating on the device 2015 can communicate with browser 2013 on device 2011. This approach permits RPA system 2000 to operate with devices that may have lower processing capability, such as older laptops, desktops, and portable/mobile devices such as tablets and mobile phones. In certain embodiments the browser 2013 may take the form of a mobile application stored on the device 2011. The control room 2008 can establish a user session 2018.2 for the user 2012.2 while interacting with the control room 2008 and the corresponding user session 2018.2 operates as described above for user session 2018.1 with user session manager 2024 operating on device 2010 as discussed above.

In certain embodiments, the user session manager 2024 provides five functions. First is a health service 2038 that maintains and provides a detailed logging of bot execution including monitoring memory and CPU usage by the bot and other parameters such as number of file handles employed. The bots 2004 can employ the health service 2038 as a resource to pass logging information to the control room 2008. Execution of the bot is separately monitored by the user session manager 2024 to track memory, CPU, and other system information. The second function provided by the user session manager 2024 is a message queue 2040 for exchange of data between bots executed within the same user session 2018. The third function is a deployment service (also referred to as a deployment module) 2042 that connects to the control room 2008 to request execution of a requested bot 2004. The deployment service 2042 can also ensure that the environment is ready for bot execution, such as by making available dependent libraries. The fourth function is a bot launcher 2044 which can read metadata associated with a requested bot 2004 and launch an appropriate container and begin execution of the requested bot. The fifth function is a debugger service 2046 that can be used to debug bot code.

The bot player 2026 can execute, or play back, a sequence of instructions encoded in a bot. The sequence of instructions can, for example, be captured by way of a recorder when a human performs those actions, or alternatively the instructions are explicitly coded into the bot. These instructions enable the bot player 2026, to perform the same actions as a human would do in their absence. In one implementation, the instructions can compose of a command (action) followed by set of parameters, for example: Open Browser is a command, and a URL would be the parameter for it to launch a web resource. Proxy service 2028 can enable integration of external software or applications with the bot to provide specialized services. For example, an externally hosted artificial intelligence system could enable the bot to understand the meaning of a "sentence."

The user 2012.1 can interact with node manager 2014 via a conventional browser 2013 which employs the node manager 2014 to communicate with the control room 2008. When the user 2012.1 logs in from the client device 2010 to the control room 2008 for the first time, the user 2012.1 can be prompted to download and install the node manager 2014 on the device 2010, if one is not already present. The node manager 2014 can establish a web socket connection to the user session manager 2024, deployed by the control room 2008 that lets the user 2012.1 subsequently create, edit, and deploy the bots 2004.

Figure 32:
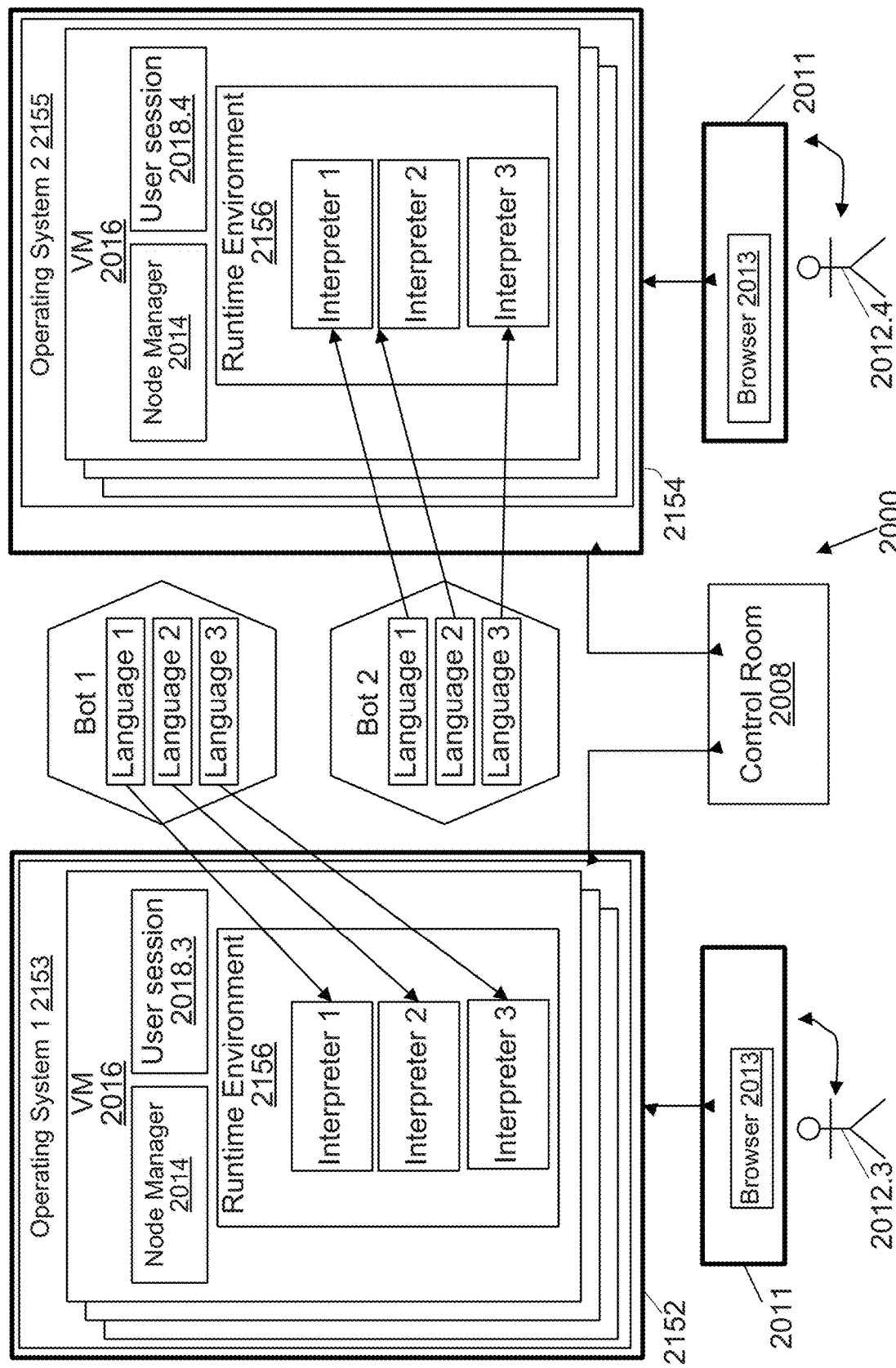
FIG. 32 is a block diagram of a generalized runtime environment for bots in accordance with another embodiment of the robotic process automation system illustrated in FIG. 31.

FIG. 32 is a block diagram of a generalized runtime environment for bots 2004 in accordance with another embodiment of the RPA system 2000 illustrated in FIG. 31. This flexible runtime environment advantageously permits extensibility of the platform to enable use of various languages in encoding bots. In the embodiment of FIG. 32, RPA system 2000 generally operates in the manner described in connection with FIG. 31, except that in the embodiment of FIG. 32, some or all of the user sessions 2018 execute within a virtual machine 2016. This permits the bots 2004 to operate on an RPA system 2000 that runs on an operating system different from an operating system on which a bot 2004 may have been developed. For example, if a bot 2004 is developed on the Windows® operating system, the platform agnostic embodiment shown in FIG. 32 permits the bot 2004 to be executed on a device 2152 or 2154 executing an operating system 2153 or 2155 different than Windows®, such as, for example, Linux. In one embodiment, the VM 2016 takes the form of a Java Virtual Machine (JVM) as provided by Oracle Corporation. As will be understood by those skilled in the art in view of the present disclosure, a JVM enables a computer to run Java® programs as well as programs written in other languages that are also compiled to Java® bytecode.

In the embodiment shown in FIG. 32, multiple devices 2152 can execute operating system 1, 2153, which may, for example, be a Windows® operating system. Multiple devices 2154 can execute operating system 2, 2155, which may. for example, be a Linux® operating system. For simplicity of explanation, two different operating systems are shown, by way of example and additional operating systems such as the macOS®, or other operating systems may also be employed on devices 2152, 2154 or other devices. Each device 2152, 2154 has installed therein one or more VM's 2016, each of which can execute its own operating system (not shown), which may be the same or different than the host operating system 2153/2155. Each VM 2016 has installed, either in advance, or on demand from control room 2008, a node manager 2014. The embodiment illustrated in FIG. 32 differs from the embodiment shown in FIG. 31 in that the devices 2152 and 2154 have installed thereon one or more VMs 2016 as described above, with each VM 2016 having an operating system installed that may or may not be compatible with an operating system required by an automation task. Moreover, each VM has installed thereon a runtime environment 2156, each of which has installed thereon one or more interpreters (shown as interpreter 1, interpreter 2, interpreter 3). Three interpreters are shown by way of example but any run time environment 2156 may, at any given time, have installed thereupon less than or more than three different interpreters. Each interpreter 2156 is specifically encoded to interpret instructions encoded in a particular programming language. For example, interpreter 1 may be encoded to interpret software programs encoded in the Java® programming language, seen in FIG. 32 as language 1 in Bot 1 and Bot 2. Interpreter 2 may be encoded to interpret software programs encoded in the Python® programming language, seen in FIG. 32 as language 2 in Bot 1 and Bot 2, and interpreter 3 may be encoded to interpret software programs encoded in the R programming language, seen in FIG. 32 as language 3 in Bot 1 and Bot 2.

Turning to the bots Bot 1 and Bot 2, each bot may contain instructions encoded in one or more programming languages. In the example shown in FIG. 32, each bot can contain instructions in three different programming languages, for example, Java®, Python® and R. This is for purposes of explanation and the embodiment of FIG. 32 may be able to create and execute bots encoded in more or less than three programming languages. The VMs 2016 and the runtime environments 2156 permit execution of bots encoded in multiple languages, thereby permitting greater flexibility in encoding bots. Moreover, the VMs 2016 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 2008 will select a device with a VM 2016 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 33:
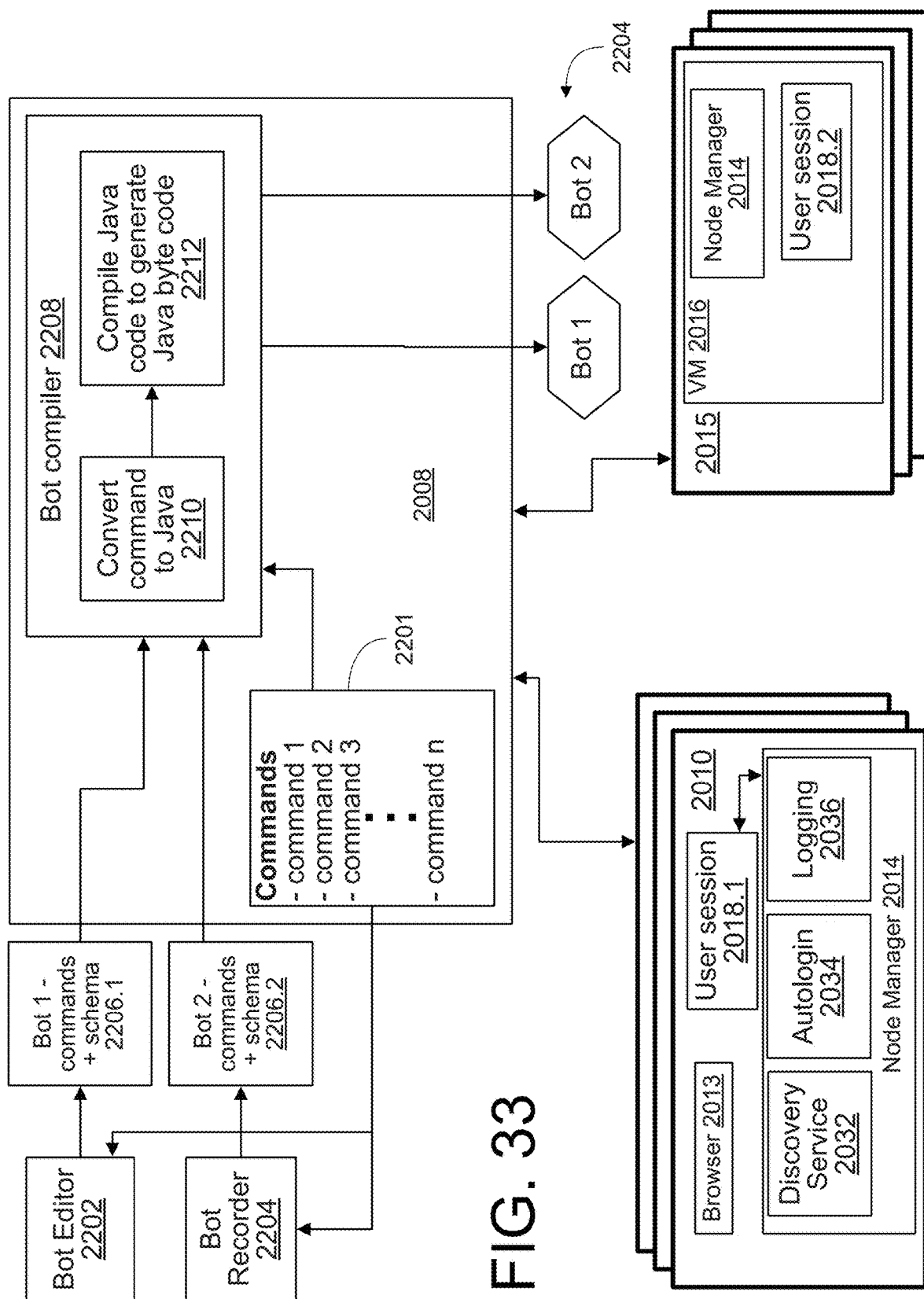
FIG. 33 is yet another embodiment of the robotic process automation system of FIG. 31 configured to provide platform independent sets of task processing instructions for bots.

FIG. 33 illustrates yet another embodiment of the RPA system 2000 of FIG. 31 configured to provide platform independent sets of task processing instructions for bots 2004. Two bots 2004, bot 1 and bot 2 are shown in FIG. 33. Each of bots 1 and 2 are formed from one or more commands 2201, each of which specifies a user level operation with a specified application program, or a user level operation provided by an operating system. Sets of commands 2206.1 and 2206.2 may be generated by bot editor 2202 and bot recorder 2204, respectively, to define sequences of application level operations that are normally performed by a human user. The bot editor 2202 may be configured to combine sequences of commands 2201 via an editor. The bot recorder 2204 may be configured to record application level operations performed by a user and to convert the operations performed by the user to commands 2201. The sets of commands 2206.1 and 2206.2 generated by the editor 2202 and the recorder 2204 can include command(s) and schema for the command(s), where the schema defines the format of the command(s). The format of a command can, such as, includes the input(s) expected by the command and their format. For example, a command to open a URL might include the URL, a user login, and a password to login to an application resident at the designated URL.

The control room 2008 operates to compile, via compiler 2208, the sets of commands generated by the editor 2202 or the recorder 2204 into platform independent executables, each of which is also referred to herein as a bot JAR (Java ARchive) that perform application level operations captured by the bot editor 2202 and the bot recorder 2204. In the embodiment illustrated in FIG. 33, the set of commands 2206, representing a bot file, can be captured in a JSON (JavaScript Object Notation) format which is a lightweight data-interchange text-based format. JSON is based on a subset of the JavaScript Programming Language Standard ECMA-262 3rd Edition—December 1999. JSON is built on two structures: (i) a collection of name/value pairs; in various languages, this is realized as an object, record, struct, dictionary, hash table, keyed list, or associative array, (ii) an ordered list of values which, in most languages, is realized as an array, vector, list, or sequence. Bots 1 and 2 may be executed on devices 2010 and/or 2015 to perform the encoded application level operations that are normally performed by a human user.

Figure 34:
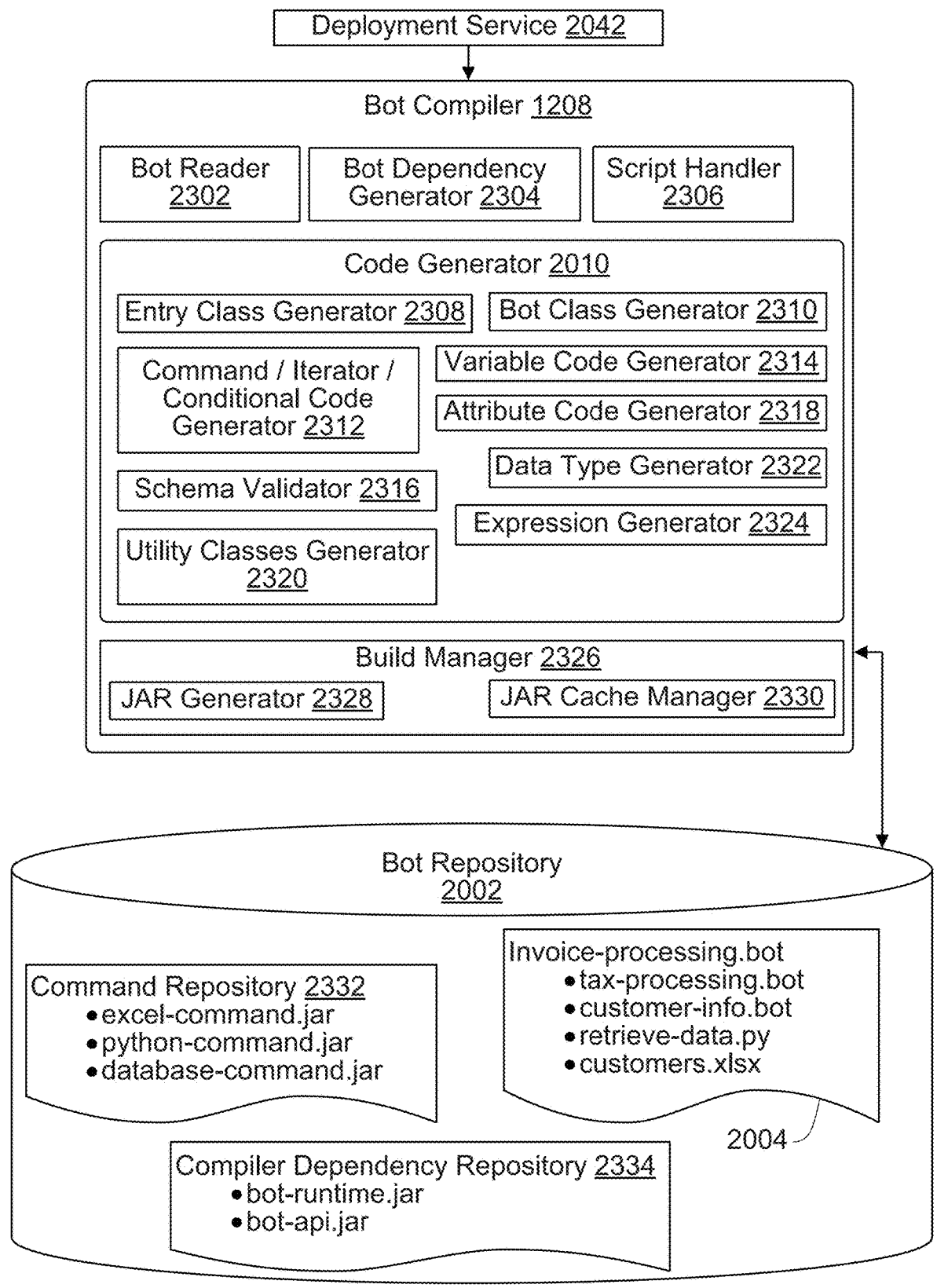
FIG. 34 is a block diagram illustrating details of one embodiment of the bot compiler illustrated in FIG. 33.

FIG. 34 is a block diagram illustrating details of one embodiment of the bot compiler 2208 illustrated in FIG. 33. The bot compiler 2208 accesses one or more of the bots 2004 from the data storage 2002, which can serve as bot repository, along with commands 2201 that are contained in a command repository 2332. The bot compiler 2008 can also access compiler dependency repository 2334. The bot compiler 2008 can operate to convert each command 2201 via a code generator module 2210 to an operating system independent format, such as a Java command. The bot compiler 2008 then compiles each operating system independent format command into byte code, such as Java byte code, to create a bot JAR. The convert command to Java module 2210 is shown in further detail in in FIG. 34 by JAR generator 2328 of a build manager 2326. The compiling to generate Java byte code module 2212 can be provided by the JAR generator 2328. In one embodiment, a conventional Java compiler, such as javac from Oracle Corporation, may be employed to generate the bot JAR (artifacts). As will be appreciated by those skilled in the art, an artifact in a Java environment includes compiled code along with other dependencies and resources required by the compiled code. Such dependencies can include libraries specified in the code and other artifacts. Resources can include web pages, images, descriptor files, other files, directories and archives.

As noted in connection with FIG. 33, deployment service 2042 can be responsible to trigger the process of bot compilation and then once a bot has compiled successfully, to execute the resulting bot JAR on selected devices 2010 and/or 2015. The bot compiler 2208 can comprises a number of functional modules that, when combined, generate a bot 2004 in a JAR format. A bot reader 2302 loads a bot file into memory with class representation. The bot reader 2302 takes as input a bot file and generates an in-memory bot structure. A bot dependency generator 2304 identifies and creates a dependency graph for a given bot. It includes any child bot, resource file like script, and document or image used while creating a bot. The bot dependency generator 2304 takes, as input, the output of the bot reader 2302 and provides, as output, a list of direct and transitive bot dependencies. A script handler 2306 handles script execution by injecting a contract into a user script file. The script handler 2306 registers an external script in manifest and bundles the script as a resource in an output JAR. The script handler 2306 takes, as input, the output of the bot reader 2302 and provides, as output, a list of function pointers to execute different types of identified scripts like Python, Java, VB scripts.

An entry class generator 2308 can create a Java class with an entry method, to permit bot execution to be started from that point. For example, the entry class generator 2308 takes, as an input, a parent bot name, such "Invoice-processing-.bot" and generates a Java class having a contract method with a predefined signature. A bot class generator 2310 can generate a bot class and orders command code in sequence of execution. The bot class generator 2310 can take, as input, an in-memory bot structure and generates, as output, a Java class in a predefined structure. A Command/Iterator/Conditional Code Generator 2312 wires up a command class with singleton object creation, manages nested command linking, iterator (loop) generation, and conditional (If/Else If/Else) construct generation. The Command/Iterator/Conditional Code Generator 2312 can take, as input, an in-memory bot structure in JSON format and generates Java code within the bot class. A variable code generator 2314 generates code for user defined variables in the bot, maps bot level data types to Java language compatible types, and assigns initial values provided by user. The variable code generator 2314 takes, as input, an in-memory bot structure and generates Java code within the bot class. A schema validator 2316 can validate user inputs based on command schema and includes syntax and semantic checks on user provided values. The schema validator 2316 can take, as input, an in-memory bot structure and generates validation errors that it detects. The attribute code generator 2318 can generate attribute code, handles the nested nature of attributes, and transforms bot value types to Java language compatible types. The attribute code generator 2318 takes, as input, an in-memory bot structure and generates Java code within the bot class. A utility classes generator 2320 can generate utility classes which are used by an entry class or bot class methods. The utility classes generator 2320 can generate, as output, Java classes. A data type generator 2322 can generate value types useful at runtime. The data type generator 2322 can generate, as output, Java classes. An expression generator 2324 can evaluate user inputs and generates compatible Java code, identifies complex variable mixed user inputs, inject variable values, and transform mathematical expressions. The expression generator 2324 can take, as input, user defined values and generates, as output, Java compatible expressions.

The JAR generator 2328 can compile Java source files, produces byte code and packs everything in a single JAR, including other child bots and file dependencies. The JAR generator 2328 can take, as input, generated Java files, resource files used during the bot creation, bot compiler dependencies, and command packages, and then can generate a JAR artifact as an output. The JAR cache manager 2330 can put a bot JAR in cache repository so that recompilation can be avoided if the bot has not been modified since the last cache entry. The JAR cache manager 2330 can take, as input, a bot JAR.

In one or more embodiment described herein command action logic can be implemented by commands 2201 available at the control room 2008. This permits the execution environment on a device 2010 and/or 2015, such as exists in a user session 2018, to be agnostic to changes in the command action logic implemented by a bot 2004. In other words, the manner in which a command implemented by a bot 2004 operates need not be visible to the execution environment in which a bot 2004 operates. The execution environment is able to be independent of the command action logic of any commands implemented by bots 2004. The result is that changes in any commands 2201 supported by the RPA system 2000, or addition of new commands 2201 to the RPA system 2000, do not require an update of the execution environment on devices 2010, 2015. This avoids what can be a time and resource intensive process in which addition of a new command 2201 or change to any command 2201 requires an update to the execution environment to each device 2010, 2015 employed in a RPA system. Take, for example, a bot that employs a command 2201 that logs into an on-online service. The command 2201 upon execution takes a Uniform Resource Locator (URL), opens (or selects) a browser, retrieves credentials corresponding to a user on behalf of whom the bot is logging in as, and enters the user credentials (e.g. username and password) as specified. If the command 2201 is changed, for example, to perform two-factor authentication, then it will require an additional resource (the second factor for authentication) and will perform additional actions beyond those performed by the original command (for example, logging into an email account to retrieve the second factor and entering the second factor). The command action logic will have changed as the bot is required to perform the additional changes. Any bot(s) that employ the changed command will need to be recompiled to generate a new bot JAR for each changed bot and the new bot JAR will need to be provided to a bot runner upon request by the bot runner. The execution environment on the device that is requesting the updated bot will not need to be updated as the command action logic of the changed command is reflected in the new bot JAR containing the byte code to be executed by the execution environment.

The embodiments herein can be implemented in the general context of computer-executable instructions, such as those included in program modules, being executed in a computing system on a target, real or virtual, processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may further include a device or product having content stored thereon at a time of sale or delivery. Thus, delivering a device with stored content, or offering content for download over a communication medium, may be understood as providing an article of manufacture with such content described herein.

Figure 35:
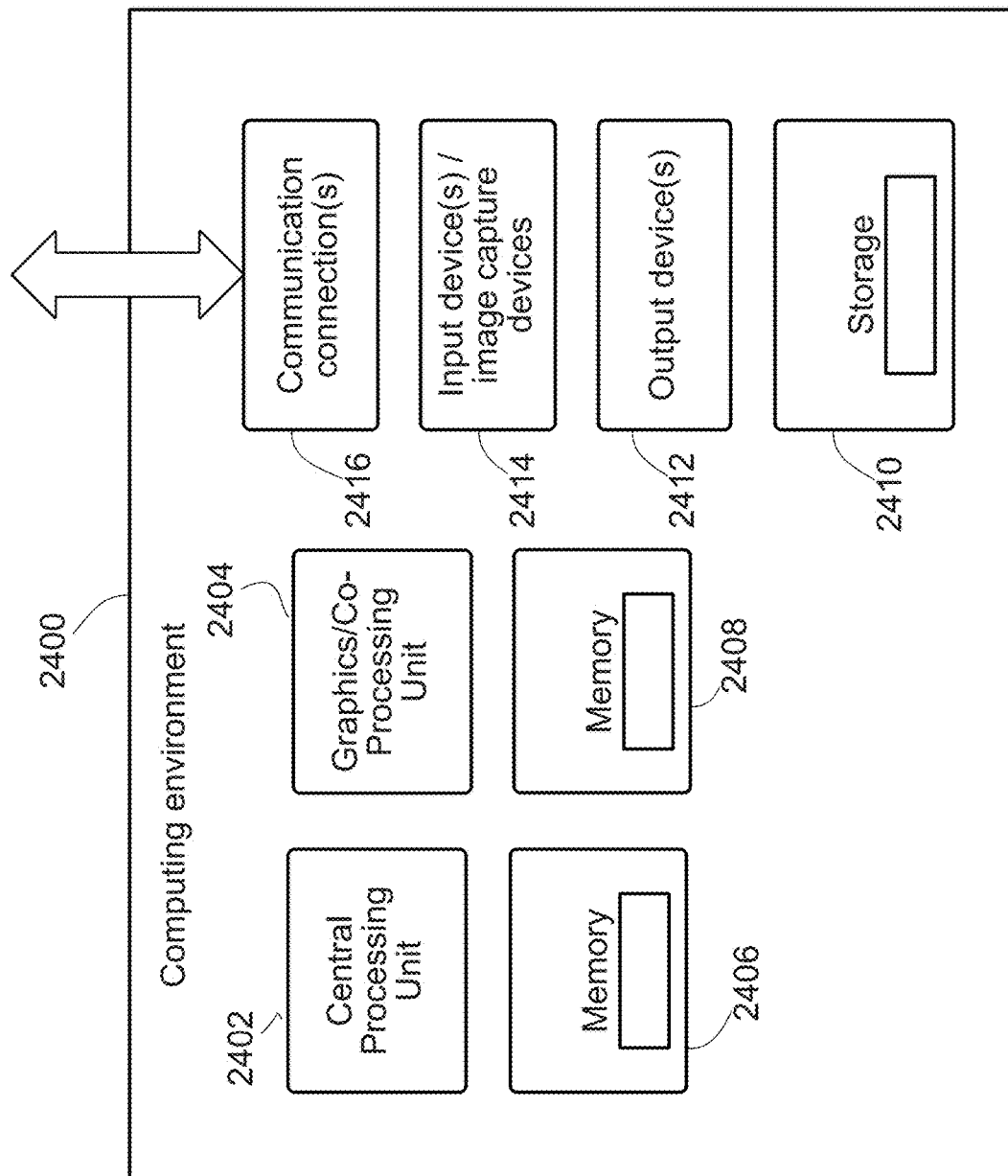
FIG. 35 is a block diagram of an exemplary computing environment for an implementation of a robotic process automation system.

FIG. 35 illustrates a block diagram of an exemplary computing environment 2400 for an implementation of an RPA system, such as the RPA systems disclosed herein. The embodiments described herein may be implemented using the exemplary computing environment 2400. The exemplary computing environment 2400 includes one or more processing units 2402, 2404 and memory 2406, 2408. The processing units 2402, 2406 execute computer-executable instructions. Each of the processing units 2402, 2406 can be a general-purpose central processing unit (CPU), processor in an application-specific integrated circuit (ASIC) or any other type of processor. For example, as shown in FIG. 35, the processing unit 2402 can be a CPU, and the processing unit can be a graphics/co-processing unit (GPU). The tangible memory 2406, 2408 may be volatile memory (e.g., registers, cache, RAM), non-volatile memory (e.g., ROM, EEPROM, flash memory, etc.), or some combination of the two, accessible by the processing unit(s). The hardware components may be standard hardware components, or alternatively, some embodiments may employ specialized hardware components to further increase the operating efficiency and speed with which the RPA system operates. The various components of exemplary computing environment 2400 may be rearranged in various embodiments, and some embodiments may not require nor include all of the above components, while other embodiments may include additional components, such as specialized processors and additional memory.

The exemplary computing environment 2400 may have additional features such as, for example, tangible storage 2410, one or more input devices 2414, one or more output devices 2412, and one or more communication connections 2416. An interconnection mechanism (not shown) such as a bus, controller, or network can interconnect the various components of the exemplary computing environment 2400. Typically, operating system software (not shown) provides an operating system for other software executing in the exemplary computing environment 2400, and coordinates activities of the various components of the exemplary computing environment 2400.

The tangible storage 2410 may be removable or non-removable, and includes magnetic disks, magnetic tapes or cassettes, CD-ROMs, DVDs, or any other medium which can be used to store information in a non-transitory way, and which can be accessed within the computing system 2400. The tangible storage 2410 can store instructions for the software implementing one or more features of a PRA system as described herein.

The input device(s) or image capture device(s) 2414 may include, for example, one or more of a touch input device (such as a keyboard, mouse, pen, or trackball), a voice input device, a scanning device, an imaging sensor, touch surface, or any other device capable of providing input to the exemplary computing environment 2400. For multimedia embodiment, the input device(s) 2414 can, for example, include a camera, a video card, a TV tuner card, or similar device that accepts video input in analog or digital form, a microphone, an audio card, or a CD-ROM or CD-RW that reads audio/video samples into the exemplary computing environment 2400. The output device(s) 2412 can, for example, include a display, a printer, a speaker, a CD-writer, or any another device that provides output from the exemplary computing environment 2400.

The one or more communication connections 2416 can enable communication over a communication medium to another computing entity. The communication medium conveys information such as computer-executable instructions, audio or video input or output, or other data. The communication medium can include a wireless medium, a wired medium, or a combination thereof.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for facilitating resilient execution of a robotic process automation, the method comprising:
    capturing a first image of a playback user interface that is presented on a display device associated with a playback computing device;
    detecting at least one user interface control within the captured first image of the playback user interface, the detected user interface control being able to alter visible content of the playback user interface that is presented on the display device associated with the playback computing device;
    effecting manipulation of the playback user interface using the detected user interface control to alter the playback user interface, whereby visible content of the altered playback user interface being presented is at least partially different than visible content the playback user interface presented before the effecting manipulation;
    capturing a second image of the altered playback user interface that is presented on the display device associated with the playback computing device; and
    detecting one or more user interface controls within the captured second image of the altered playback user interface.

2. A computer-implemented method as recited in claim 1, wherein the effecting manipulation effects visual appearance and displayed content of the playback user interface.

3. A computer-implemented method as recited in claim 1, wherein the method comprises:
    selecting at least one of the detected user interface controls within the captured second image of the altered playback user interface; and
    effecting a programmatic interaction with the selected at least one of the detected user interface controls within the captured second image of the altered playback user interface.

4. A computer-implemented method as recited in claim 3, wherein the programmatic interaction carries out a portion of the robotic automation process.

5. A computer-implemented method as recited in claim 3, wherein the robotic automation process performs a software automation process derived from a plurality of previously recorded user interactions with one or more application programs, and wherein the programmatic interaction interacts with the one or more application programs to carry out a portion of the software automation process.

6. A computer-implemented method as recited in claim 1, wherein the detected at least one user interface control within the captured first image of the playback user interface pertains to a slider bar control.

7. A computer-implemented method as recited in claim 1, wherein the method comprises:
   determining movement capability of the detected at least one user interface control within the captured first image of the playback user interface; and
   determining a movement amount for the effecting the manipulation of the playback user interface using the detected user interface control.

8. A computer-implemented method as recited in claim 7, wherein the effecting manipulation of the playback user interface using the detected user interface control is done in accordance with the determined movement amount.

9. A computer-implemented method as recited in claim 8, wherein the determined movement amount is a scroll amount.

10. A computer-implemented method as recited in claim 8, wherein the detected at least one user interface control within the captured first image of the playback user interface pertains to a slider bar control.

11. A computer-implemented method as recited in claim 1, wherein the detecting of the at least one user interface control within the captured first image of the playback user interface comprises determining parameters of the detected at least one user interface control within the captured first image of the playback user interface.

12. A computer-implemented method as recited in claim 1, wherein the detecting of the at least one user interface control within the captured first image of the playback user interface comprises identifying at least one child control of the detected at least one user interface control within the captured first image of the playback user interface.

13. A computer-implemented method as recited in claim 1, wherein the method comprises:
   determining whether a particular user interface control requested by the robotic automation process is one of the one or more user interface controls within the captured second image of the altered playback user interface.

14. A computer-implemented method as recited in claim 13, wherein the method comprises:
   effecting a programmatic interaction with the particular user interface control in accordance with the robotic automation process if it is determined that the particular user interface control requested by the robotic automation process is one of the one or more user interface controls within the captured second image of the altered playback user interface.

15. A computer-implemented method for facilitating robotic process automation, the method comprising:
   identifying a software automation process that facilitates automation of a previously captured series of user interactions with at least one user interface presented to a user on a display device associated with a capture computing device;
   initiating execution of the software automation process;
   capturing an image of a playback user interface that is presented on a display device associated with a playback computing device;
   examining the captured image of the playback user interface to determine whether a corresponding user interface control is found within the captured image of the playback user interface;
   effecting programmatic user interaction with the corresponding user interface control of the playback user interface when the examining determines that the captured image of the playback user interface includes the corresponding user interface control; and
   manipulating the playback user interface when the examining determines that the captured image of the playback user interface does not include the corresponding user interface control, the manipulating of the playback user interface at least alters the playback user interface such that visible content of the altered playback user interface when presented is at least partially different than visible content the playback user interface presented before the manipulating.

16. A computer-implemented method as recited in claim 15, wherein the manipulating comprises:
   examining the captured image of the playback user interface to determine whether a movement user interface control is found within the captured image of the playback user interface; and
   effecting manipulation of the playback user interface using the movement user interface control to alter the playback user interface if the examining of the captured image of the playback user interface determines that the movement user interface control is found within the captured image of the playback user interface.

17. A computer-implemented method as recited in claim 16, wherein the method comprises:
   capturing a subsequent image of the altered playback user interface that is presented on the display device associated with the playback computing device;
   examining the captured subsequent image of the altered playback user interface to determine whether the corresponding user interface control is found within the captured subsequent image of the altered playback user interface; and
   effecting programmatic user interaction with the corresponding user interface control of the altered playback user interface if the examining determines that the captured subsequent image of the altered playback user interface includes the corresponding user interface control.

18. A computer-implemented method as recited in claim 16, wherein the movement user interface control includes a scrollbar control.

19. A computer-implemented method as recited in claim 18, wherein the effecting manipulation of the playback user interface comprises programmatically inducing a scrolling action though use of the scrollbar control.

20. A computer-implemented method as recited in claim 18, wherein the effecting manipulation of the playback user interface comprises:
   determining an amount of scrolling to be performed; and
   programmatically inducing the determined amount of scrolling through use of the scrollbar control.

21. A computer-implemented method as recited in claim 20, wherein the determining an amount of scrolling to be performed comprises determining an amount of scrolling available by the scrollbar control through the examining the captured image of the playback user interface.

22. A computer-implemented method as recited in claim 15, wherein the previously captured series of user interactions includes a particular user interface control, and wherein the examining comprises determining whether the corresponding user interface control matches the particular user interface control.

23. A non-transitory computer readable medium including at least computer program code tangibly stored thereon for facilitating execution of a robotic process automation, the computer readable medium comprising:

computer program code for capturing a first image of a user interface that is presented on a display device associated with a computing device;

computer program code for detecting at least one user interface control within the captured first image of the user interface, the detected user interface control being able to alter visible content of the user interface that is presented on the display device associated with the computing device;

computer program code for effecting manipulation of the user interface using the detected user interface control to alter the user interface, whereby visible content of the altered user interface being presented is at least partially different than visible content the user interface presented before the effecting manipulation;

computer program code for capturing a second image of the altered user interface that is presented on the display device associated with the computing device; and computer program code for detecting one or more user interface controls within the captured second image of the altered user interface.

24. A non-transitory computer readable medium method as recited in claim 23, wherein the user interface is provided in a window or screen presented on the display device.

25. A non-transitory computer readable medium method as recited in claim 23, wherein the non-transitory computer readable medium comprises:

computer program code for selecting at least one of the detected user interface controls within the captured second image of the altered playback user interface; and computer program code for effecting a programmatic interaction with the selected at least one of the detected user interface controls within the captured second image of the altered playback user interface, wherein the robotic automation process performs a software automation process derived from a plurality of previously recorded user interactions with one or more application programs, and wherein the programmatic interaction interacts with the one or more application programs to carry out a portion of the software automation process.

26. A non-transitory computer readable medium including at least computer program code tangibly stored thereon for facilitating robotic process automation, the computer readable medium comprising:

computer program code for identifying a software automation process that facilitates automation of a previously captured series of user interactions with at least one user interface presented to a user on a display device associated with a capture computing device;

computer program code for initiating execution of the software automation process, the software automation process including at least one interaction with a particular user interface control;

computer program code for capturing an image of a playback user interface that is presented on a display device associated with a playback computing device;

computer program code for examining the captured image of the playback user interface to determine whether the particular user interface control is found within the captured image of the playback user interface;

computer program code for effecting programmatic user interaction with the particular user interface control of the playback user interface when the examining determines that the captured image of the playback user interface includes the particular user interface control; and computer program code for manipulating the playback user interface when the examining determines that the captured image of the playback user interface does not include the particular user interface control, the manipulating of the playback user interface at least alters the playback user interface such that visible content of the altered playback user interface when presented is at least partially different than visible content the playback user interface presented before the manipulating.

\* \* \* \* \*